United States Patent
Holtappels et al.

(10) Patent No.: US 10,229,552 B2
(45) Date of Patent: Mar. 12, 2019

(54) METHODS AND SYSTEMS FOR DELIVERING ELECTRIC ENERGY

(71) Applicant: TANKTWO OY, Askola (FI)

(72) Inventors: Bert Holtappels, Helsinki (FI); Juha Tuomola, Vantaa (FI); Timo Rissanen, Helsinki (FI)

(73) Assignee: TANKTWO OY, Askola (FI)

( * ) Notice: Subject to any disclaimer, the term of this patent is extended or adjusted under 35 U.S.C. 154(b) by 157 days.

(21) Appl. No.: 15/021,829

(22) PCT Filed: Sep. 10, 2014

(86) PCT No.: PCT/EP2014/069318
§ 371 (c)(1),
(2) Date: Mar. 14, 2016

(87) PCT Pub. No.: WO2015/036446
PCT Pub. Date: Mar. 19, 2015

(65) Prior Publication Data
US 2016/0232736 A1    Aug. 11, 2016

(30) Foreign Application Priority Data

Sep. 13, 2013 (GB) .................................. 1316292.0
Sep. 13, 2013 (GB) .................................. 1316293.8
(Continued)

(51) Int. Cl.
*H02J 7/00* (2006.01)
*G07F 15/00* (2006.01)
(Continued)

(52) U.S. Cl.
CPC .......... *G07F 15/005* (2013.01); *B60L 3/0046* (2013.01); *B60L 11/184* (2013.01);
(Continued)

(58) Field of Classification Search
CPC ...... G07F 15/005; G07F 11/62; B60L 3/0046; B60L 11/1822; B60L 11/184;
(Continued)

(56) References Cited

U.S. PATENT DOCUMENTS 6,295,466 B1    9/2001  Ishikawa et al.
8,054,049 B1   11/2011  Michaelis et al.
(Continued)

FOREIGN PATENT DOCUMENTS

DE   10 2007 032 210 A1   10/2008
EP         2290387 A2      3/2011
(Continued)

OTHER PUBLICATIONS

Goldenstein, Machine English translations of German Patent Document No. DE 10 2010 018698 A1, machine translated by the EPO website, on Apr. 30, 2018.*
(Continued)

*Primary Examiner* — Phallaka Kik
(74) *Attorney, Agent, or Firm* — Saul Ewing Arnstein & Lehr LLP

(57) ABSTRACT

A dispenser for dispensing charged battery units into a tank of an electrically powered apparatus. The dispenser comprises a dispensing container for accommodating a plurality of charged battery units, and a conduit having a first end coupled to the dispensing container and a second end adapted to be coupled to a tank to be filled. The dispenser further comprises a dispensing mechanism for selectively dispensing battery units to the tank through said conduit, the dispensing mechanism comprising a metering unit for monitoring and controlling the number and or state of battery units dispensed.

19 Claims, 29 Drawing Sheets

(30) Foreign Application Priority Data

Sep. 13, 2013 (GB) .................................. 1316294.6
Jan. 15, 2014 (GB) .................................. 1400648.0

(51) Int. Cl.
| | | |
|---|---|---|
| *B60L 3/00* | (2006.01) | |
| *B60L 11/00* | (2006.01) | |
| *H01M 10/00* | (2006.01) | |
| *H01M 2/00* | (2006.01) | |
| *B60S 5/06* | (2006.01) | |
| *B65G 51/02* | (2006.01) | |
| *G06Q 20/18* | (2012.01) | |
| *G07F 11/62* | (2006.01) | |
| *B60L 11/18* | (2006.01) | |
| *H01M 10/42* | (2006.01) | |
| *H01M 2/20* | (2006.01) | |
| *H01M 2/30* | (2006.01) | |
| *H01M 10/44* | (2006.01) | |
| *H01M 10/46* | (2006.01) | |
| *B60K 1/04* | (2019.01) | |

(52) U.S. Cl.
CPC ....... *B60L 11/1822* (2013.01); *B60L 11/1846* (2013.01); *B60L 11/1848* (2013.01); *B60L 11/1861* (2013.01); *B60S 5/06* (2013.01); *B65G 51/02* (2013.01); *G06Q 20/18* (2013.01); *G07F 11/62* (2013.01); *H01M 2/206* (2013.01); *H01M 2/305* (2013.01); *H01M 10/4207* (2013.01); *H01M 10/4221* (2013.01); *H01M 10/4257* (2013.01); *H01M 10/441* (2013.01); *H01M 10/46* (2013.01); *B60K 2001/0455* (2013.01); *B60L 2230/16* (2013.01); *B60L 2240/545* (2013.01); *B60L 2240/547* (2013.01); *B60L 2240/549* (2013.01); *B60L 2240/70* (2013.01); *H01M 2010/4278* (2013.01); *H01M 2220/20* (2013.01); *Y02T 10/705* (2013.01); *Y02T 10/7005* (2013.01); *Y02T 10/7044* (2013.01); *Y02T 10/7088* (2013.01); *Y02T 10/7291* (2013.01); *Y02T 90/121* (2013.01); *Y02T 90/124* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(58) Field of Classification Search
CPC .............. B60L 11/1846; B60L 11/1848; B60L 2230/16; B60L 2240/545; B60L 2240/547; B60L 2240/549; B60L 2240/70; B60S 5/06; B65G 51/02; B06O 20/18; H01M 2/206; H01M 2/305; H01M 10/4207; H01M 10/4221; H01M 10/4257; H01M 10/441; H01M 10/46; H01M 2010/4278; H01M 2020/20; B60K 2001/0455; Y02T 10/7005; Y02T 10/7044; Y02T 10/705; Y02T 10/7088; Y02T 10/7291; Y02T 10/124; Y02T 10/128; Y02T 10/14; Y02T 10/16; Y02T 10/163; Y02T 10/169; Y04S 30/14; H02J 7/00

USPC .......................................... 320/106, 104, 109
See application file for complete search history.

(56) References Cited

U.S. PATENT DOCUMENTS

| | | |
|---|---|---|
| 2003/0071523 A1 | 4/2003 | Silverman et al. |
| 2008/0169787 A1 | 7/2008 | Hsieh et al. |
| 2008/0281732 A1 | 11/2008 | Yamada |
| 2010/0145717 A1* | 6/2010 | Hoeltzel .................. B60K 1/04 705/1.1 |
| 2010/0190052 A1 | 7/2010 | Rajani et al. |
| 2010/0261043 A1 | 10/2010 | Kim et al. |
| 2012/0094162 A1* | 4/2012 | Gyenes ............... B60L 11/1822 429/97 |
| 2012/0326665 A1 | 12/2012 | Yin et al. |
| 2014/0272521 A1 | 9/2014 | Beckman et al. |
| 2014/0356670 A1* | 12/2014 | Haug .................... B60L 3/0046 429/90 |
| 2014/0360010 A1* | 12/2014 | Haug .................... B60L 3/0046 29/623.1 |

FOREIGN PATENT DOCUMENTS

| | | |
|---|---|---|
| GB | 2353151 A | 2/2001 |
| GB | 2513648 A | 11/2014 |
| JP | 2010191636 | 9/2010 |
| JP | 2011229324 | 11/2011 |
| WO | 2011/134463 A2 | 11/2011 |

OTHER PUBLICATIONS

Hoeltzel, Machine English translation of German Patent Document No. DE 10 2007 032210 A1, machine translated by EPO website, translated on Apr. 5, 2018.*
International Search Report, dated Dec. 2, 2014, and Written Opinion issued in priority International Application No. PCT/EP2014/069318.
Combined Search and Examination Report, dated Mar. 13, 2014, issued in priority GB Application No. GB1316292.0.
Combined Search and Examination Report, dated Mar. 13, 2014, issued in priority GB Application No. GB1316293.8.
Combined Search and Examination Report, dated Mar. 13, 2014, issued in priority GB Application No. GB1316294.6.
Combined Search and Examination Report, dated Jul. 10, 2014, issued in priority GB Application No. GB1400648.0.

* cited by examiner

METHODS AND SYSTEMS FOR DELIVERING ELECTRIC ENERGY

CROSS REFERENCE TO RELATED APPLICATIONS

This application claims the priority of PCT/EP2014/069318, filed on Sep. 10, 2014, which claims priority to GB Application No. 1316294.6, filed Sep. 13, 2013; GB Application No. 1316293.8, filed Sep. 13, 2013; GB Application No. 1316292.0, filed Sep. 13, 2013; and GB Application No. 1400648.0, filed Jan. 15, 2014, the entire contents of each of which are fully incorporated herein by reference.

FIELD OF THE INVENTION

The invention relates to methods and systems for delivering electric energy. In particular, though not necessarily, the invention relates to apparatus and methods of replenishing energy capacity of electric devices. The invention can be used, for example, in the field of automotives.

BACKGROUND OF THE INVENTION

Electric Vehicles (EVs) are growing in popularity for reasons such as a different driving experience, higher performance, better reliability and lower maintenance, lower operational cost, and the potential to decrease the environmental impact of transportation. Electricity is used exclusively to propel the vehicle, or can be used to assist other methods such as internal combustion engines (ICEs).

The main types of the EVs are battery electric vehicles (BEV), plug-in hybrid electric vehicles (PHEV) and hybrid electric vehicles (HEV). EVs use an electric motor for propulsion. Electric energy is stored in batteries using, e.g. lithium-ion technology or any other form of battery chemistry. Other forms of energy storage are applicable too, such as supercapacitors or fuel cells. The HEV and the PHEV combine a conventional combustion engine with an electric drive system. HEVs use typically regenerative breaking to charge the batteries. PHEV contains rechargeable batteries that can be fully charged by connecting a plug to an external electric power source. BEVs are all electric vehicles without an internal combustion engine. The BEV and the PHEV also allows a user to choose alternative energy for charging the batteries by choosing external power source which is using for example a solar or wind power to produce electricity.

A common problem with current PHEVs and BEVs using rechargeable batteries is the charging time. In a typical case charging requires hours and there are also a lot of city center apartments without any plug-in capabilities for vehicles. There are also fast charging stations but also at these charging times are much longer compared with cars using combustion engines which can be quickly "charged" in fuel stations. Fast charging also means that batteries tend to wear out faster. Also energy density is not so high which means bigger and heavier batteries. Power losses are also higher with fast charging. Also charging an 80 kWh battery in for example 30 minutes sets such high power requirements that it is not possible typically at a residential home.

Another problem is that fast charging sets extra requirements for an electric infrastructure which is already stretched to the limit in many countries. In many industrialized nations, spare capacity in the order of magnitude of 50% or more, is periodically available and predictable. However, these are also times of lowest human and economic activity, which would be when fast charging is of no use. Although a typical user would charge at home during night time, a user could still prefer sourcing his energy from a commercial station which might offer lower prices than available to residential users. Other options include positive discrimination of renewable energies. For these cases current charging times are not what users are expecting.

There are several different proposals for changing the batteries for BEVs to overcome the problems described above. Typically, rechargeable cells are grouped as modules and each module consists of a plurality of cells. These modules are monitored and controlled as one entity. If needed, a module can be changed in service station to another module containing charged cells to supply quickly energy for BEV. One issue is that the available size for the battery varies a lot depending on the use case and it might not be rectangular; one module doesn't fit well to all the use cases. It is possible to have modules with different size and form depending on the use case, meaning service stations should have stock of different modules also which do not make sense financially.

Examples of modular energy storage systems of the kind described above are disclosed in U.S. Pat. No. 7,948,207 and US 2012/094162. There are also many multicell battery designs available having the possibility to connect on and off individual cells of the battery. Examples of this kind of designs are disclosed in CN 202535104, CN 102832646, U.S. Pat. No. 8,330,420 and U.S. Pat. No. 7,075,194.

There are also several proposals as to how to monitor individual cells and how to use the characteristics of individual cells to configure a system dynamically. For example US 2010/0261043 proposes a system for dynamically reconfigurable battery framework for a large-scale battery system. This solves a problem how individual cells can be monitored and controlled but this system does not fit if the requirement is to replace hundreds of the depleted cells quickly in service station to supply electric energy for BEVs since the cells are located in certain way in a battery pack. Other control, failure-detection, reconfiguration, bypass and lifecycle management systems for batteries are disclosed for example in US 2005/242776, US 2006/192529, EP 2582009 and U.S. Pat. No. 8,084,994. These systems suffer at least partly from the same disadvantages.

Thus, there is a need for improved solutions for quickly supplying electric energy to electric vehicles and other power-intensive battery-operated devices.

US 2003/135705 discloses a programmable battery unit for portable computers. The battery unit is provided with a data word which is used to prevent inadvertent modification of the battery unit. In more detail, the memory contains a non-reprogrammable memory portion for the data word and a programmable memory portion. Checksum routines between the memory portions are used to check that the changes in the programmable memory are proper. There may be additional security measures using encryption and decryption of data. The reprogrammable memory may contain battery behaviour code related to charging and discharging the battery unit.

US 2009/309540 discloses a programmable vehicle battery capable of receiving data at a point of sale and point of maintenance and communicating this data to a centralized data network for warranty and metrics tracking purposes. The battery may contain multiple configurations, one of which is activated at the time of sale of the battery. In another embodiment, the battery is activated from a dormant state at the time of sale. At maintenance, various pieces of data can be entered into the battery and also communicated via a network to a database for storage or the battery can be diagnosed by reading the data and potentially comparing with the data in the database.

US 2012/0046015 discloses a smart mobile battery which can be authenticated by another device by using a private key securely located in the memory of the smart battery using a cryptographic challenge-response protocol. Using this method, the authenticity of the battery can be verified.

There are also many solutions concerning smooth battery exchange to battery-operated devices. For example US 2012/326665 discloses a method for quickly supplying energy to an electric vehicle. The method comprises providing a rechargeable battery pack on an electric vehicle and providing a battery replacement device, a charging room and a battery storeroom in a power exchange station. The rechargeable battery pack includes a battery box and standardized standard battery units loadable into and unloadable from the battery box along guiding rails when the electric vehicle in need of electric power supply is driven into the power exchanging station.

GB2353151 discloses an electrical vehicle driven by a cassette-type battery that can be freely installed into and removed from the electrical vehicle, and a battery storage location for the cassette-type batteries provided in proximity to the path of travel of the electrical vehicle. The user of the electrical vehicle can return the battery to the battery storage location and replaces it with a different cassette-type battery that has been charged from the battery storage location. In each of the cassette-type batteries, in addition to battery information, historical information about the charging condition is stored. Before and after charging the charging recorded of each battery is monitored, thereby enabling a judgment to be made with regard to the battery characteristics in order to find deteriorated batteries to be removed from the electrical vehicle energy supply system charging and supply system. The batteries may store information relating to the battery characteristics, their owner and have means for displaying this information.

The battery packs and cassettes discussed in the above-mentioned document require very standardized receiving spaces for the batteries and have not received commercial success this far. Due to the strict mechanical constraints, the scalability of these systems is also low.

Despite the numerous battery designs already known, there are no such existing batteries or battery systems that would allow for used batteries to be easily traded at the point of refueling. Prior art solutions where batteries are swapped out during refueling either assume that the batteries are leased from a service provider, or do not consider the issue of the physical cost of the battery, and the deterioration in cost due to wear. As a result, they do not provide an acceptable solution where a transfer of ownership of the battery units themselves is involved, e.g. when a customer who owns the batteries in their car wishes to exchange the batteries for charged batteries in a charging station, owned by a battery provider. Since the cost of the batteries is much higher than the cost of the energy stored, the battery provider cannot simply charge for the energy in the batteries as if the new and old batteries were equivalent.

SUMMARY OF THE INVENTION

It is an aim of the invention to provide a novel electric energy dispenser for quickly replenishing the energy capacity of a battery-operated device. One aim is to allow for quicker energy replenishment of electric vehicles compared with known charging methods.

A specific aim is to provide a method of replenishing the energy reserve of an electric apparatus, such as the motive energy reserve of an EV.

An aim is also to provide a technical solution for operators of service stations, which can be visited with an electric vehicle to quickly gain more energy. An important aspect of the invention is that the cost of the servicing equipment is significantly lower and less complex than certain competing solutions, such as battery swapping robots.

According to a first aspect of the invention there is provided a dispenser for dispensing charged battery units into a tank of an electrically powered apparatus. The dispenser comprises a dispensing container for accommodating a plurality of charged battery units, and a conduit having a first end coupled to the dispensing container and a second end adapted to be coupled to a tank to be filled. The dispenser further comprises a dispensing mechanism for selectively dispensing battery units to the tank through said conduit in essentially random order and orientation. The dispensing mechanism comprises means for communicating individually with each battery unit dispensed to retrieve an identification code of the battery unit, and a metering unit for monitoring and controlling the number and or state of battery units dispensed, said metering unit being configured to store the identification codes of the battery units dispensed.

According to a second aspect of the invention there is provided a method of providing electric energy to an electric vehicle, the vehicle comprising a tank for storing a plurality of battery units, the method comprising locating the vehicle in close proximity to a battery unit dispenser, coupling the tank to the dispenser via one or more battery unit transfer conduits, and extracting depleted battery units from the tank via the or at least one conduit. The method further comprises dispensing charged battery units into the tank via the or at least one conduit in essentially random order and orientation, communicating individually with each battery unit dispensed to retrieve an identification code of the battery unit, and performing metering of the extracted and dispensed battery units for the purpose of financial charging, said metering comprising storing the identification codes of the battery units dispensed.

According to one embodiment, the extraction and dispensing of battery units is controlled by a vehicle user so that, in conjunction with the step of metering, a user defined amount of available electric energy is added to the tank.

According to one embodiment, the step of dispensing may comprise selecting a battery unit type from a plurality of available battery unit types and dispensing the selected battery unit type.

The proposal is based on the idea of providing a battery unit dispenser capable of accommodating and manipulating a plurality of individual battery units. The units are accommodated in a container of the dispenser reserved for that purpose in essentially random, i.e. arbitrary, order and orientation. When needed, they are transferred from the container to an electric device by taking them from the container and conveying to the electric device using suitable dispensing means. Typically, the dispensing means comprises a mechanical unit adapted to take a desired amount of the battery units from the container either one by one or as a set and a movable channel for guiding the battery units to a desired target. In addition, there is an electrical control unit controlling the mechanical dispensing means.

The service station comprises a dispenser and a parking zone within reach of the dispensing means. A vehicle can therefore be parked by the dispenser and new batteries provided into its battery pack, herein called an "electric tank". The service station may also comprise means for removing used battery units from the vehicle before providing the new ones.

The method may comprise removing some or all used battery units from an electric apparatus and replacing them with other ones having larger energy content in order to replenish the energy reserve of the apparatus. Typically these battery units have been used in another apparatus before, but have been removed and recharged at the service station. The apparatus may be an electric vehicle.

The battery units to be dispensed comprise a rechargeable energy reservoir and a plurality of contact areas on surface thereof for the energy to and out of the energy reservoir. The number of contact areas is preferably at least three and the battery units comprise means for configuring connections between terminals of the energy reservoir and the contact areas such that energy can be drawn to and from the energy reservoir through at least one route.

The proposal provides significant advantages. First, it allows for electric energy to be dispensed to vehicles and other electric apparatuses in unit form, or "liquified" form, i.e. in a similar way as conventional liquid-form fuels. A single battery unit can logically be seen as a unit of power, resembling a certain volume of gasoline or any other combustible or consumable form of energy.

Transfer of energy from a vendor or retailer is therefore accomplished by physically transferring a certain number of charged battery units from retailer storage to a vehicle's tank. Users may choose to purchase only a limited amount of energy from a retailer at a certain point in time, in order to limit the out-of-pocket expense for a particular transaction. The presently described battery unit, container and dispenser technologies make this possible. An important argument for operators of vehicle infrastructure such as service stations and users alike, is the familiarity with the user scenario and therefore a lower uptake threshold, but also to avoid unnecessarily disrupting existing auxiliary businesses built around retail of automotive fuels.

As an example, assume that a fully charged tank holds about 100 units of energy. If this tank has been depleted of 90% of this energy, the 10 remaining units of energy are typically distributed over all the battery units in the tank. Removing 50% of the battery units will mean that about 5 units worth of energy remain in the tank, but 50% of the physical space has been freed up. If the units which will be placed in to the tank are of equal capacity and are fully charged, the tank now holds 55 units of energy. Since the removed battery units held still 5 units of energy, only 45 new units of energy will need to be paid for.

The present concept allows the cost of the battery units themselves could be taken into account also. For this purpose, the battery units may be designed to uniquely identify themselves and/or store and report relevant information. For example, wear, quality, age, capacity, brand, cycle of use amongst any other parameter affect to the depreciation and residual value of the battery units and it can be accurately calculated each time its owner/operator changes. Usage data and other information can be tracked and managed throughout the useful life of battery units. A battery unit can remain under ownership of a larger entity and its use is paid for by the ultimate user on a range, time or cycle basis. Alternatively, the battery unit can be sold to the said user, who incurs the upfront cost.

The proposal can also have a significant impact on the electricity generation and distribution industries. In a scenario where BEVs have become a significant part of the vehicle fleet. There, the proposed method can significantly contribute to maximization of the installed generation and transmission capacity, by charging the battery units when demand is low. Due to the significant economic damage caused, utilities try to avoid brownouts or other disruptions, and have a strong incentive to shift the load to periods when there is excess generation and distribution capacity. There are programmable systems available, which charge batteries when the price of electricity is lower, typically when demand is low. These same systems can be used in service stations to charge the battery units described in this document. This could have a big economical effect for stabilizing the electrical grid. These programmable systems can also take into account when noncontinuous and unpredictable forms of, typically renewable, energy are being generated. As a practical example, when wind energy or solar power is available, battery units are charged, but when solar output suddenly drops due to a rapidly appearing cloud cover, battery units can be instructed to hold off on charging for a while, if there would be a scarcity of backup power from the continuous grid. Another example is when sudden wholesale electricity price fluctuations make charging batteries economically undesirable.

Embodiments of this approach are so versatile that not only the "service station" paradigm is fulfilled, but also completely new use cases of acquiring and transferring energy become possible. Examples include: residential installations comprising a container with charging capability filled with battery units, charged with excess electricity produced by solar panels when no one is at home; railway stations fitted with a container filled with battery units, and charged by recovering energy from decelerating trains; containers fitted at sites where renewable energy is plentiful, but intermittent, and grid connectivity is not financially viable; to name a few.

According to one embodiment there is provided a dispenser comprising a dispenser container for accommodating a plurality of battery units in essentially random order and orientation such that the battery units are in touch with each other. The dispenser further comprises dispensing means for transferring a portion of the battery units out of the container in essentially random order, preferably from the bottom of the container, and a dispenser control unit for controlling dispensing of battery units through said dispensing means.

According to one embodiment, the dispenser container has an inner shape of a silo, i.e., a tapering lower portion, whereby the battery units are conveyed to the dispensing means at least partly by means of gravity from the bottom of the silo.

According to one embodiment, the dispenser container can be loaded, i.e., provided with new battery units from a level higher than the battery unit output level.

According to one embodiment, the dispensing means comprise a conduit having a first end connected to the dispensing container and a second end connectable to another battery unit container in the vicinity of the dispenser. According to a further embodiment, the conduit comprises a hose or the like flexible pipe. The second end of the conduit may be provided with a "gun", such as conventional fuel hose, functionally connected to the dispenser control unit, in order to allow for the user of the dispenser to control the dispensing process. By this embodiment, the "refueling" process can be made to resemble as much as possible the conventional internal combustion engine powered vehicle liquid refueling process.

According to one embodiment, the dispenser comprises means for transferring the battery units through the conduit by means of pneumatic conveying to the desired target. Pneumatic conveying is one of the most widely used methods to transfer bulk material from one container to other, Pneumatic conveying system can be either pressure conveying or vacuum conveying. Pressure conveying is preferred for dispensing battery units, because dispenser needs only one channel to deliver both gas and battery units to desired target. If vacuum conveying is used, two channel dispenser is needed: One channel is used to transfer the battery units to target and the second channel creates the vacuum in the target. According to one embodiment the conveying gas supply that is needed to provide the necessary energy to convey the gas is compressor, fan, blower, or vacuum pump.

The dispenser control unit can be programmable to dispense for example a predefined number of battery units or a predefined amount of electric energy stored in the battery units.

According to one embodiment, the dispenser comprises necessary means for the dispenser control unit to communicate individually with each of the battery units dispensed so as to retrieve information on the state of the battery unit or other information stored in the battery units. The information may comprise for example identification code, charge level, charge cycle and/or voltage level of the battery unit. Thus, the system can keep track on the properties of the dispensed units and for example for quality control purposes or for estimating the value of vehicle battery change.

According to one embodiment, is the dispenser comprises a recharging system capable of charging the battery units in the container. The recharging system may be integrated into the dispensing container. For this purpose, there are a plurality of contact surfaces on the inner surface of the container for making electrical contact with at least part of the battery units in the container. The dispenser additionally comprises power supply means for feeding charging power through the contact surfaces to the energy reservoir of the battery units.

For charging randomly packed containers, there is typically also a management unit capable of programming the battery units such that suitable power delivery paths, i.e. so-called electric energy paths or strings, are formed in the container. The paths are used to conduct the charging current from one unit to another such that a plurality of units are charged simultaneously. In more detail, according to one embodiment, the charging means comprise means for receiving from the battery units information on their contacting state with respect to other battery units, means for determining one or more electric energy paths through the battery units from one contact surface of the container to another contact surface of the container based on the contacting state information received, means for transmitting programming signals to the battery units for programming the battery units to form said electric energy paths, and means for delivering electric power through said one or more electric energy paths so as to charge at least part of the battery units part of the electric energy paths and means for sending and receiving signals e.g. the state of charge, temperature, or any other information to or from the battery unit.

According to a further embodiment, the charging means comprise a control unit adapted to communicate with the battery units for discovering the presence of battery units and contact of the battery units with other battery units and contact surfaces of the container, to define said electric energy path(s) using a routing algorithm, and to communicate with the battery units for changing their configuration to correspond with said electric energy path(s).

According to one embodiment, the charging functionality is provided, instead or in addition to the dispenser container, in another container connected to the dispenser container. The battery units charged in this separate container can be conducted to the dispenser container for further delivery to mobile devices.

According to one embodiment, the dispenser comprises intake means for transferring battery units from a tank external to the dispenser, to the dispenser container or another container functionally connected to the dispenser container. The intake means can utilize at least partly the same conduit for transferring of battery units as the dispensing means or there may be provided different battery unit transfer conduits for the intake means and dispensing means. According to one embodiment transferring the battery units from the external container to the dispenser container or another functionally connected container is done by means of pneumatic conveying. Pneumatic conveying system can be either pressure conveying or vacuum conveying. Vacuum conveying is preferred for transferring battery units to dispenser, because dispenser needs only one channel to deliver both gas and battery units to the dispenser container or another functionally connected container. If pressure conveying is used, two channel dispenser is needed: One channel is used to transfer the battery units to target and the second channel creates pressure in the external container.

In a typical embodiment, the dispenser container is large enough to hold at least 1000, in particular at least 10000 battery units, whose largest dimension may be e.g. 1-10 cm. The battery units may have any shape desired. Special benefits are gained by using spherical or in particular ellipsoidal shapes.

According to another aspect, there is provided an apparatus for installation and use at typical automotive service stations, for providing motive energy for vehicles comprising a tank capable of accommodating and utilizing battery units of the described kind, the station comprising an electric energy dispenser as described above and a vehicle parking zone within reach of the dispensing means of the electric energy dispenser for allowing dispensing of battery units to a battery unit container of an electric vehicle at the parking zone.

According to one embodiment, there is provided a point of sale system functionally connected to the electric energy dispenser for allowing a vehicle owner to buy motive energy in the form of battery units dispensed by the electric energy dispenser.

The service station is preferably equipped also with means for transferring used battery units from the electric vehicle to a charging container located at the service station. As discussed above, the charging container may be the same as the dispenser container or a separate container feeding the dispenser container. This allows for quick replenishment of the energy reserve of the vehicle.

Indeed, there is proposed a method of replenishing electric energy reserve of an electric apparatus, which may be a vehicle or any other battery-operated apparatus utilizing a power source comprising a plurality of co-operating battery units. The battery units are preferably accommodated in an electric tank of the apparatus in essentially random order and orientation. The method comprises first removing at least portion of said battery units from the electric tank, and then dispensing a plurality of new battery units to the electric tank in essentially random order from a battery dispenser container, the new battery units having a total energy content which is larger than the total energy content of the removed battery units. In some scenarios, existing battery units may be replaced by "upgraded" battery units having improved characteristics. These may be charged or uncharged when dispensed into the tank.

The dispensing of new battery units is preferably carried out using a dispenser of the kind described above. The method may comprise receiving a dispensing order at the dispenser control unit, the order originating for example manually from the user or automatically from the tank or dispenser electronics. Then, the dispensing means are controlled using the dispenser control unit so as to transfer a portion of the battery units from the dispenser container to the electric tank.

The method preferably comprises determining the total energy content of both the removed battery units and the dispensed battery units. The effective amount of energy transferred from the dispenser to the tank, i.e. energy balance, equals to the difference of the energy contents. The balance may be calculated to a point of sale system for making transactions at least partly dependent on the balance. For example, an account of a vehicle driver can be debited based on the amount of energy sold.

Like in the dispenser container, the battery units in the tank are preferably randomly packed. This makes the dispensing process easy as intelligence or special equipment is not required for positioning the battery units, which can therefore be taken from the container and spouted to the tank using relatively simple mechanics. Indeed, by avoiding this requirement, re-fueling infrastructure costs are dramatically reduced, as compared, e.g. with the costs required to implement battery replacement robots, and hence there is an increased likelihood of the required infrastructure being rolled-out.

According to a further aspect of the present invention there is provided a method of facilitating transactions, involving battery units, between transacting participants. The method comprises, at each battery unit, monitoring and recording state information of the battery unit and transmitting the state information to a valuation service computer system. The method further comprises, at the valuation service computer system, receiving the state information from the battery units, obtaining hardware and/or software configurations for each of the battery units, calculating a transaction value for each battery unit using the state information and hardware and/or software configurations for the battery unit.

According to a further aspect of the invention there is provided a method of storing electric energy and comprising loading a plurality of battery units into a container of a charging system such that electrical contact pads of adjacent battery units are or have a high probability of being in contact and the orientation and location of individual battery units within the tank is unknown a priori, identifying one or more optimal electrical energy charging paths through the loaded battery units via contacting electrical contact pads, and programming the battery units to cause positive and negative battery unit charging terminals to be coupled to appropriate battery unit contact pads, thereby establishing said optimal energy charging path(s). Power is then supplied via the established energy supply path(s) to charge the battery units.

Other aspects of the invention are included in the appended claims.

DETAILED DESCRIPTION OF EMBODIMENTS

Figure 1A:
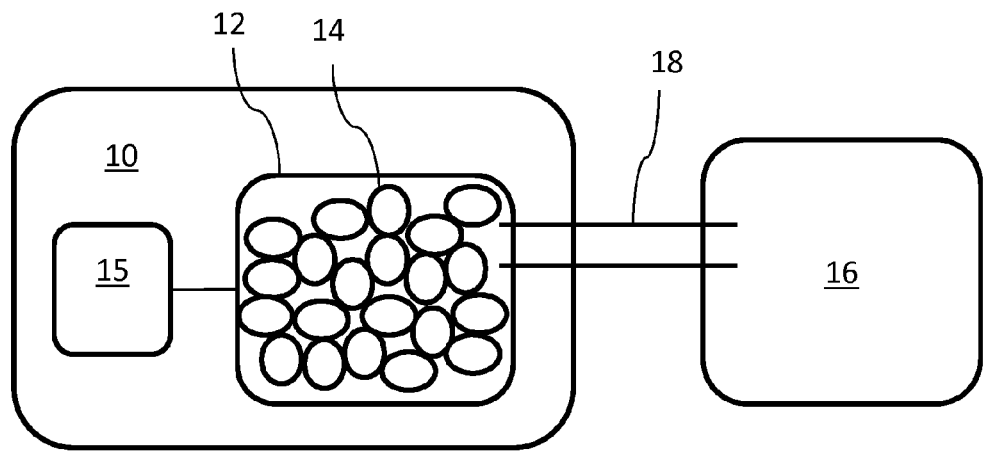
FIG. 1A shows in a schematic view an overall illustration of a system comprising components of the proposal.

The following definitions may be helpful in understanding the description which follows:

"Battery unit" is an electric device comprising an electric energy reservoir and means for delivering electric energy out of the electric energy reservoir to the outside of the battery unit.

"Housing" of a battery unit is a shell enclosing and/or providing a mounting point for other components of the battery unit. Typically the housing defines the general outer shape of the battery unit. The housing may be a separate physical part but may be at least partly be formed of other components of the battery unit.

"(Electric) energy reservoir" means any entity capable of storing electric energy and transferring electric power through its terminals.

"Contact area" or "electric contact pad" of a battery unit means a conductive zone accessible from the outside of the battery unit for making a galvanic contact with the battery unit. In particular, a contact area is contactable by a contact area of another similar battery unit when the battery units are placed next to each other.

"Configuration" of a battery unit means primarily the combination of connections between a plurality of contact areas of a battery unit and terminals of the energy reservoir of the battery unit. To give some examples, if the terminals of the energy reservoir are denoted with N and P, in the case of a battery unit with three contact areas A, B and C connections A-N/B-P, A-N/C-P, A-P/B-N and A-P/C-N form different combinations of connections, i.e., different configurations. In the case of embodiments with an additional capability to disconnect contact areas, connect contact areas to internal ground of the battery unit, and/or to interconnect contact areas, also variations in these (dis)connections form different combinations of connections, i.e., different configurations. For example, in the case of a battery unit with five contact areas A, B, C, D and E connections A-N/B-P/C-D, A-N/B-P/C-E, A-P/C-N/B-D, etc form different combinations of connections.

"Bypass connection" means an electric connection between at least two contact areas of a battery unit without involving the energy reservoir, i.e. simply a low resistance path between the contact areas.

"Connecting means" of a battery unit refer to necessary means for changing and maintaining the configuration of a battery unit. The connecting means being "programmable" means that it can be given instructions internally or externally of the battery unit to change the configuration. The connecting means being able to selectively connect the terminals of the energy reservoir to the contact areas in different combinations means that the configuration to be connected can be selected from a set of plurality of potential configurations.

"State" of a battery unit means the current configuration of a battery unit, and may also include one or more other parameters such as the voltage of the energy reservoir, current through the battery unit, energy level of the energy reservoir, temperature, condition of the energy reservoir, etc.

"(Electric energy) tank" is a structure (container of any sort) capable of accommodating a plurality of battery units and means for transferring energy from the battery units to the outside of the tank (power delivery mode) and/or from the outside of the tank to the battery units inside the tank (charging mode). There are two main types of tanks, depending on their intended use: power delivery tanks and charging tanks, but a single tank can involve both these functions, like a tank of an EV typically would do for allowing direct charging. The tank may include also a control unit for programming the battery units, but the control unit needs not be an integral part thereof, but a partly or entirely separate unit connectable with the tank. In a broad sense, "tank" refers to a tank system comprising also the control unit as a functional part. The term "battery pack" may also be used to describe a power delivery tank filled with battery units.

"Contact surface" or tank contact pad of a tank is a conductive zone accessible from the direction of the battery units accommodated in the tank for making a galvanic contact between contact areas of a battery unit and the zone in order to transfer electricity through the zone.

"Fill ratio" means the ratio of volume taken by the battery units in a tank to free space in a tank, when the tank has been filled up with battery units. Since the fill ratio depends in practice on the volume and shape of the tank (in particular with small tank sizes), references to fill ratio herein assume a theoretical tank with unlimited total volume in each direction filled with an unlimited number of battery units, unless otherwise mentioned. The terms "packing" and "packing density" are also used to describe filling and fill ratio of a tank, respectively.

"Random fill ratio" is a fill ratio achieved by providing a number of battery units in random order under prevailing physical conditions (e.g. gravity) to a tank, i.e., without using intelligence to position each unit. Such random packing may occur for example by means of pouring or spouting the battery units to the tank and potentially by additionally shaking or otherwise agitating the tank and/or battery units to increase the fill ratio. In real life, the tank walls and borders may, depending on the shape of the walls and the shape of the battery unit, slightly guide the nearest battery units into a non-random order and orientation. Herein the term "random packing" covers also essentially (nearly) random packing, i.e., any border effect caused by tank walls limiting true randomness is not taken into account.

"Programming" of battery units (or a tank) means changing the configuration of battery units inside a tank. In the case of a randomly filled tank, programming is typically preceded by a discovery and routing process to find out available connections and potential energy paths inside the tank.

"Control unit" of a tank means necessary communication and computing means for communicating with battery units inside a tank and for programming the battery units.

"Discovery" of battery units means a process where a tank determines which battery units are present in a tank and how they are connected with each other and the contact surfaces of the tank through their contact areas.

"(Electric) energy path" means a potential power delivery path inside a tank between its contact surfaces through contact surfaces and/or energy reservoirs of one or more battery units. When the battery units are suitably configured, electrical power can be delivered along this path, either from the battery units to a load outside the tank (power delivery mode) or from an external energy source to the battery units (charging mode). There may be one or more simultaneous electric energy paths in a tank. In a typical case, there are at least two, e.g., 2-50, energy reservoirs of different battery units arranged in series in this path. There may be energy reservoirs arranged also in parallel in each path. The energy paths are herein also called "strings".

"Routing" means a process where one or more electric energy paths are determined to be able to program the battery units accordingly. In a routing process, it is decided for example how the terminals of the electric energy reservoirs shall be internally connected to the contact areas of the battery units and whether optional bypass connections are needed so that electric energy reservoirs are connected in series to form one or more strings. Routing can be done in various ways based on the information obtained by the discovery process using a suitable routing algorithm. For example the discovery process described in this document gives already route information, which could be used for forming the strings.

"Monitoring" means a process where information is collected on the state of battery units by an external electronic device, such as a tank control unit.

"Container" as herein used means a structure having a space capable of accommodating a plurality of individual battery units. Typically, the space is open, i.e., allows for the battery units to randomly self-order themselves within its boundaries. The size of the container may vary a lot depending on the type and intended use of the container (e.g. an electric tank, a dispenser container or a storage container). Sizes of typical electric tanks vary from fractions of liters to hundreds of liters, whereas dispenser containers for EV use may have a size of e.g. 0.1-10 m3 and storage containers e.g. 5-1000 m3. "Silo" is a container having at least partly downwards narrowing shape. A silo may include internal structures such as spiral or helical blades, corkscrew channels, paddles, or any other structure to prevent the weight of a very large volume of battery units apply potentially destructive force on the battery units at the bottom part of the silo.

"Charging container" is a container equipped with means for charging the battery units while being accommodated in the container.

The term "essentially random order and orientation" of battery units accommodated in a container means that the battery units are in the container in purposely non-ordered way under prevailing physical conditions (e.g. gravity), i.e., no human or artificial intelligence has been used to position each unit within the container. The container also does not include any guides, which would strictly define the position and orientation of each unit put to the container. In real life, the container walls may, depending on the shape of the walls and the shape of the battery unit, slightly guide the nearest battery units into non-random order and orientations. The container may be subdivided to assist in this guiding process. The word "essentially" means that such border effects are not taken into account. In particular, there may be a small zone of very low randomness near the output of a container (e.g. a taper of a silo-type container) due to the border effect. A shorter expression used for the randomly ordered and oriented battery units is "randomly packed", which covers also essentially (nearly) random packing, i.e., any border effect caused by tank walls limiting true randomness is not taken into account. Random packing may occur for example by means of pouring or spouting the battery units to the container and potentially by additionally shaking or otherwise agitating the container and/or battery units to increase the fill ratio.

The term "essentially random order" of battery units during dispensing means the battery units are taken from the randomly packed container in an order in which they appear to the dispensing means. An analogy of an essentially randomly packed container with essentially randomly ordered dispensing is an hourglass in which grains of sand are first in a silo in random order and orientation under gravity and then go through the waist of the hourglass in the order they appear to the waist because of gravity.

System Overview

As introduced above, what is proposed here is a novel utilization scheme for portable energy sources, such as secondary batteries, by providing battery units (BUs) capable of forming larger battery packs with the aid of an electric tank also described herein.

FIG. 1A illustrates an electrical device 10, such as an electric vehicle (EV), comprising an electric tank 12. The tank 12 is connected to an electric load 15, such as an electric motor. The tank 12 is filled with battery units 14 providing power to output of the electric tank 12 and further the electric load 15. The system may also comprise an external battery unit container 16 having transfer means 18 for receiving battery units 14 from the tank 12 and/or transferring them back to the tank 12. Either the tank 12, the external container 16 or both of them may have the capability to charge battery units 15 using electricity from a power network or from other sources such as regenerative braking, solar panels, fuel cells, flywheels or even a hydrocarbon-fueled generator.

As will be described later in more detail, the battery units 14 are equipped with an energy reservoir and contact areas for conducting electrical power out from the electrical reservoir and for recharging the electrical reservoir. In addition, there are connecting means, including a switching logic circuit, for making the desired connections between the energy reservoir and the contact areas. The connection means is programmable to change the configuration upon varying needs and circumstances, most importantly the desired output voltage and power requirements of the load 15 and condition, physical positioning and contacting of the battery unit 14 among and with other similar battery units 14. In particular, the contact areas can be configured freely to act as positive or negative contacts. The configuration of the contacts can preferably be done automatically and dynamically by the switching logic circuit, preferably with the aid of programming signals received by the battery unit from the tank system. Thus, to facilitate the programming, there may be built-in communication capability in the battery units 14. Communication includes receiving programming instructions from outside the battery unit 14 and may include also transmitting information on the state of the battery unit 14 to an external programming or monitoring unit of the tank system or to other battery units.

According to one embodiment, battery units 14 have a smooth self-contained outer shape, that allows them to be transferred from one container (e.g. electric tank 12) to another (e.g. external charging container 16, or vice versa) by non-intelligent, cost-effective methods, such as pumping or pouring.

Freedom of movement of randomly packed battery units 14 is limited by their shape and friction and optionally additionally by immobilization means, such as means for applying physical pressure to the battery units 14 in the tank 12.

When in use, the battery units are contained in the electric tank 12. The tank 12 comprises a physical container with a cavity capable of accommodating a plurality of battery units 14 in one, two or most preferably three-dimensional configuration. In a typical embodiment, the tank 12 is capable of accommodating at least 10, preferably at least 50 battery units 14. There is no upper limit for the battery units, but in typical embodiments the number of units per one tank is less than 10000, usually less than 5000.

To be able to power the load 15, besides accommodating the battery units 14, the tank 12 electrical contact surfaces on inner surface thereof in order to be able to make electrical contact with two or more battery units 14 and to conduct the electric power from the battery units 14 outside the tank 12.

The contact surfaces may be arranged on one or more walls of the tank 12, for example on two opposite inner walls of the tank 12.

According to an embodiment, where the battery units 14 are of externally programmable type, the tank 12 also comprises programming means, most notably a control unit including a computing unit and communication unit, for communicating with the battery units 14. Communicating includes at least controlling, i.e., delivering programming signals to the battery units 14 in order to change their configuration. Communicating may also include monitoring, i.e., receiving information from the battery units 14 for example for gaining data on the relative position and contacts of each battery unit 14 among other battery units. The computing unit is capable of making necessary programming for the battery units 14 to be delivered to the battery units through the communication unit.

It should be noted that the programming means does not need to know the physical position of each battery unit 14 in the tank 12 or most of those. The programming means need to have only a knowledge to form at least one electrical path so that the tank 12 can deliver electricity.

The present system may comprise also one or more charging stations comprising means for replacing used battery units of a device brought to the charging station with charged battery units from another container. The container may for example be a charging silo, comprising means for charging a plurality of battery units and means for providing a desired amount of charged battery units from the silo to the electric tank of the device. The battery units may be randomly packed in the charging silo like on the tank of the device.

Exemplary structures and functional parts of the battery unit and tank system and methods of programming the battery unit are described in more detail below. Unless specifically mentioned or there are obvious technical reasons to the contrary, the embodiments described above and also hereinafter can be freely combined to form a variety of different kinds of operative battery units.

Battery Unit
Overview and Functions (Battery Unit)

Basic and additional functionalities of the battery unit are described below. Exemplary electronics for implementing these functionalities are described in more detail in a separate subsection below.

Figure 1B:
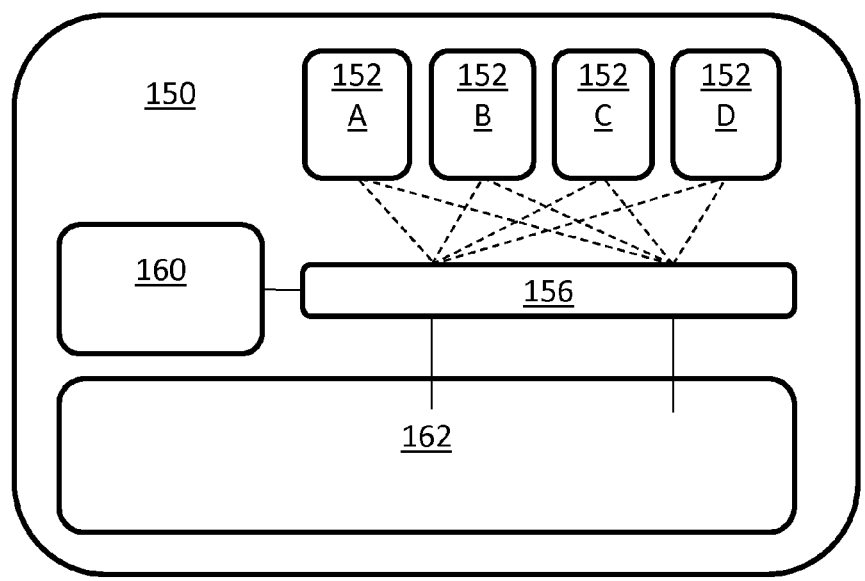
FIG. 1B illustrates in a block diagram a battery unit according to one embodiment.

FIG. 1B illustrates a block diagram of main components of a battery unit 150. There is an energy reservoir 162 whose terminals are connected to switching circuitry 156 further connected to contact areas 152A-D. The switching circuitry 156 together with a microcontroller 160 functionally connected thereto form the switching logic.

Figure 2A:
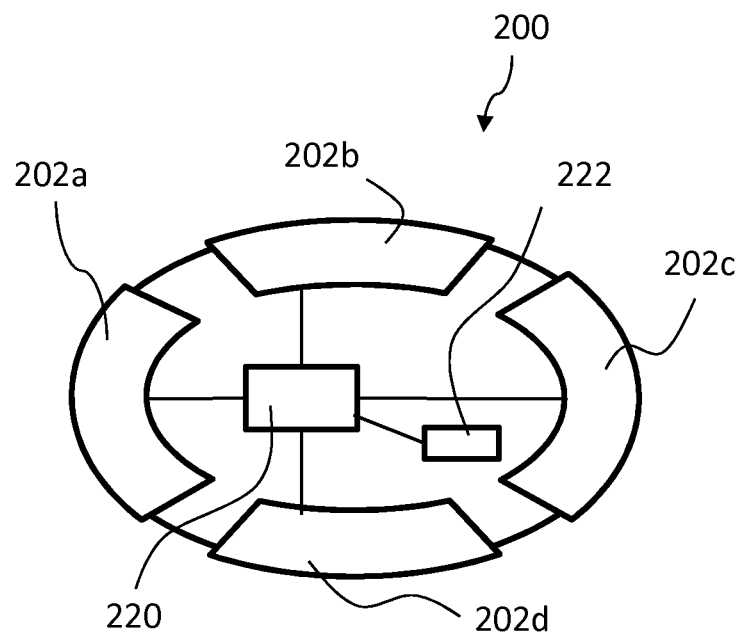
FIGS. 2A-2D show schematic presentation of a battery unit in a general level and in three exemplary configurations.

FIG. 2A shows in a more illustrative view an exemplary battery unit 200. Inside the unit there is an energy reservoir 222 connected to switching logic 220. The switching logic 220 is connected to contact areas 202a, 202b, 202c and 202d, the number of which is this example is four. The switching logic makes it possible for any of the contact areas to be connected either to the positive (+) or negative (−) terminal of the energy reservoir.

Figure 2B:
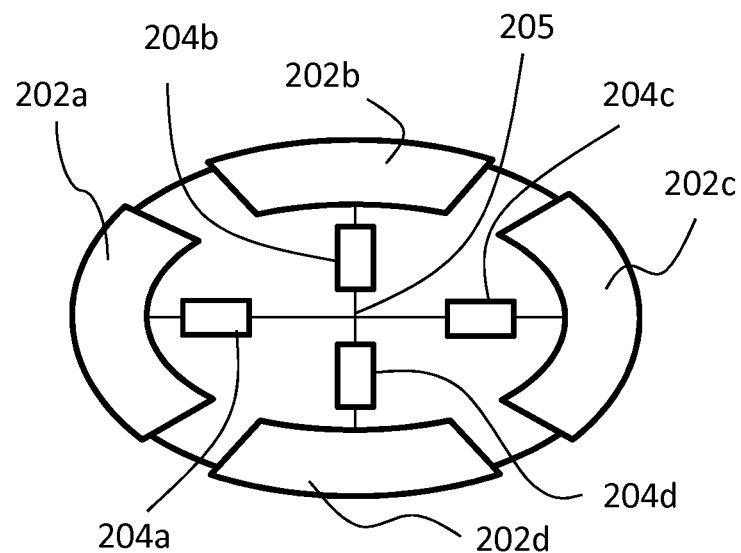
Figure 2C:
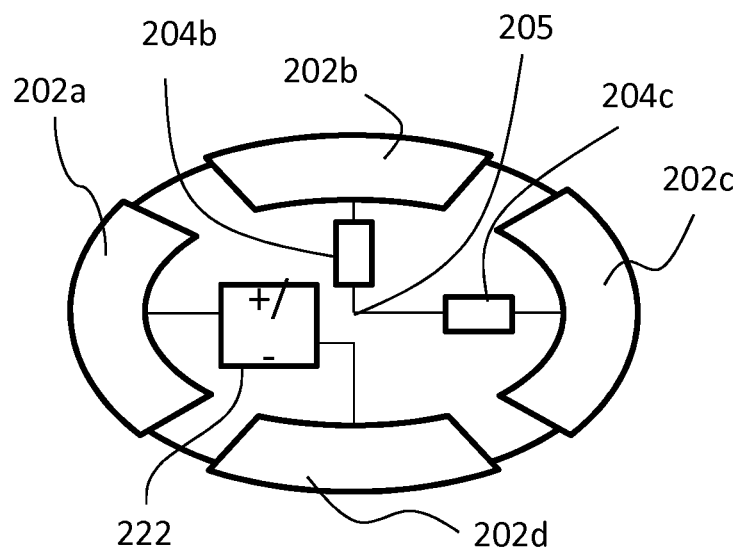
Figure 2D:
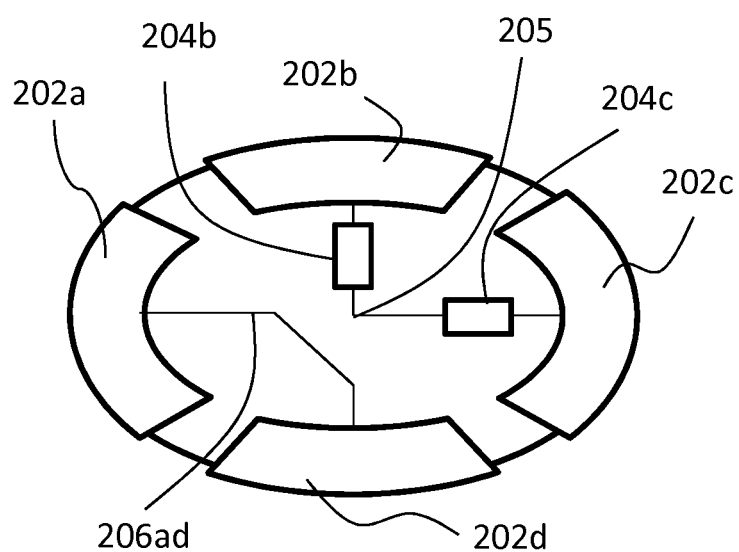

FIGS. 2B-2D illustrate exemplary configurations of the battery unit. FIG. 2B shows a configuration where all contact terminals 202a, 202b, 202c, 202d are connected in star configuration to a common star point 205 through resistors 204a, 204b, 204c, 204d, respectively by the switching logic. The resistors 204a, 204b, 204c, 204d have preferably equal resistances. The common star point represents internal (floating) ground of the battery unit. This embodiment is beneficial in the routing and discovery processes, as explained later in more detail.

FIG. 2C shows a configuration where two contact areas 202a, 202d are connected to a positive and negative terminal of an energy reservoir 222 and two remaining contact areas 202b, 202c are in star configuration connected to a common start point 205 through resistors 204b, 204c.

Additionally, the switching logic may allow any two or more contact areas 202a, 202b, 202c, 202d to be connected together to short circuit those (bypass connection). FIG. 2D represents a configuration where two contact areas 202a, 202d are short circuited by a bypass connection 206ad and two remaining contact areas 202b, 202c are in star configuration connected to a common start point 205 through resistors 204b, 204c. Equally well the remaining two contact areas 202b, 202c could be connected to the terminals of the energy reservoir, or to form a second bypass connection.

The above examples show only a small portion of all available configurations. The switching logic 220 is preferably capable of making any of the described connections for any of the contact areas 202a, 202b, 202c, 202d. In this way, the polarity or state of each contact area 202a, 202b, 202c, 202d can be freely controlled with the switching logic 220 to match various situations and needs.

According to one embodiment, the switching logic is additionally capable of entirely disconnecting one or more of the contact areas from other contact areas, the common start point and the terminals of the energy reservoir.

A key feature of the battery unit is its ability to cooperate with other battery units so as to form a larger power source. For this purpose, the positive and negative poles of the energy reservoir can be connected to any of the contact areas of the battery unit. This enables that the battery units, even if randomly packed inside a tank, can be connected in series and/or in parallel, forming strings of many units. It is irrelevant which battery unit touches which other unit, because the strings are defined by dynamic programming once the relative positioning of the battery units has been determined.

According to one embodiment, the battery unit includes also one or more bypassing connection options. In a bypass connection, current can flow through the battery unit through a low resistance path from one contact area to another without connecting the energy reservoir inside the battery unit to this low resistance path. This option allows the battery unit for example to be used for helping the completion of strings that would otherwise not be possible due to the probabilistic nature of random placement or orientation.

According to one embodiment, the battery unit can be configured to simultaneously deliver energy through two or more contact areas and to be in bypass mode between two or more other contact areas or to disconnect or ground one or more contact areas. Any combination of these functions can be possible, if the switching circuit is designed to allow this.

The above mentioned connection, bypass, disconnect and/or connecting to virtual star point configurations for each contact area are set and updated by suitable connecting means typically built inside the housing of the battery unit. The connecting means may comprise a microcontroller and a switching circuit functionally connected to the microcontroller. These two together form the switching logic.

The switching logic is preferably configured so that it is not possible to contact both terminals of the energy reservoir to the same contact area to avoid undesirable paths or connections. In addition or alternatively, this precautionary function may be implemented in the tank control unit level.

According to one embodiment, the battery unit can monitor environmental and/or electrical characteristics of the unit. These characteristics may include one or more of the following: charge and discharge current, energy reservoir voltage, temperature, state of charge. There are suitable measurement and monitoring circuits for this purpose. There may also be necessary means for changing the configuration of the battery unit based on the monitoring. For example, if the battery unit notices that the discharge current, temperature, or other parameter is outside a desirable range for the chosen pattern, then it can temporarily disconnect the energy reservoir, decrease current draw, or alter behavior otherwise.

According to one embodiment, the battery unit includes a unique identifier coded therein on the hardware or software level. The unique identifier can be used when communicating with an external central control unit. That is, a battery unit can transmit its unique identifier to the external control unit when announcing its presence in the tank or delivering monitoring information. On the other hand, the control unit may include the identifier in its programming commands such that the battery units are able to distinguish between commands intended for the particular battery unit and commands intended for other battery units.

It is also a basic functionality of the exemplary battery unit that it may communicate with other battery units and/or a central control unit of an electric tank and/or host apparatus of the unit, such as an electric vehicle. For this purpose, the battery unit comprises an internal communication unit adapted to operate using a predefined communication protocol either through the contact areas or wirelessly. The communication unit is functionally connected with the switching logic and optional monitoring circuit. Communication is necessary for being able to define and form the energy paths that allow electric current to be drawn from the tank.

The battery unit may additionally, or in order to assist in carrying out the abovementioned functions, comprise power supply circuitry, charging circuitry, flash, EEPROM, RAM, over-current protection circuitry and clock oscillators, which are also described in more detail later.

Energy Reservoir (Battery Unit)

The energy reservoir may comprise an electrochemical cell of any rechargeable type. Alternatively, the energy reservoir may comprise a high-energy capacitor. A further alternative is a hydrogen fuel cell. One specific example is a lithium-ion cell (nominal voltage of 3.7 V).

The energy reservoir may comprise a plurality of cells or capacitors connected in series and/or in parallel.

The capacity of the energy reservoir may be in the order of magnitude from milliampere hours or even less, all the way to dozens of ampere-hours or even larger. The capacity may be e.g. 1 uWh-1 kWh, such as 1 mWh-100 Wh, in particular 1-100 Wh.

The energy reservoir typically takes a major portion, for example at least 75%, in particular at least 90% of the total internal volume of the housing of the battery unit, to obtain high energy density. A smaller volume is needed for the switching logic with communication electronics.

Contact Areas (Battery Unit)

The battery unit comprises a plurality of contact areas or "electric contact pads" on outer surface of its housing. In a preferred embodiment, the housing determines the general shape of the battery unit and contact areas are arranged as coatings or films on the housing material. Wiring from the contact areas to the switching logic inside the housing must be arranged through the housing. However, the contact areas themselves can also extend in full or partly through the housing material. The contact areas are preferably metallic.

The main purpose of the contact areas in the battery unit is to be able to charge and discharge the battery unit while being randomly packed in a container. Two contact areas would be enough if the exact position and orientation of the battery unit could be controlled, like a standard battery attached in a battery holder. In case of randomly or near randomly packed battery units, more connections areas are typically needed to minimize the number of the battery units in the container which cannot be used for supplying power (i.e., battery units whose energy reservoirs cannot be taken as part of any string).

According to one embodiment, the number of contact areas is between 4 and 20, in particular between 6 and 14. This range is estimated to be optimal for at least ellipsoidal battery units but is workable also for other shapes. The exact optimal number of contact areas depends on at least the following: shape of the battery unit, cost and size of electronics, routing process, number of bypasses available in the battery unit, needed creepage and clearance distances, materials used, required physical and environmental protection, chemical and/or corrosion resistance (e.g. when using liquid cooling), thermal conductivity requirements, assembly process, projected lifetime, available technology, serviceability, reliability, cost and budget constraints.

Figure 2E:
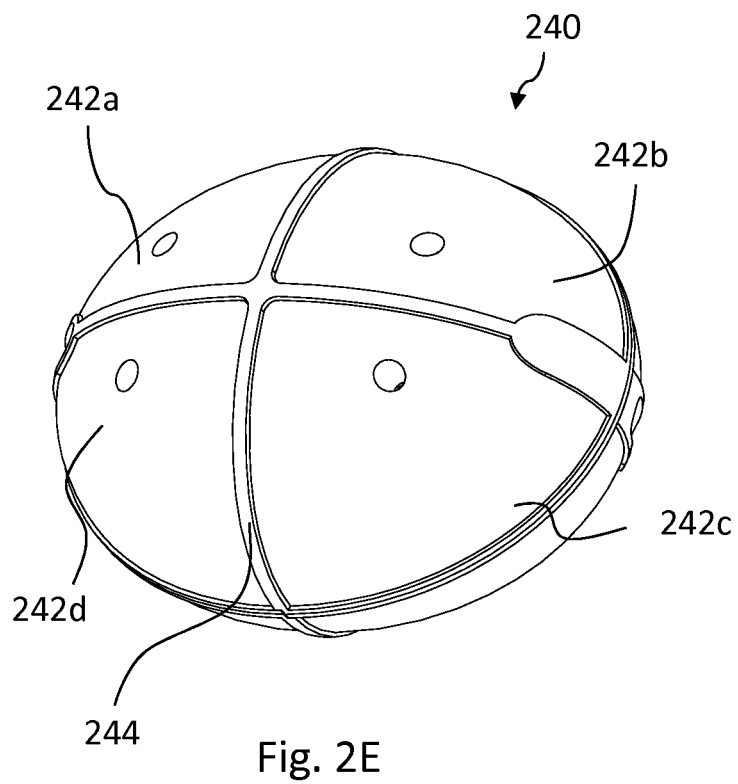
FIGS. 2E and 2F illustrate an ellipsoidal battery unit according to one embodiment in a three-dimensional perspective view and in top view, respectively.
Figure 2F:
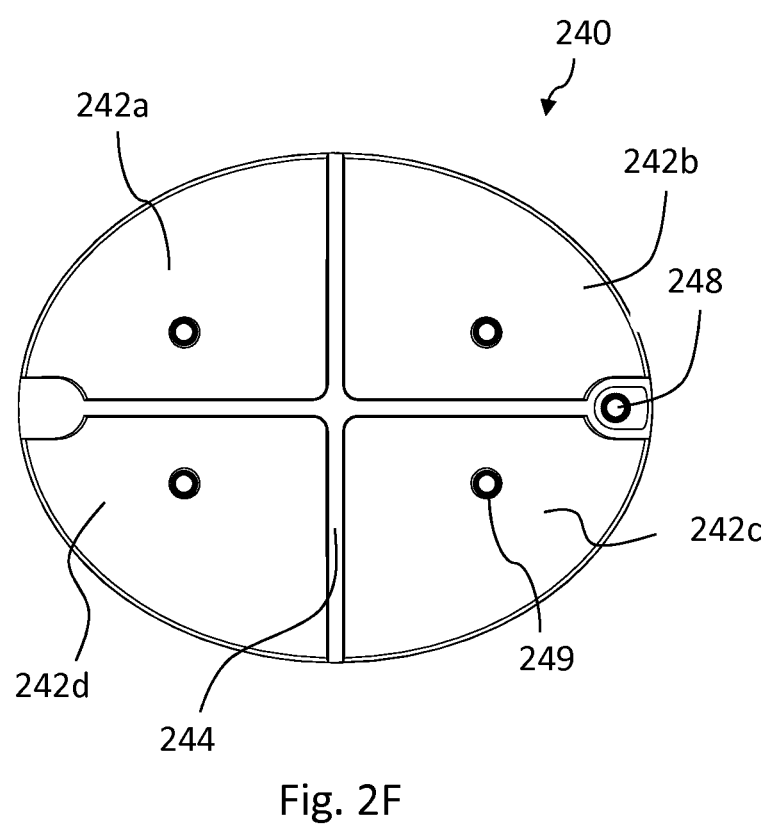

FIGS. 2E and 2F illustrate an ellipsoidal battery unit 240 with eight contact areas (four symmetrically on each half-ellipsoid). Four contact areas 242a-242d are visible in the figures. The contact areas 242a-d are separated by gaps 244, which are herein provided with a ridge of insulating material, preferably the housing material. The half-ellipsoids have been fastened together from attaching points 248 on each end of the half-ellipsoids. The contact areas are connected to internal parts of the housing using conductive vias 249.

A via is an electrical connection between two electrically conductive layers through insulating material. Typically a via is a small opening that is made conductive by electroplating or by inserting a rivet. Vias are typically used in printed circuit boards and integrated circuits. Several injection molded plastic materials can be also plated with conductive metal layer. Plating process can be electroplating or electroless plating. This makes it possible to utilize vias also in plastic part, where both sides of the plastic part are plated and electrical connection between the plated sides is required.

Figure 2G:
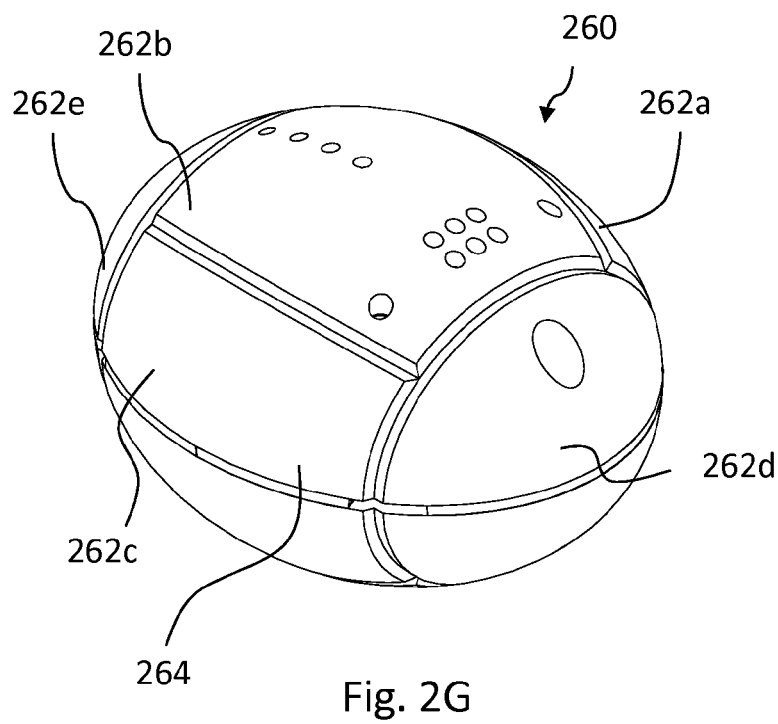
FIGS. 2G and 2H illustrate an ellipsoidal battery unit according to another embodiment in a three-dimensional perspective view and in top view, respectively.
Figure 2H:
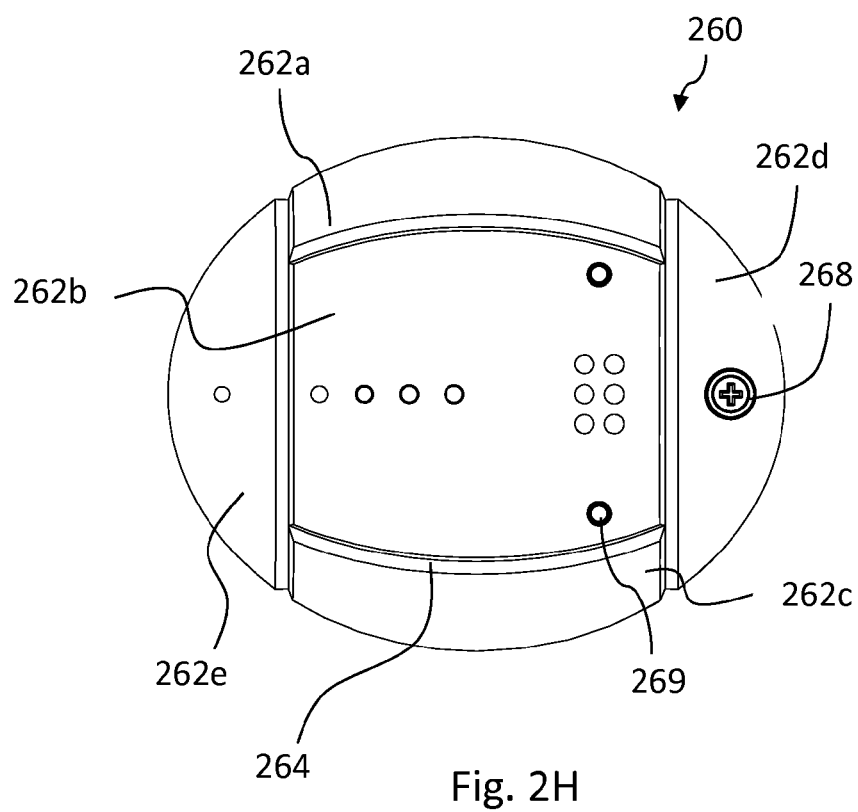

FIGS. 2G and 2H show another ellipsoidal battery unit 260 with six contact areas (four areas symmetrically on a circumference of the ellipsoid and two symmetrically on each end). Five contact areas 262a-e are shown. The contact areas 262a-e are separated by gaps 264 herein shown as grooves. An attaching point 268 is also shown.

Figure 2I:
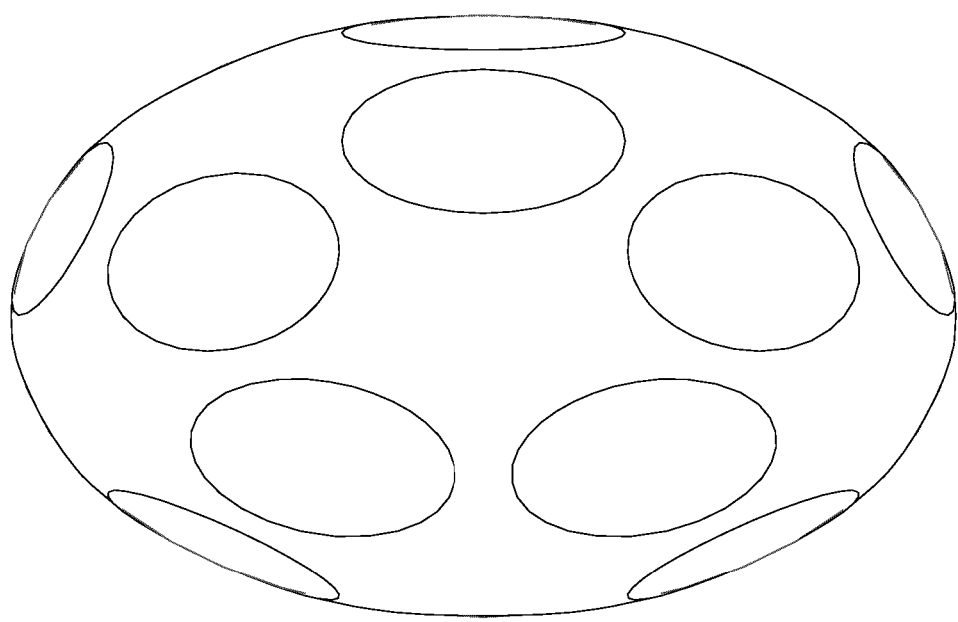
FIGS. 2I and 2J illustrate contact area patterns further an ellipsoidal battery units according to alternative embodiments.
Figure 2J:
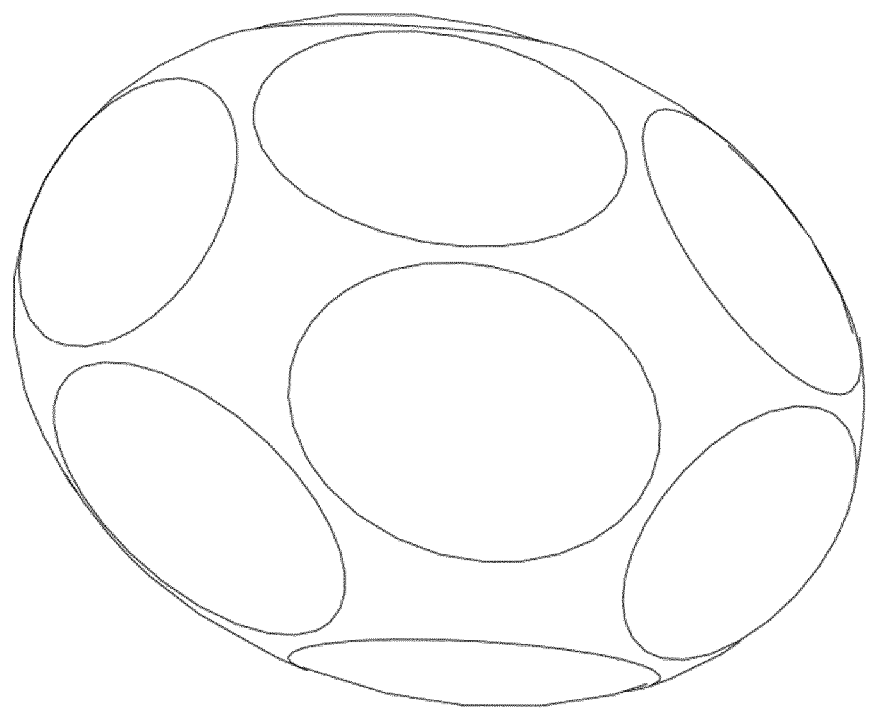

There are also various other fully operative contact area configurations available. FIGS. 2I and 2J further illustrate some examples of the almost endless possibilities of contact area positioning. In these embodiments, there are 10-20 oval-shaped contact areas arranged on different sides of the battery units such that a considerable space remains around the areas. With these configurations too, the possibility of contact area to contact area connection has high probability in random packing. At the same time, the possibility that two different units make a contact with a single contact area is smaller than in embodiments of FIGS. 2G and 2H, for example. The conductive via 269 is used to connect the contact areas to internal parts.

The contact areas can be applied on a surface of the housing with as suitable method, which are known per se. Examples include film or sheet application methods (by e.g. using adhesive, stamping, heat and/or pressure) and direct coating methods. The film or sheet or the coating substance is preferably a metal, such as copper, gold, silver, aluminum, or a metal alloy or metal composite. The film or sheet may be pre-formed to match the shape of the outer surface of the housing or formed during the application process.

Figure 3:
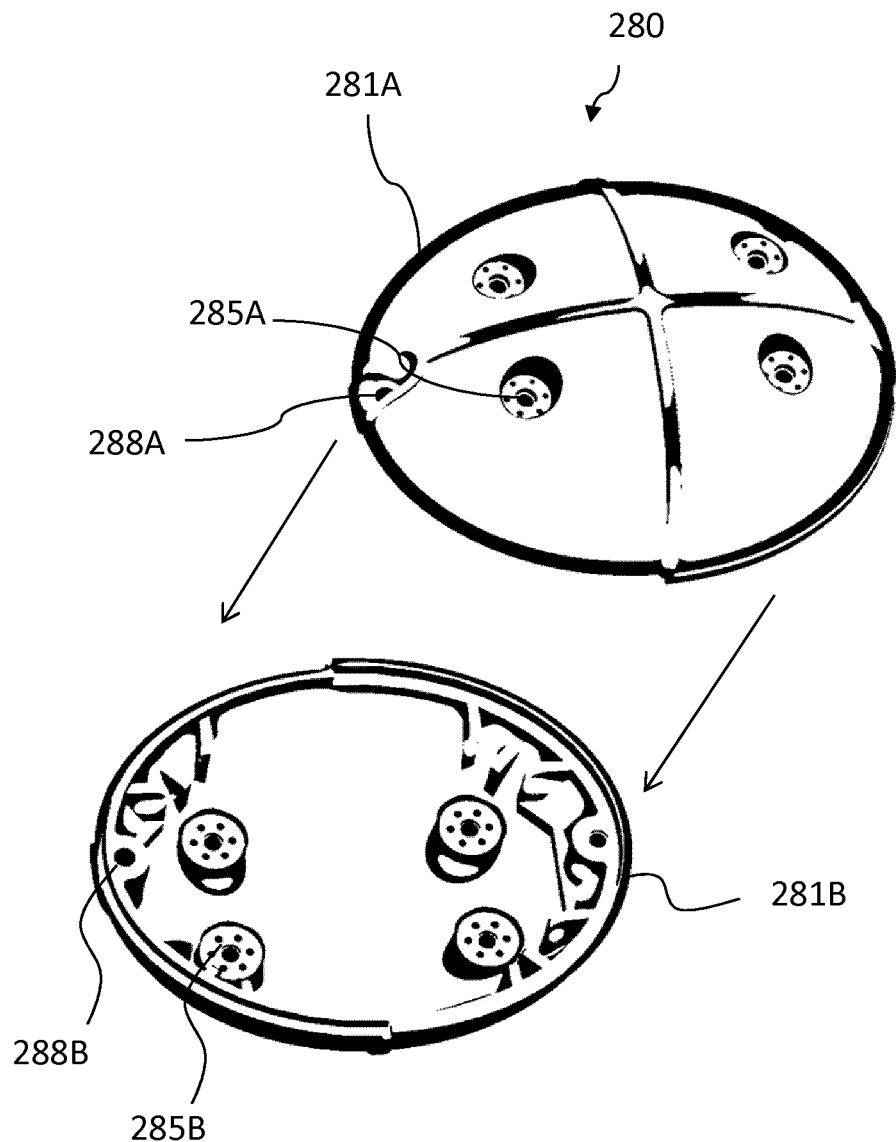
FIG. 3 illustrates an exploded view of a housing of a battery unit according to one embodiment.

FIG. 3 illustrates one possible realization of the housing mechanics and internal structure of the housing for a battery unit 280 having a contact area configuration according to FIGS. 2E and 2F. The housing is formed by two preferably identical hollow half-ellipsoid portions 281A, 281B which are attachable together using screws, glue, ultrasonic welding, potting, moulding or any other suitable attaching means. Attaching can take advantage of attaching zones 288A, 288B designed to the portions 281A, 281B, respectively.

The contact areas are connected to internal parts of the housing using conductive vias 285A, 285B. The vias 285A, 285B may simultaneously act as anchor points for internal members of the battery units, most importantly the energy reservoir and/or a circuit board for its configuration electronics. In this case, the vias 285A, 285B contain apertures through which screws or like fixing members can be assembled. There may be a conductive plating on the inner surface of the apertures or the fixing members may be conductive to form a robust connection between the contact areas and the electronics. In one embodiment, there are snap-on connectors on the inner surface of the housing.

Electrical contacts between the battery units are important for their co-operation. Using hard gold plating on all the electrical contact areas provides a small and stable contact resistance already with small normal force. To give some rough informal and non-limiting values, electrical contact, between gold plated contacts having only 0.4 N normal force, results about 20 mOhm contact resistance. Even smaller normal forces like 0.1-0.2 N are usable. Hard gold is also good in corrosive environments. Wear properties of hard gold are good, giving about 1000 insertion cycles to failure with 1 μm coating thickness. Wear properties can be often drastically improved by usage of lubrication. Another potential coating material is palladium-nickel combined with flashed hard gold surface. For high-volume versions where cost constraints dominate, more cost effective materials, plating and methods are workable, possibly with some trade-offs in performance.

The necessary normal force can be achieved by means of gravity only, using additional pressure subjected to the battery units in the tank or a combination of these. Additional pressure applied also helps to immobilize the battery units in the tank. Pressure can be applied using one or more springs, elastic members, movable members or gas-inflatable members inside the tank or assembled on or as a wall thereof.

Size and Shape (Battery Unit)

The size of the battery units depends on their intended use. The optimal size of the battery units depends on several parameters. If the battery units are to be transferred via a hose or other conduit (to fill or empty a tank), the maximum size is limited by the maximum practical diameter of the hose or conduit. For EVs, as a rough assumption, a battery unit that can be pumped through 5 cm diameter hose could be still practically used. The minimum reasonable size of the battery unit is limited by components, like control electronics, which cost and size remains about constant independent of the battery unit size if the number of the contact areas is the same. When the battery unit size gets smaller, cost per capacity increases and capacity per volume decreases.

The shape of the battery unit can in principle be almost anything. For an optimized design however, several parameters should be considered. Most importantly, the shape has a big impact to capacity per volume. The container could be filled with the battery units by pumping or pouring. As a result, the battery units are mostly randomly packed in the container. Every geometrical shape has its own typical fill ratio range. Fill ratio is a parameter used to characterize the maximum volume fraction of the objects obtained when they are packed.

According to one embodiment, the battery unit has a smooth shape, i.e. a shape without sharp corners or edges. According to a specific further embodiment, the shape is free from flat surfaces. Such shapes are typically entirely convex, like an ellipsoid or sphere.

According to one preferred embodiment, the battery unit has an ellipsoidal shape. This allows for high random fill ratio and stable positioning of individual battery units in a container. One of the densest known random fill ratios, with a number of about 0.74, is a particular type of ellipsoid, with semi-axes of 1.25:1:0.8. For this ellipsoid, random fill ratio is also very close to the densest known possible fill ratio, making it a good candidate for battery unit shape. At the same time, the fill ratio is low enough to allow the use of a gas or liquid between the battery units for cooling the container and the battery units. The term "ellipsoid" herein means a true ellipsoid, i.e., at least one of its semi-axes has a different length than the two others.

According to one embodiment, the battery unit has spherical shape. For a sphere, the fill ratio is in the range from 0.56 to 0.64. Typically a fill ratio of 0.56 can be achieved when the spheres are poured to a container. A fill ratio of 0.64 is achievable after extensive agitation, like by shaking the container. On the other hand, if spheres are manually placed to the densest possible packing, 0.74 ratio is achieved. The large difference between the densest possible packing and typical random packing means that although being possible, the spherical shape is not the best for the battery unit, because random packing leaves lot of potentially "loose" battery units, which are not stationary during the operation in the container. Additional and unique drawback of spheres is that the shape does not lock to any of its rotational freedoms. It is therefore preferred to use a shape having always at least one rotational freedom restricted or entirely locked when randomly ordered in a large container.

Surface finish and surface friction rates of the battery units also affect the fill ratio to some degree. Smoother surface and less friction generally result in better fill ratios. Also, the shape and the size of the container compared to the size and the orientation of the battery units affects the fill ratio. The closer the battery units are to the typically flat walls of the container, the less likely they are to be randomly oriented because of the effect of the wall. Consequently, in larger containers, more battery units are fully randomly oriented, resulting typically better fill ratios.

Another important parameter is the energy reservoir fill ratio inside the battery unit. Shapes like cylinder and rectangular box would be ideal shapes as far as this parameter is concerned, because these are typical existing shapes of electrochemical battery cells. For general ellipsoid, good energy carrier fill ratio can be achieved by using the so called "jelly roll" cell design for lithium batteries, allowing efficient use of space available for the cell in the battery unit. Jelly roll design is known per se and presently used for rechargeable batteries. In the design, an insulating sheet is laid down, then a thin layer of an anode material is laid down, a separator layer is applied, and a cathode material is layered on top. Then those are rolled up for example into form of cylinder. By using other forms than rectangular for the layers, it is possible to have different forms for the cell.

A further important shape-related parameter is the average number of contacts between the battery units in random order. More mechanical contacts between the battery units mean more potential working electrical contacts between the battery units, which allow more possibilities to form the strings. Also, more mechanical contacts between the battery units will help keeping the battery units stationary during the operation. According to a preferred embodiment, the shape of the battery unit is chosen to provide at least 5, preferably at least 9 contacts in average with other battery unit in random order. For example randomly packed spheres have around 6 contacts, while the preferred ellipsoid (1.25:1:0.8) is found to have even 11 contacts on average.

Still another important shape determined parameter is the curvature. On high curvature areas it is beneficial to have small electrical contact shapes or avoid them completely to minimize the number of the battery units, which form a connection with the same electrical contact area.

A relevant shape determined parameter is also the maximum outer dimension of shape per volume of shape. Big values lead to small sized battery units increasing the system cost and decreasing the system capacity per volume. As far as only this parameter is concerned, sphere is the most optimal shape. The preferred ellipsoid form is also relatively good.

Finally, an important shape determined parameter is also the deviation in cross sectional area in different orientations: less deviation means more even speed and less probability for clogging while pumped through a hose or conduit. A sphere, which has zero deviation, would be an optimal shape for pumping, but ellipsoids can also be well pumped. Shapes that would stack to each other should be avoided in pumping applications. Sharp corners in shapes should also be avoided because of excessive wear and problems while pumping.

Electronics (Battery Unit)

The battery unit includes, preferably within the housing, necessary electronic components and connections for controlling the connection configuration of its contact areas, for discharging and charging the energy reservoir, and optionally for monitoring the state of the battery unit and for communicating with an external control unit monitoring and connection programming information.

Most importantly, the electronics includes necessary switching logic defining contact areas are connected to the terminals of energy reservoir and optionally which contact areas are functioning as bypass routes.

According to one embodiment, the battery unit includes a microprocessor, such as a microcontroller, a clock oscillator, memory, communication circuitry, monitoring circuitry, power supply circuitry, switching circuitry. In addition, depending on its functionalities it may include one or more of the following: charging circuitry, over-current protection circuitry, and circuits for bypass buses. The memory may include flash, EEPROM and/or RAM.

The internal functions and communication functions of the battery unit are preferably powered by the energy reservoir. However, there may also be provided a separate power source, such as a coin battery or the like small power source, for providing the necessary electricity for these functions. The separate source may also be arranged to be used only if the main energy reservoir of the battery unit is completely depleted.

To avoid unwanted paths and connections, over-currents and the like problems during random filling of a container, the terminals of the energy reservoir are preferably disconnected from the contact areas. Only once the filling has been completed, a battery unit connects the terminals of the energy reservoir based on viable routes towards the load, established by communicating with peer battery units, a centralized control unit, or both.

Transmission part of the communication circuitry is used for sending messages out from the battery unit, to other battery units or to the central management unit. Receiving part of the communication circuitry is used for reception of messages.

Monitoring circuitry preferably measures the voltage, current and temperature of the energy reservoir, current and temperature. In addition, it may measure the voltage of each contact area referenced to a virtual ground point of the battery unit. These voltages correlate directly to the current floating through the contact areas of the battery unit. The monitoring circuitry may also track battery health, number of cycles, and how it behaves against an expected wear curve for the particular energy reservoir in question. Internal memory of the battery unit can be used for storing temporary or permanent monitoring data.

The communication circuitry is typically used for sending and receiving messages to and from an external central control unit of a tank. This is typically achieved through conductive contact surfaces on the inside wall of the tank and contact areas of the battery units, but also other methods such as light pulses in the infrared or visible spectrum, or radio frequency induced, or wireless communication are possible.

Individual battery units may in a specific configuration thereof have their contact areas connected to each other through resistors in a star pattern, which can be taken advantage of if a galvanic communication method is used. To facilitate pass through of data, if a large number of the battery units are present in a container, most of the battery contact areas are connected to other contact areas through relatively high impedance resistors forming a resistor network. When one battery unit applies a voltage on one or more of its contact areas, while grounding one or all of the remaining contact areas to its internal ground, it will induce a current through some or many of the other battery units and the resistors connected to the contact surface on the inside of the tank. This induced current can likely be measured by some or all of the other battery units, and by the control unit. By using modulation techniques, such as on-off keying, or any other, data can be transmitted and received by other battery units and the control unit.

In order to maximize the probability that the induced currents for communication are large enough, to be measured with a sufficiently large signal to noise ratio, an elevated voltage level could be desirable. Battery units and the external control unit may generate a higher voltage using a power supply that can be switched off during periods when no communication is needed.

Most to all of the above functions can be implemented into an application specific integrated circuit, or ASIC, yielding the lowest possible component cost in volume, in addition to being footprint optimal. The semiconductor technology chosen depends on the required performance in certain areas: power consumption, switching losses, any needed RF circuitry, analog performance, amongst others.

Electronics Example (Battery Unit)

Next, a specific non-limiting example of battery unit electronics is described to illustrate how the invention can be carried out in practice.

Figure 7:
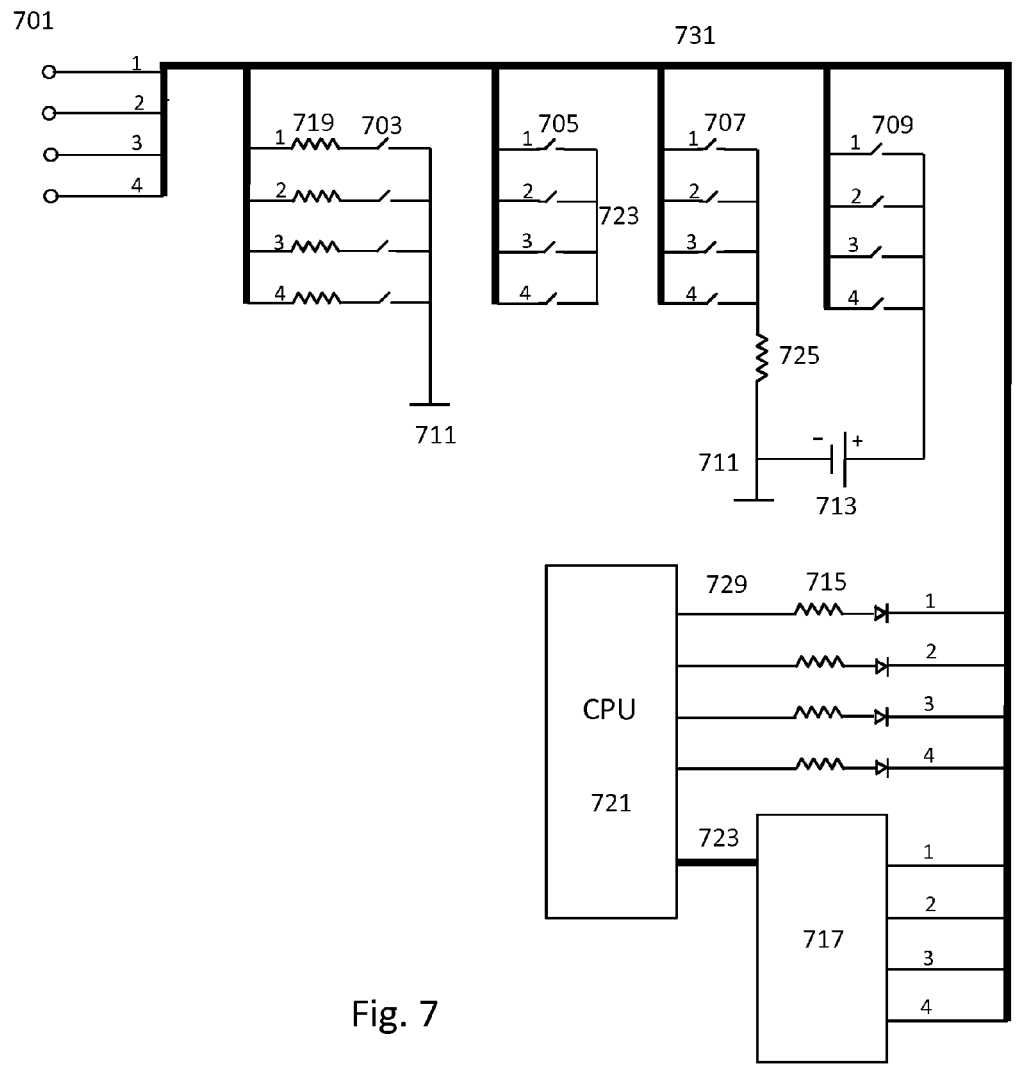
FIG. 7 illustrates an exemplary circuit of the battery unit as block diagram.

FIG. 7 shows a block diagram of the battery unit which contains 4 contact areas 701. The battery unit is managed by a CPU 721, such as a microcontroller. Clock oscillator(s) (not shown) are connected to the CPU and are used for timekeeping. There may for example be two clock oscillators: a higher frequency crystal for high speed operations and timing, and a lower frequency crystal for timekeeping in low power sleep mode. Each contact area 701 is connected separately via connection bus 731 to the other units described below.

The battery unit has an optional bypass mode, in which any contact can be connected to any other contact and pass signals and power. CPU controls the bypass connectors 705. It is possible to connect any contact to bypass bus 723 by switching connectors 705 on/off. The battery unit can include also include more than one bypass bus, buses are independent from each other. The bypass switches can utilize MOSFET technology, for example.

Data is received by the battery unit through the measurement and data receiver unit 717. The measurement and data receiver unit 717 includes a comparator per each contact. The comparator receives on one terminal a reference threshold voltage, which is produced by the CPU. On the other terminal is a (divided) contact voltage. In low noise environments, the threshold can be set very low and the battery unit can receive very small signals. In a high interference environment, the threshold can be set as high as needed. Noise immunity improves, but at the cost of sensitivity. The output 723 from the comparators is fed into the CPU and decoded as needed.

The measurement and data receiver unit 717 can include also, e.g. a temperature coefficient resistor or any other type of temperature sensor to enable to measure the temperature of the battery unit. The unit includes also the energy reservoir current measurement circuit, which optionally amplifies the voltage drop over the shunt resistor 725, which is then sampled by the measurement and data receiver unit 717. The unit also measures various voltages and tracks the energy reservoir state of charge.

Each contact 701 can be connected via a resistor 719 to the virtual ground point 711 ("star point") of the battery unit. This allows for a star network inside the battery units through which all the battery units can communicate. Unless circuitry is employed that allows disconnection of the resistors, some power is dissipated under certain conditions. Such conditions could be when the energy reservoir is connected to certain contact areas, and when the battery unit transmits data. The power levels, however, are negligible if such resistor values are chosen suitably. The voltages measured over the resistors 719 are a function of the current flowing through the contact, and this information is used for routing and other purposes. The voltages are measured by the measurement and data receiver unit 717.

In order to transmit data from the battery unit, an uplink voltage is fed into the most appropriate contact area 701 from the CPU via lines 729. Optionally data can be transmitted using several contact areas 701. The resistors 715 limit the current. The data format and coding can be one of many, e.g. standard serial data, PWM or PPM methods. Typically, many or all other contact areas could be connected to the virtual ground point 711 of the battery unit using switches 707 and benefit the signal strength on the receiver side.

The negative terminal of the energy reservoir 713 is connected to one of the contact areas via shunt resistor 725. The CPU controls the switches 707 to determine to which contact area negative terminal is connected. The positive terminal of the energy reservoir 713 can be connected to a one of the contact areas by switching on/off switches 709.

The battery unit can include several power supplies (not shown) e.g. for providing reference supply, standard low dropout regulator and boost supply which can be used to fully activate MOSFETS and to provide a higher voltage to enable stronger transmit signals.

It should be noted that the above example is intended to illustrate the principles of implementation of a battery unit and there are various other ways of implementing the functions of the battery units.

In practice, most or all of the components and wrings discussed may be integrated into a single custom chip, allowing considerable reduction in cost and size compared with separate components.

The battery unit may rest for a certain time period in each cycle, meaning that it does not deliver power or communicate during that period. When the tank is filled with the battery units, the control unit starts the synchronization process. The control unit sends first wake-up signal to the battery units so that the battery units are prepared for the communication. After that the control unit sends synchronization signals: based on the synchronization signals battery units can synchronize the internal clock. This enables that, e.g. all the battery units in certain string delivers power at the same time, e.g. 90% of time and rest of the time 10% is reserved for the communication. Synchronization process can be repeated periodically during the operation. According to one embodiment, the battery unit is capable of being driven into several separate power states, e.g. a low power consumption state (resting state) and high power consumption state There could be several power states (sleeping states) between these two states which are used during normal operation to minimize the power consumption, e.g. there is no need to power everything on in CPU when there is no communication between the control unit and the battery unit. In high power consumption state the battery unit delivers power to outside of the battery unit. In the sleeping state(s), the battery unit is capable of communicating, and changing its configuration. In the resting state, the internal functions of the unit are at minimum, the battery unit still being capable of waking up upon receipt of a wake-up signal typically through the contact areas. The battery unit goes to the resting state to prevent damaging the energy reservoir, e.g. if the cell voltage is low which is monitored periodically.

Environmental Aspects (Battery Unit)

The present battery units can be designed from the onset with minimal environmental impact in mind; maximum recyclability is a primary objective. Raw materials, such as housing plastics, lithium battery cells, silicon, metal wiring, etc. can be chosen to allow for as close as possible to 100% of recycling. Additionally, the recycling methods chosen allow for low-maintenance and low-threshold recycling methods, such as shredding. Material separation, recovery, and re-use or recycling can reach very high levels and be performed using simple methods, after which practically all material can be used for the production of new battery units or other products. Also, because for each battery unit, its history, ownership, usage pattern etc. could be uniquely identified throughout its lifecycle, only battery units at the actual end of their economic lifespan are recycled. Additionally, if battery units were not to be recycled and to end up in a landfill or elsewhere in the environment, they are almost completely non-toxic and of no impact to living organisms.

The energy reservoir in the battery unit can be replaceable and the identification and/or history data of the battery unit at least partly rewritable or erasable such that the same housing and electronics can be used again with a fresh energy reservoir once the previous one has degraded too much. The contact areas may also be re-plated if worn.

Other Aspects (Battery Unit)

Battery units providing a random fill ratio of less than 100%, in particular less than 80%, can be cooled, if needed, by allowing air or other gas to flow between the units. Thus, a certain amount of cooling for components dissipating power or that are otherwise temperature sensitive can easily be provided. The battery unit can be used in an environment optimized for certain requirements, whereby controlled circulation of air, or any other gas or coolant, between the units can be employed.

The battery units herein described withstand typical working environments, including physical stresses induced by filling and emptying the battery unit container, or by mobile use of the device it powers. Typical environmental stresses include static and dynamic stresses, vibration, shocks, wear, temperature cycling, humidity, dust and corrosion.

Electric Tank

The electric tank herein described enables the formation of one battery from plurality of the battery units which could be randomly packed inside the tank in common space where there are no exact position or compartments for battery units. The space may have a regular form, such as rectangular form, but may as well be non-rectangular or irregularly shaped.

The tank can be emptied partly or fully and re-filled quickly with partly or fully charged battery units from another container using cost-effective methods. Thus, a user can "refuel" a BEV in about the same time as cars using a combustion engine and filling resembles the familiar process of filling up vehicle with motor fuel. The tank can be also charged by plugging in the vehicle, without removing the battery units.

The tank described herein can be used as a source of power for EVs. It can be used in a PHEV or BEV. In an EV, the tank can hold hundreds, thousands or even tens of thousands of units simultaneously, but it is equally suitable for small electric devices using only a few battery units, such as power tools. Indeed, in addition to EVs, the invention has also many other potential applications, where rapid and easy replacement of electrical energy or electrical energy storage units is desirable—typically cases where devices are predominantly mobile and using a power cord is inconvenient or impossible.

The tank described herein is not limited to use as an energy source for a load, such as in the case of EVs, but can be used as a recharging tank too. Such recharging tanks can be used, e.g. at service stations for storing and recharging used battery units emptied from EVs tanks. A tank can also have both functionalities, i.e. electric supply and recharging functionalities, like tanks of EVs preferably do.

Overview (Tank)

The operation and configuration possibilities of an exemplary tank are illustrated below by means of an example.

Figure 4:
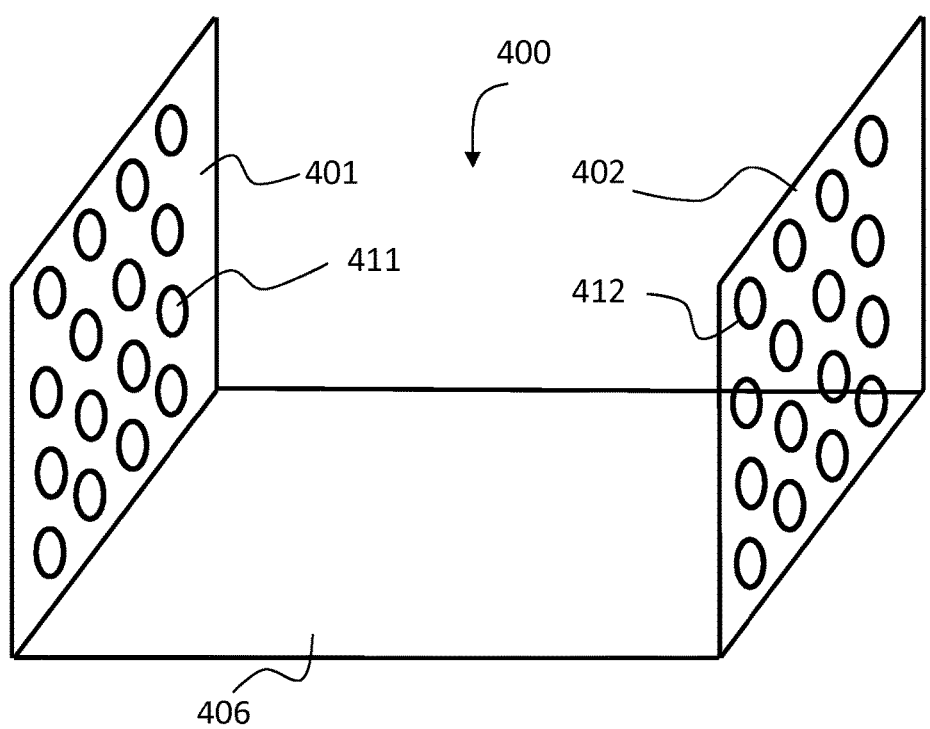
FIG. 4 shows in a schematic perspective view a contact surface configuration of an electric tank according to one embodiment.

First, FIG. 4 shows a schematic tank 400 with a container 406 (front, back and top walls not shown). The container has two opposite walls serving as contact plates 401, 402 for battery units (not shown) placed inside the container 406. Each contact plate 401, 402 comprises a plurality of contact surfaces 411, 412 (in this case sixteen) capable of individually contacting contact areas of battery units. In general, the number of contact surfaces in a plate may be, any number, but tanks of larger capacity will typically have more contacts. The contact surfaces 411, 412 need not necessarily be arranged into two groups as herein shown but this arrangement is advantageous because separate switching logic units can be provided for each plate, as will be described later in more detail. On the other hand, there may be more than two plates (and switching logic units). The number of plates can be 1-8, preferably 2-4. Placement of the plates on opposite walls of the container is also not necessary. However, the illustrated placement symmetrically on opposite walls of the container ensures equal average contact forces between the battery units and the plates 401, 402. Plates do not necessarily need to be rectangular or flat surfaces, but can be shaped in any form if tanks are of a particular non-uniform shape.

The sizes, forms and placements of the contact surfaces are designed such that the probability that the contact areas of battery units randomly filled to the tank make electrical contacts with the contact surfaces is high. Of course, this depends on the design of battery units too. It may for example be desirable that at least 10% of the battery units that come into physical contact with tank walls are also in electrical contact with a contact surface, or that 50% of battery units that come into physical contact with the contact plates make an electrical contact with a contact surface of that plate.

Figure 5A:
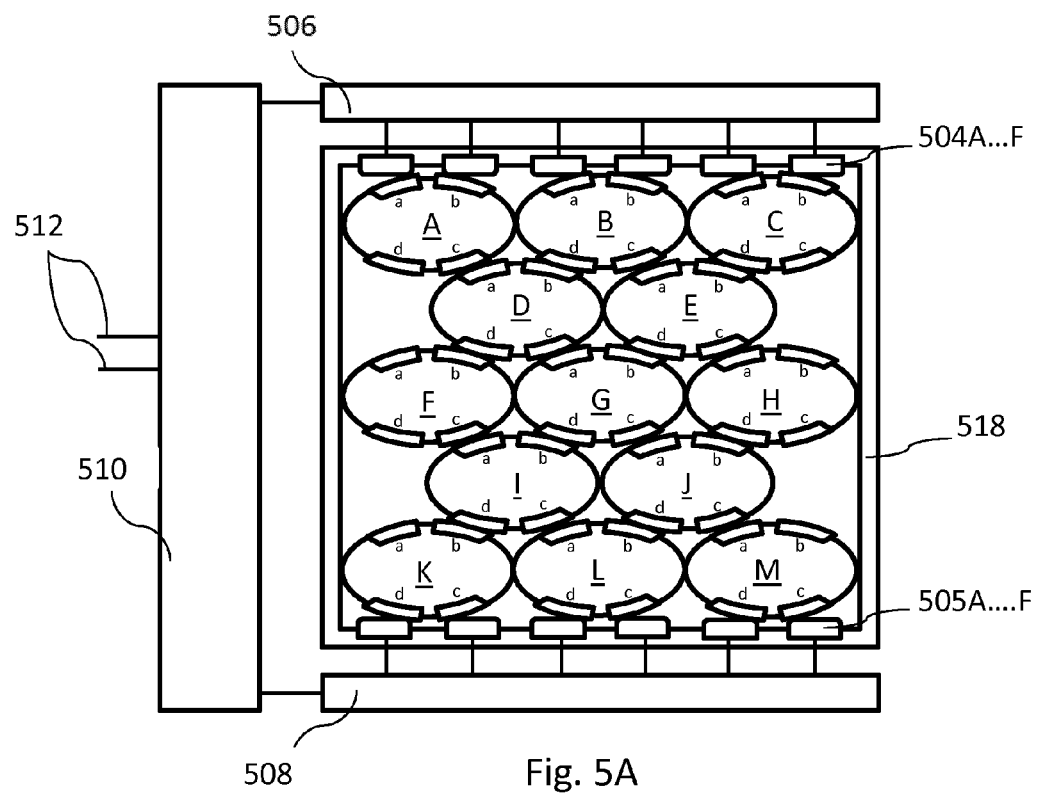
FIGS. 5A and 5B illustrate a block diagram of a non-randomly packed electric tank in a two-dimensional cross-sectional view.

FIG. 5A illustrates in a two-dimensional schematic view an electric tank comprising several battery units of kind described above. The tank provides electricity out from outlets 512 (+) and (−). There are 13 battery units A, B, C, . . . M inside a battery unit cavity 518 of the tank. Although herein illustrated in well-ordered configuration for simplicity, the battery units are in practice typically randomly or essentially randomly packed inside the tank. Each battery unit has contact areas a, b, c and d (in clockwise order starting from top left in FIG. 5A). The tank has two sets of contact surfaces 504A-F, 505A-F. Contact surfaces 505A-F are connected to tank switching logic 508 and contact surfaces 504A-F to tank switching logic 506. The tank switching logics 508 and 506 are connected to main switching logic 510. The switching logics 506, 508 and/or 510 can send commands to battery units to modify the polarity of the contact areas a, b, c or d or to disconnect or short circuit those in arbitrary manner, as described above in connection with the battery units.

To be able to program the battery units, the control unit of the tank needs to discover which battery units are present in the tank and how they are connected with other battery units and the contact surfaces of the tank. In a simplified exemplary process, the discovery can start by configuring all contact surfaces to have resistivity R between them. Then a current I would be fed from one, e.g. the leftmost contact surface 505A of contact surface set 505A-F to contact surfaces 504A-F. Thus, contact surface d of battery unit K is in contact with the contact surface 505A. Based on ohms law the current in battery unit K between contact areas b and d would be largest of all possible contact pairs in the system. Then using a communication protocol, the control unit can request current information from each of the battery units A-M. The battery unit/certain contact area of the unit with largest current and with certain direction of the current (as same current if going through b and d) would be determined to be in contact with contact surface 505A: the same procedure can be used to determine which battery unit/ contact area is connected to contact surface 505B by feeding the current I from contact surface 505B to contact surfaces 504A-F. By connecting contact area d to contact area b of the battery unit K and by feeding current I from contact 505A to contact surfaces 504A-F the biggest current is flowing via contact area d of the battery unit I, and this information can be used to determine which battery unit/contact area is connected to the contact K/b etc. . . . until the relative location of each battery unit would be found, though it is not needed to know all the locations for forming strings.

The battery units can, after discovery, be connected in various different ways to correspond with different needs, e.g. depending upon what is the preferred output voltage or output power. In an example, each battery unit of FIG. 5A has an energy reservoir having the voltage of X volts. One way to form the string is that energy reservoirs are configured so that positive terminals are connected to contact area b for the battery units K, F and A; positive terminals are connected to contact area a for the battery units I and D; negative terminals are connected to contact area c for the battery units K, F and A; negative terminals are connected to contact area d for the battery units I and D. This way battery units K, I, F, D and A form one string between contact surfaces 505B and 504B with five energy reservoirs connected in series. Output voltage of the string would be 5*X volts. This string is shown as a dashed curve in FIG. 5B.

Another string could be formed, e.g. using battery units L, J, G, E, B between contact surfaces 505D and 504D, output voltage of the string would be also 5*X volts. This string is shown as a dash-dot curve in FIG. 5B. Strings could be combined in power combiner to form one output. There is, however, no need that the output voltages of the strings are the same to enable to combine those.

Some of the contact areas of the battery units A-M or contact surfaces 504A-F, 505A-F of the tank can be also in bypass mode in the string if, e.g. energy reservoir is faulty, not all available power is needed, or a long string is to be formed. For example, a longer string can be formed, e.g. by connecting the battery units K, I, G, D and B in series between contact surfaces 505A and 504C, the battery units C, E, H, J and M can be connected in series between contact surfaces 504F and 505E. By further connecting contact surface 504C to contact surface 504F, a string including ten battery units between contact surfaces 505A and 505F can be formed. This string is shown as a solid curve (alternative to other curves) in FIG. 5B.

Figure 5B:
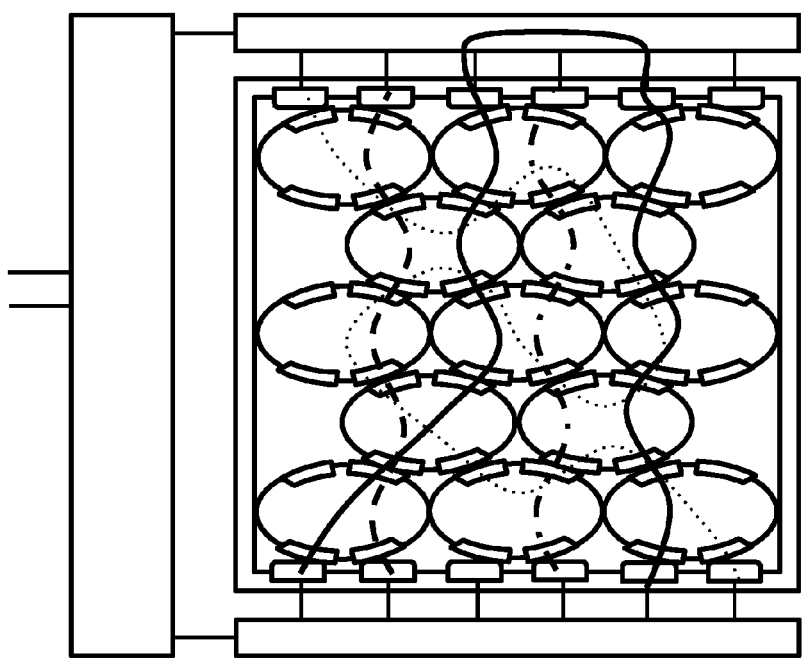

Another exemplary long string between contact surfaces 504A and 505F, employing bypassing in some of the battery units, is shown as dotted curve in FIG. 5B (again alternative to other curves shown). When the curve goes through a battery unit for the first time its energy reservoir is connected in series and when it goes through the same battery units for the next time, the respective contact surfaces are short circuited with each other to achieve a bypass connection. Thus, a continuous energy path is formed.

To be able to individually program each battery unit in a desired way, each unit preferably has unique identifier, as explained above.

Next, preferred properties and operation principles of the tank are described in more detail.

Physical Aspects and Filling (Tank)

The tank comprises a container defining a cavity for containing a plurality of battery units. The size and form of the container can vary broadly. The wall material of the container may be uniform or meshed, as long as the battery units cannot easily escape the container and the wall is sufficient to support the contact surfaces.

Typically, the container comprises an opening, preferably a closable opening, through which the battery units can be inserted to and removed from the container for filling and emptying the tank. There may also be separate openings for filling and emptying. For example, there may be a removal opening in the bottom of the container and insertion opening on top of the container.

Filling and emptying the tank can be done using various methods, such as gravity, over- or under pressure or gas stream. According to one embodiment, an air pump is used to create an overpressure or partial vacuum capable of moving battery units to or from the tank. In particular, quick emptying of the tank can be done by a partial vacuum which sucks used battery units from the tank away to another container, such as a recharging silo. Emptying purely or partly by gravity is possible too, if there is an opening at the bottom of the tank. Quick refilling can be done for example using a pressure or gas flow transfer along a hose or by pouring the battery units from an opening on the tank. Change of the battery units can be done manually also.

The tank need not be filled completely, provided that at least some of its contact surfaces still come into contact with at least some battery units. There may also be a minimum power requirement. Thus, in practice there is a predefined minimum number of battery units required. The minimum can be for example 10-90%, typically 20-50% of the maximum number of battery units. Thus, the size of the battery pack can be adjusted and optimized for various needs. For example in the case of EVs, a user can fill the tank fully only when there would be need for maximum driving range. On the other hand, if a typical daily driving range is only tens of kilometers, the user does not need the maximum number of the battery units. This makes the EV lighter and more efficient. Certain provisions may be necessary to restrict physical movement of the battery units in the tank. One possibility to achieve this is to fill the empty space of the tank with empty battery units that do not include the power source but might still have full, partial or no intelligence built in.

The filling and emptying system of the tank can be designed to be either open or closed, i.e. allowing gases to enter and exit the battery unit cavity or making it gas-tight, if not hermetically sealable. An open system is simpler than a closed system, but as a drawback, in open system the battery units are exposed to ambient air and possible contaminations. It is preferred that the tank provides environmental protection for the battery units at least against dust, water and other contaminants. It can additionally be designed to be air-tight at least during operation.

For practical reasons, the emptying and/or filling process should be a quick operation, resulting that battery units are moving at relatively high speeds. For this reason, the filling and emptying system should be designed to avoid excessive collisions between the battery units and the tank. When filled, a tank must be able to pack the battery units tightly, generating enough normal force for the most of the connections between the battery units and between the battery units and the tank. This enables to have stable and low resistance electrical contacts. The tank maintains at least most of these normal forces, keeping the battery units stationary within typical working conditions that can include several environmental stresses like thermal cycling, dynamic and static loads, vibration and shocks.

Thus, non-complex shapes such as cylinders, cuboids, spheres, semi-spheres, cones or combinations thereof are preferred shapes of the cavity.

The tank preferably provides good enough cooling to dissipate the heat generated by battery units and electrical contacts between the battery units and the tank. For example for several battery cell chemistries, the preferable operating temperature range can be quite narrow, like −20° C. to +50° C. for typical lithium-ion cells.

Battery unit cooling in the tank can be implemented in several different ways. The maximum random fill ratio of the battery units in a tank is typically around 70%. This means that there is always about 30% void in a tank that can be used to circulate cooling fluid, typically air or cooling liquid. Cooling area per battery capacity is inversely proportional to battery unit size. Because the optimal battery unit size is relatively small, excellent cooling area to battery capacity ratios can be achieved. To avoid tank contamination, internal fluid circulation and heat removal from heat transfer fluid via some type of heat exchanger is preferred. Fluid circulation can be improved by using a pump, fan or blower, depending on the fluid type and construction used. The cooling arrangement is preferably entirely passive, utilizing passive heat transfer through tank walls and gas convection within the tank.

According to one embodiment, there are provided active means, such as a fan, for circulating of flowing gas within the tank and/or in and out of the tank to provide more efficient cooling.

According to one embodiment, there are provided active means for circulating a cooling fluid, such as liquid, in a closed fluid circulation system to provide more efficient cooling.

The fill ratio of the tank can be improved if the tank is agitated after filling. The improvement in fill ratio this way can be several percentages, depending at least on type of the agitation applied, shape of the battery unit and friction of the shell of the battery unit. Also after the agitation there are less loose battery units in the tank that could move during the operation which could cause that some connections between the battery units break which might have effect to the programmed energy paths and there would be a need for rerouting. Agitation can be achieved many ways, for example by vibrating the tank or some parts of it. Another possibility is to use an air pump for agitation by changing the flow direction rapidly several times.

According to one embodiment, the tank comprises integral means for agitating the battery unit container.

According to one embodiment, the tank is capable of providing and maintaining a static overpressure (in relation to the pressure caused by pure gravity) between the battery units. Using such means, after filling and potential agitation and before operation, an additional static pressure can be applied to the tank to increase normal forces between the contact areas of the battery units and between the contact areas of battery units and contact surfaces of the tank. In addition, if the static pressure is large compared with the forces of gravity, the normal forces will be more uniform between different contacts. Applied pressure also improves the ability of the system to withstand vibration and shocks during the operation.

According to one embodiment, the tank comprises one or more mechanical springs capable of causing the static pressure. According to another embodiment, the tank comprises an elastic member, which can be pressed against the battery units after filling. According to a further embodiment, the tank comprises a gas-inflatable member, which can be pressurized with gas after filling the container in order to cause the static pressure.

According to one embodiment, the battery unit container itself is designed to be at least partly elastic or flexible, thus allowing slight "overfilling" of the tank (in relation to its resting volume). Resulting deformation and elastic forces will cause the static pressure between the battery units and tank walls. Elastic design also makes easier applying and maintaining of static pressure easier by external means.

System Elements and Electronics (Tank)

On the inner wall of the container, there are a plurality, i.e. at least two, contact surfaces that are positioned such that at least some of them necessarily come into contact with the battery units. The contact surfaces are used to deliver power form the battery units to an external load, or to the battery units for recharging their energy reservoirs. The total number of contact surfaces is typically at least 4, in particular at least 8, and typically at least 16. The number may be e.g. 16-128. The theoretical maximum number of individual parallel strings, i.e., electrical energy paths through the tank is half of the number of contact surfaces, since the strings typically start from one contact surface and end to another contact surface. The contact surfaces may be divided into two or more groups partly controlled by separate switching logic units.

The contact surfaces are preferably configurable such that each contact surface may be in a disconnected (high-impedance) state or defined as a positive or negative terminal. Optionally, the contact surfaces may be grounded and/or provided with a predefined voltage. There is provided a corresponding switching circuitry, so-called switching matrix, connected to the contact surfaces and connected or connectable to a control unit, also called a tank management unit. The control unit is typically also capable of transmitting programming signals to the battery units through the contact surfaces.

According to one embodiment it is also possible to connect a contact surface to another contact surface using the switching circuitry for forming a low-resistance connection between the contact surfaces. By this arrangement it is possible to have a string which starts for example from one contact surface and after a number of battery units reaches a second contact surface which is internally connected to third contact surface from where the string continues again via battery units until it reaches a fourth contact surface. Thus, the strings need not end once meeting a contact surface but may continue through another contact surface.

According to a preferred embodiment, the contact surfaces are separated into two or more arrays comprising a plurality of contact surfaces each. For example, each array may comprise at least two, preferably at least four individual contact surfaces. The arrays may be placed on different inner walls of the battery unit container. In a typical case the contact surface arrays are placed on opposite sides of the tank, as shown in FIG. 4. Here each contact array includes 16 contact surfaces.

According to one embodiment, the tank comprises a control unit herein called a tank management unit (TMU) and at least two switching matrixes (SMXs) functionally connected to the TMU and to groups of contact surfaces of the tank. In a preferred embodiment, there are also at least two power buses for delivering energy to or from the SMXs and a power combiner for combining the power delivered by the power buses. In addition, there may be user interface means for allowing a user to control the TMU and/or for visualizing the operation and/or charge level of the tank. The tank can also include an extra energy reservoir to supply energy for some time if the supply of power is temporarily interrupted.

The TMU monitors and controls the battery units, the strings, the SMXs and the power buses. The SMXs are used for connecting the strings to the power buses and a communication between the TMU and the battery units happen via the SMX.

The power buses are used to connect several strings to external positive and negative electrical connections.

Figure 8:
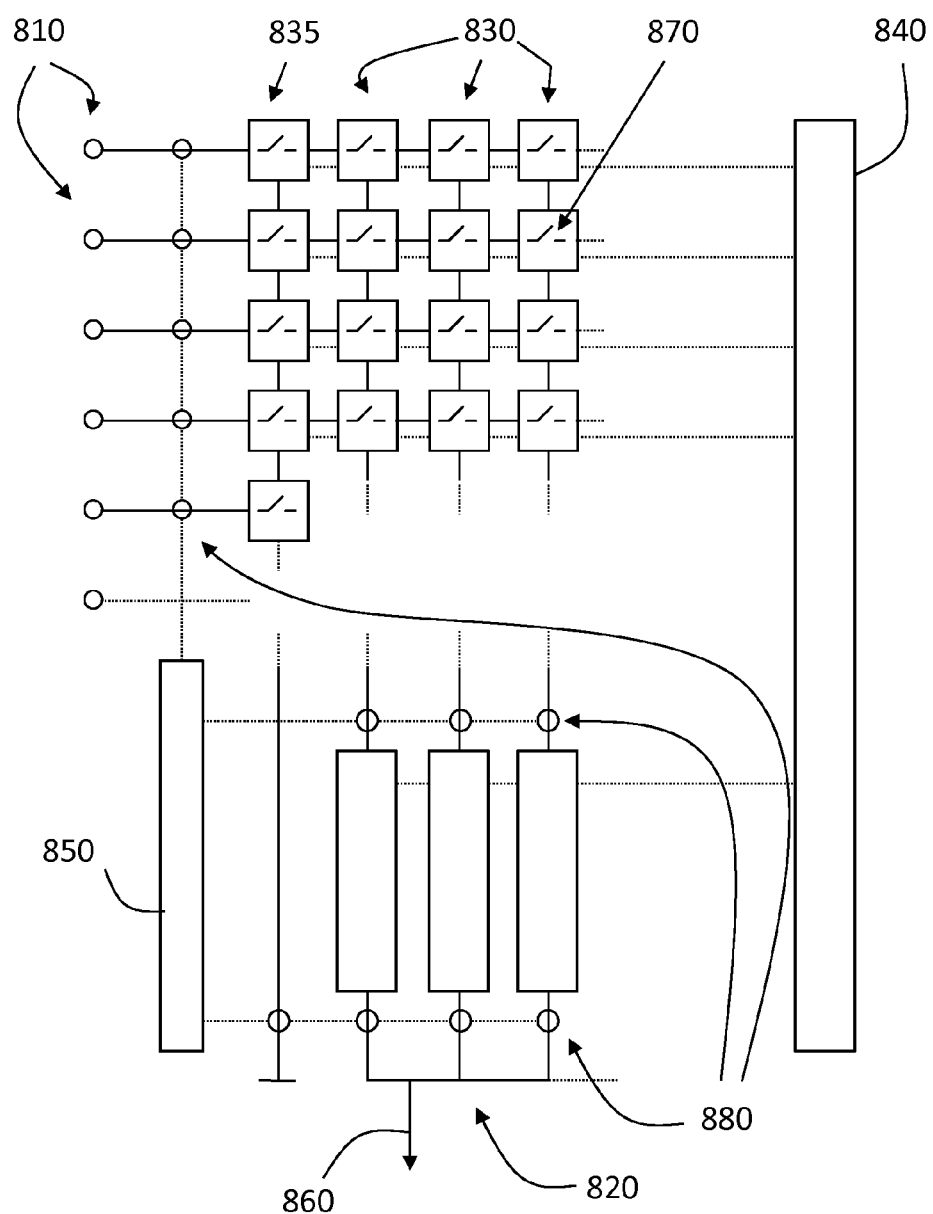
FIGS. 8-10 show block diagrams of an electric tank according to embodiments.

FIG. 8 illustrates one potential SMX architecture. The contact surfaces 810, power buses 830 and a ground bus 835 are connected in a matrix where each contact surface 810 can be connected to any of the power buses 830 or the ground using connecting elements 870. The matrix is controlled by a switch matrix controller 840, which may be a separate unit or the main control unit of the tank. In addition, there is a power combiner block 820 and current and/or voltage measurement components 880 connected to each power bus 830 and contact surface 810. The measurements are controlled by a measurement and communication unit 850. The measurement information can be delivered to the switch matrix controller 840. Unified voltage is provided at output 860.

The switch matrix controller 840 preferably comprises switching circuitry, a CPU, transmission circuitry, receiving circuitry, monitoring circuitry, and the described interfaces towards the power buses, the contact surfaces and the TMU. In addition to connecting the contact surfaces to a power bus or ground, the SMX can preferably set the contact surfaces to a high impedance state or connect them to a certain voltage.

Figure 9:
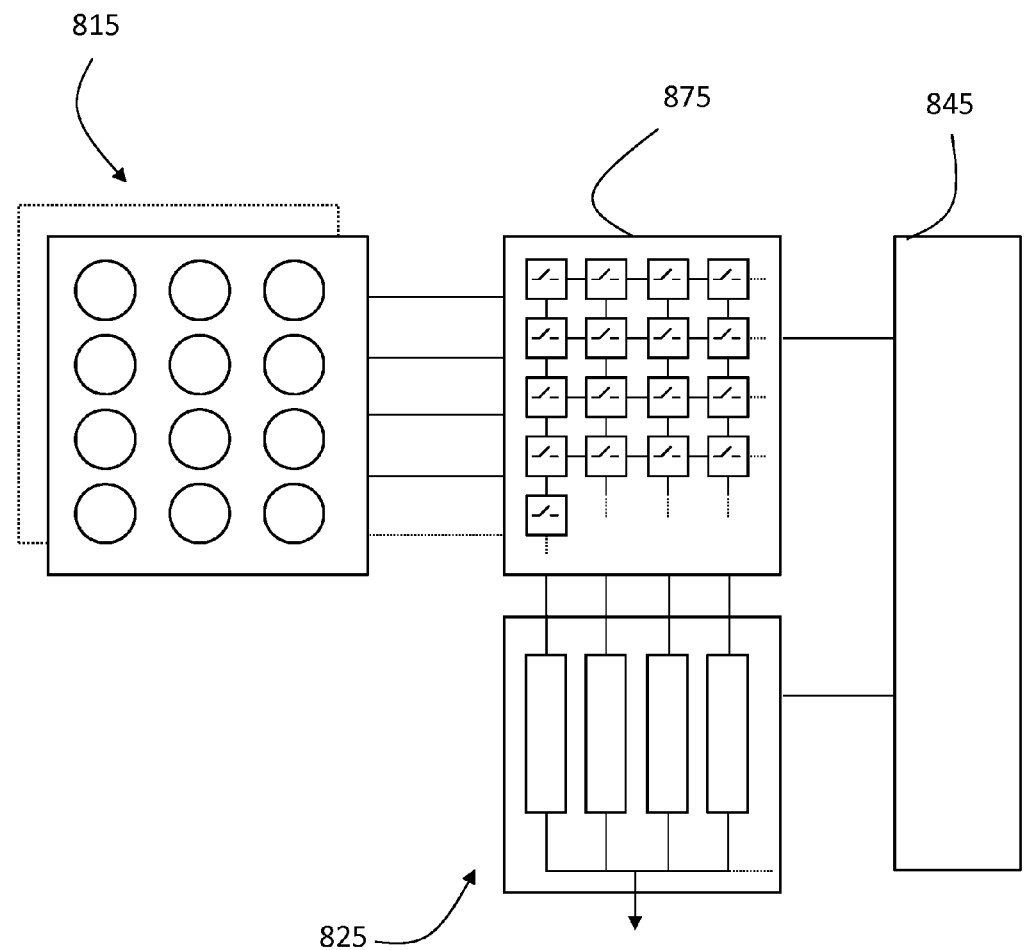

FIG. 9 illustrates the system in more general level. The contact surfaces are denoted with reference numeral 815 and are connected to the switching matrix 875. It can be seen that the power buses from the switching matrix 875 are connected to a power combiner 825. The power combiner 825 is needed to combines the supply from several power buses into a single tank output terminal pair for a load, such as a BEV. The power combiner 825 is preferably capable of combining strings with different voltage levels to a single tank output terminal pair. There may also be several power combiners if several tank outputs, e.g. with different output voltages, are needed. The TMU, which typically provides most computational power for the tank system, is denoted 845 in FIG. 9.

The TMU contains necessary software means for performing the required business logic operations such as running routing algorithms and potential safety checks, system metrics, etc. There are also software means for translating the computational results of the business logic operations into messages and vice versa according to a messaging protocol used. These messages contain instructions for other parts of the system such as the SMX or the battery units. There is also a hardware interface providing a link between the software means of the TMU and the other parts of the system. This layer controls the hardware of the tank.

According to one embodiment, the transmitting circuitry of the SMX enables the communication between the TMU and the battery units. The SMX forwards messages meant for the battery units coming from the TMU to the battery units. The messages can be sent via a certain contact surface or it can be broadcasted over several contact surfaces at the same time. The TMU decides on the contact surfaces used for the communication.

According to one embodiment, the receiving circuitry receives messages coming from the battery units and the SMX forwards those messages to the TMU. The messages can be received using several contact surfaces at the same time or using one specific contact surface again decided by the TMU.

According to one embodiment, the monitoring part of the SMX enables measuring the current and the voltage of the power buses, measuring the current and voltage of the contact surfaces. Also monitoring of the temperature of the SMX is possible.

Figure 10:
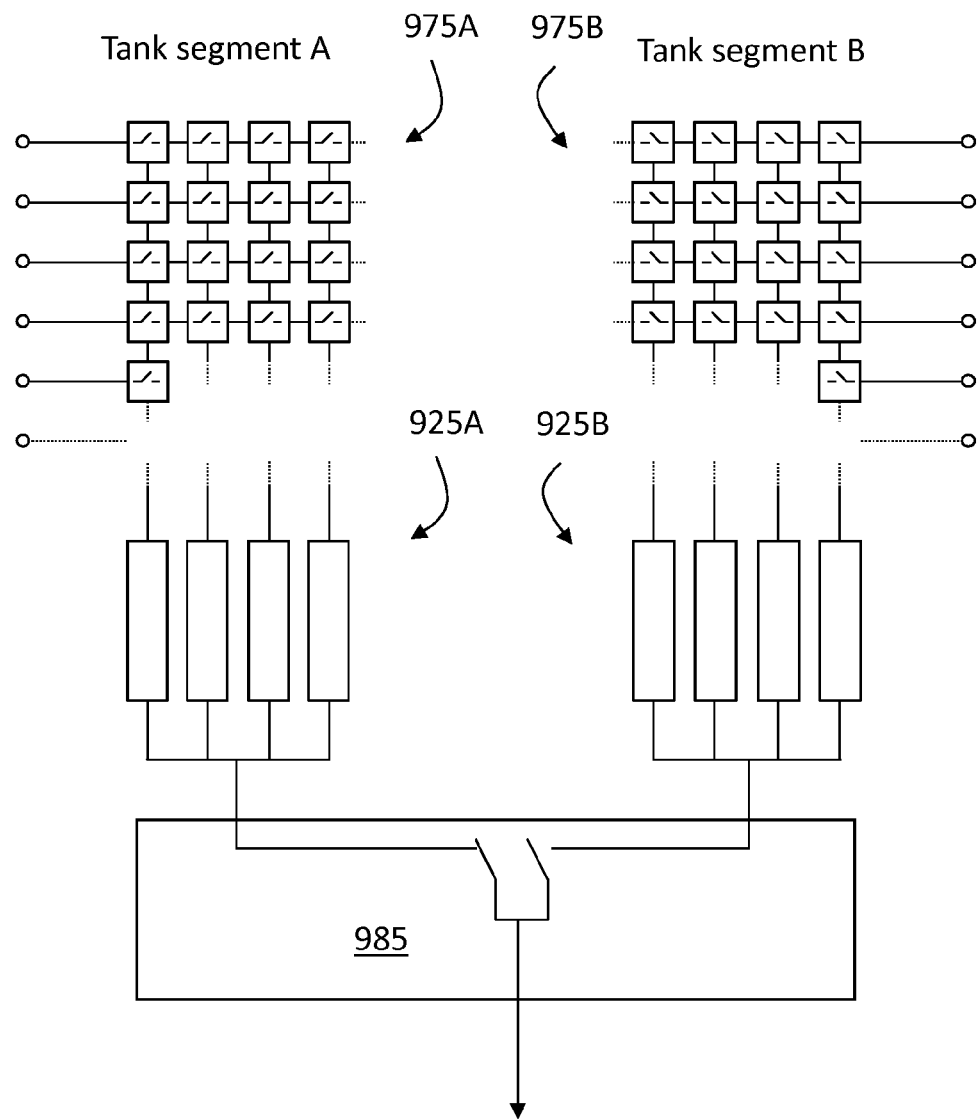

Finally, FIG. 10 shows a continuity enabler arrangement according to a preferred embodiment of the tank. There are two tank segments A and B, each like illustrated in FIG. 8, with separate switching matrixes 975A, 975B and power combiners 925A, 925B, typically connected to different battery unit strings. The segments are connected to tank segmentation logic 985 between the segments and the load. The purpose of the tank segmentation logic is to ensure that while one segment of the tank is communicating, re-routing or otherwise unavailable for power delivery, another segment can take over the power delivery function without interrupting power delivery to load. There may be also an additional buffer energy reservoir connected to the tank segmentation logic for ensuring power delivery during short periods of unavailability of the segments, for example if all battery units are engaged in a communication or synchronization sequence.

Overall Operation Process (Tank)

Figure 11A:
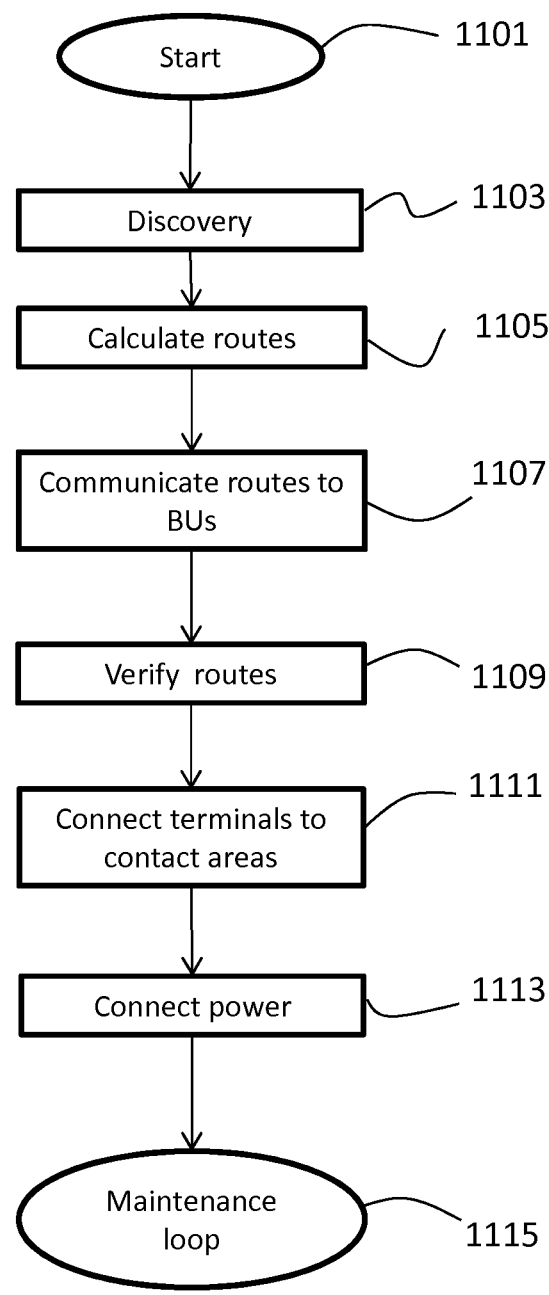
FIGS. 11A and 11B contain flow charts illustrating operation of the electric tank according to embodiments.

FIG. 11A illustrates an example of a tank operation process from a start 1101, where the tank is filled with battery units but not yet delivering power, to maintenance of the tank in a power delivery state 1115. First, the TMU starts the discovery process 1103 FIG. 11B, and discussed below more detail, to find available strings in the tank. TMU stores the information received from the battery units. The discovery process as pictured in FIG. 11B describes how a string can be identified and constructed. In case there are several contact surfaces available, the same process can be repeated several times with different contact surface pairs if several strings are formed. The discovery process collects or constructs information on how the route can be establish between two contact surfaces. Based on this information, the calculate route process 1105 determines how the terminals of the energy reservoirs are connected to the contact areas of the battery units so that those are connected in series.

In step 1107, the TMU communicates to the battery units which contact area terminals of the energy reservoirs are to be connected. The battery units store this information. Before connecting the terminals, the established strings are verified in step 1109. Exemplified verification can be done by connecting contact areas determined in the previous step in bypass mode. Then current is fed from the different contact surfaces. By measuring if the current is within certain range, the TMU can determine that there is route available between two contact surfaces. The battery units monitor also the currents during the operation and if it exceeds the threshold terminals are disconnected from the contact areas.

After verification step 1109 the TMU commands the battery unit to connect terminals of the energy reservoirs to the contact areas 1111. Once this has been done, the power buses and power combiner(s) can be powered up in step 1113 to provide an output voltage from the tank to a load. The TMU commands in this step to which power bus certain contact surfaces is connected and it measures the power bus voltages which should correspond to earlier calculated values. Calculated voltages can be computed within certain limits of precision, as TMU knows which battery units are part of a particular string, and the battery units report the voltage of the energy reservoir during the discovery process. The system in operation is maintained in a maintenance loop in step 1115, where the power buses and strings are repeatedly monitored in order to be able to react to essential changes in the tank.

Discovery and Routing (Tank)

After the tank is filled with battery units and a communication link established with the battery units, the tank starts a process to find out what kind of connections there are available between the battery units and between the tank and the battery units. This process is called the discovery process.

According to one embodiment, in addition to finding the available connections, the discovery process includes collecting other information stored in or measurable from the battery units. This information can be e.g. voltages of the energy reservoirs, charge levels of the energy reservoirs, the temperature of battery units and the number of charging cycles. The information collected is stored in the control unit.

It should be noted that there is no need to have all the contact information available for all the battery units in a tank to operate. It is sufficient that one string can be established to allow the tank to deliver power. Few long strings with higher output voltages enable in principle smaller power losses, compared to many shorter strings with a lower output voltage. The disadvantage of long strings and the high voltages associated with it, are higher voltage tolerance levels required for the parts. It increases the possibility that the voltage difference between two neighboring battery units goes over the used semiconductors specified breakdown voltage. Many shorter strings require more power buses and thus more components needed in the switching circuitry and the power combiner to manage all the strings.

With reference to FIGS. 6A-6D, according to one embodiment, discovery is carried out when the battery units form a resistor network. The contact areas of each single battery unit are arranged in a virtual star configuration. In a star configuration, illustrated in more detail earlier with reference to FIG. 2B, one terminal of a resistor is connected to each contact area of the battery unit and the other terminal of the resistor is connected to common star point of the battery unit (FIGS. 6A-6D do not show individual resistors inside the battery units but a general switching logic between the contact areas). This means that their contact areas are connected to each other such that each battery unit has a known internal resistance between each pair of its contact areas. Some of the contact areas of the battery units in the network are in contact with contact surfaces 604*a-d*, 605*a-d* of the tank, some in contact with contact surfaces of other battery units and some remain unconnected.

Figure 6A:
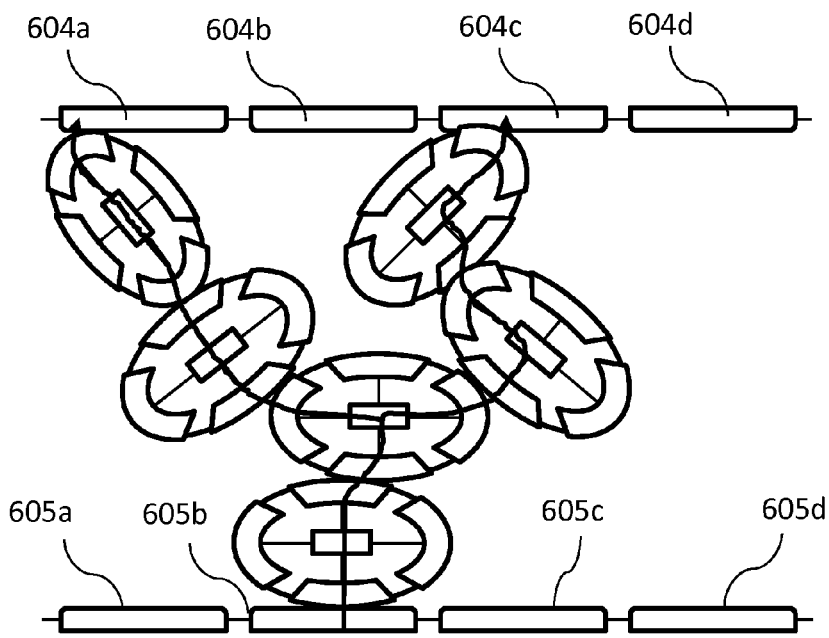
FIGS. 6A-6D represent randomly packed electric tanks in two-dimensional cross-sectional views to illustrate battery unit discovery process.
Figure 6B:
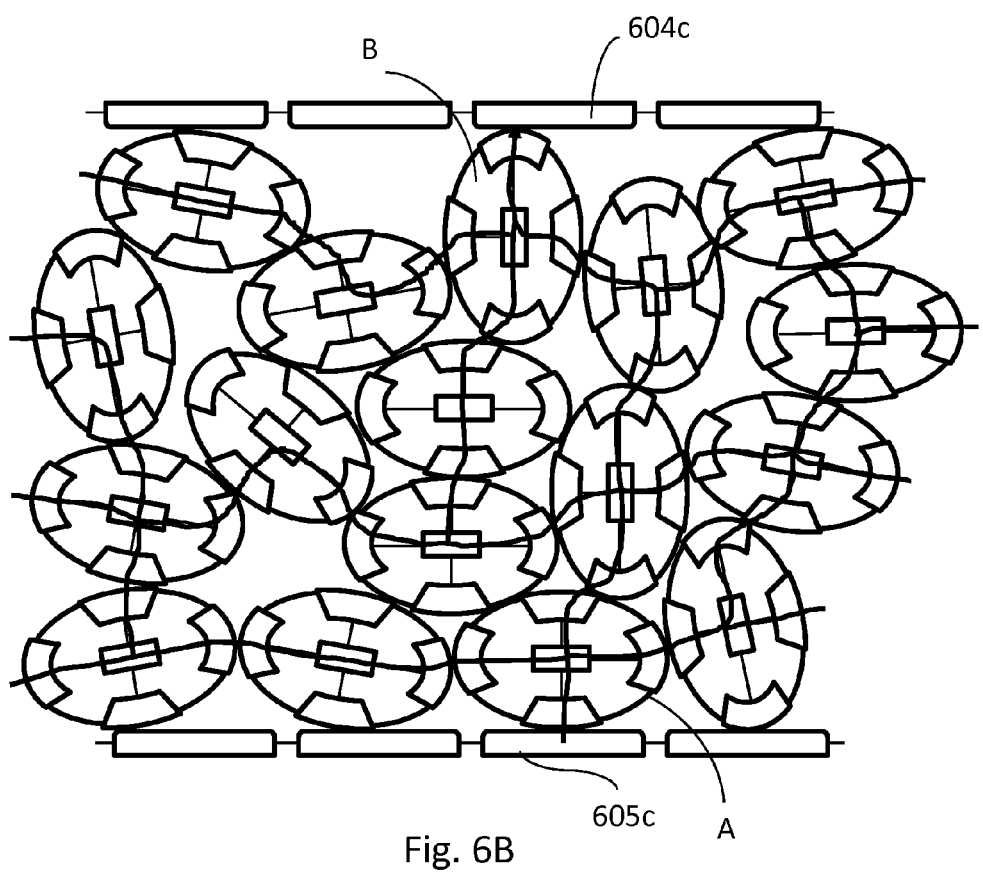
Figure 6C:
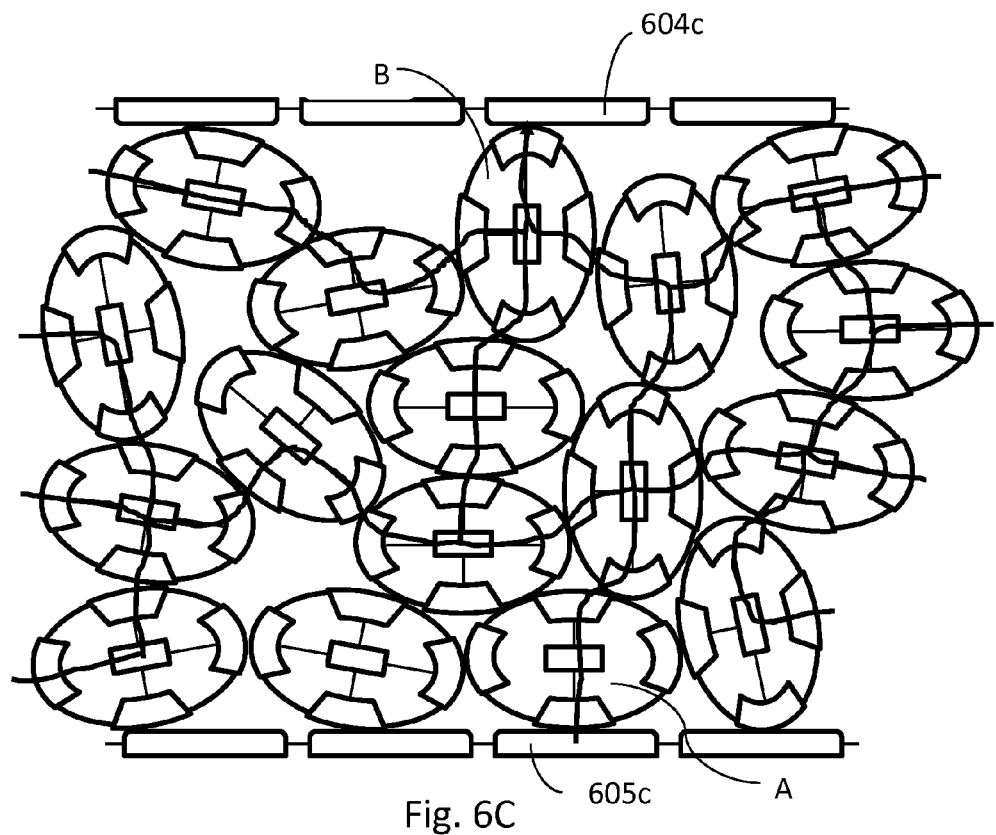
Figure 6D:
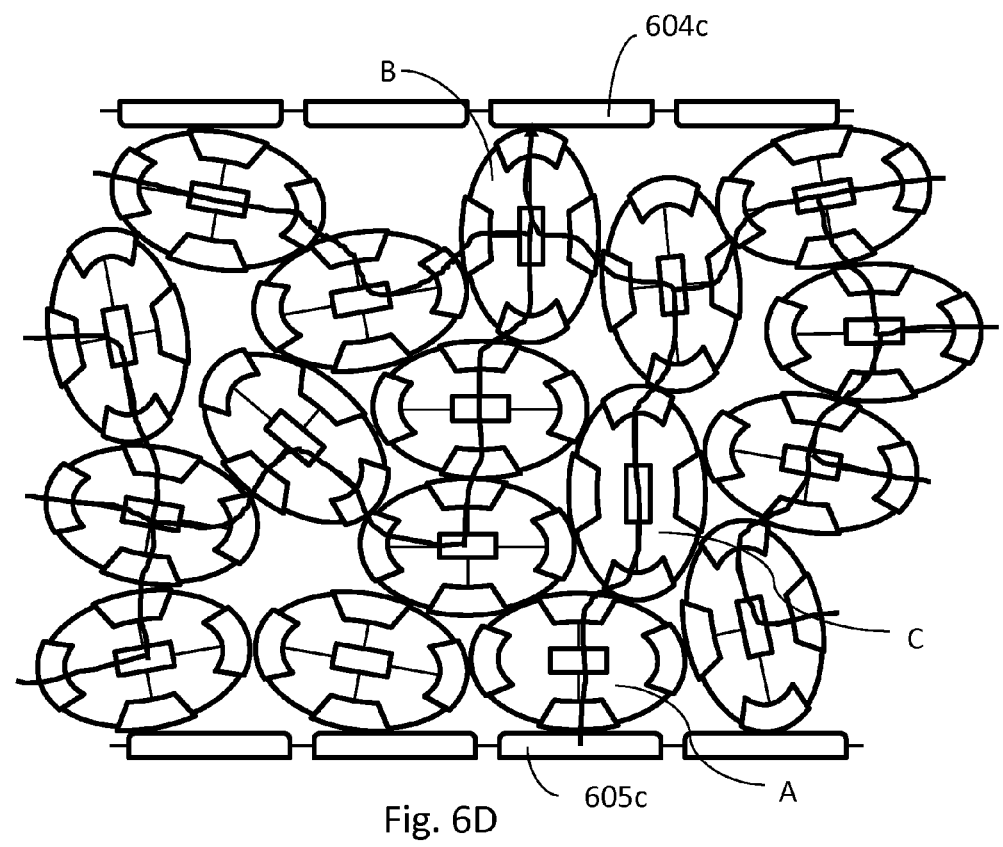
Figure 11B:
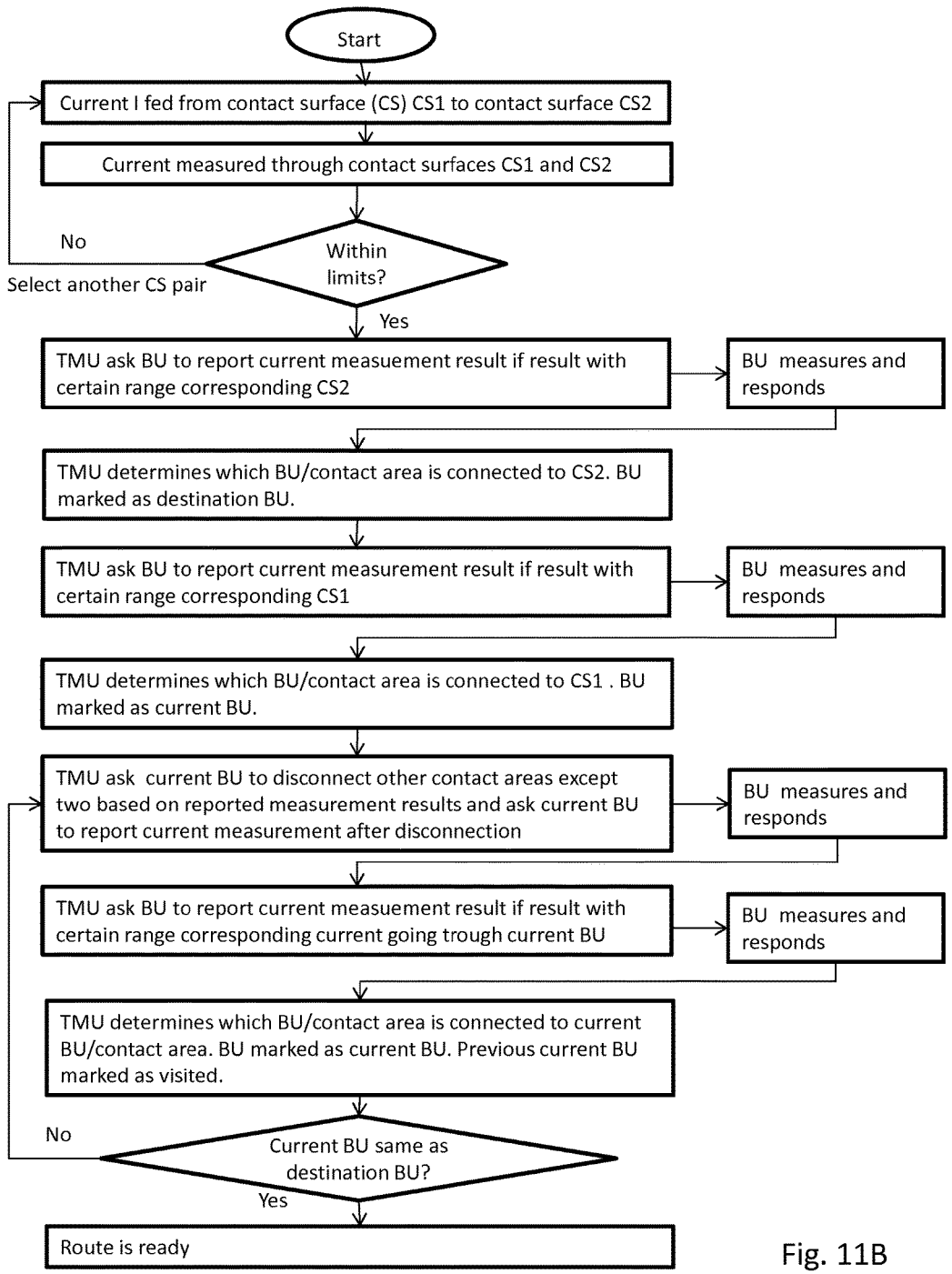

With additional reference to FIG. 11B, the discovery starts by connecting a predefined voltage to a first contact surface (CS1 in FIG. 11B), connecting a second contact surface (CS2 in FIG. 11B) to the ground, and setting other contact surfaces into a high impedance state. Then, by measuring the current which is flowing via the first contact surface, the tank can determine if there a string available between these two contact surfaces because the battery units form a big resistor network. If there is no current flowing, the TMU connects a voltage to another contact surface or another contact surface to ground and repeats the current measurement and conclusion on string availability. For example in FIG. 6A there are strings available between contact surfaces 605*b*/604*a*, 605*b*/604*c* and 604*a*/604*c*. If the control unit does not get expected answer from any of the battery units in some phase of the process it can use other contact areas of the current battery unit for finding a string or the control can start the new process by connecting a voltage to another contact surface or another contact surface to ground (not shown in the figure). FIGS. 6B-6D illustrate a more complex situation. FIG. 6B shows an exemplary battery unit network with all available current paths between contact surfaces 605*c* and 604*c* drawn (assuming also that the network continues to left and right). FIGS. 6C and 6D illustrate a situation where some strings have been visually eliminated to illustrate the following procedure.

To gain more exact information on the strings, the TMU commands that each battery unit measures the current flowing through all of its contact areas. The TMU can also command that a battery unit will answer only if the measurement result is within certain range. For example, the TMU can set the range so that it corresponds to current flowing through a specific contact surface (say, contact surface 605*c* in FIGS. 6B-6D). This is done to minimize the messages sent between the battery units and the TMU.

According to one embodiment, each battery unit has a unique identification number which the battery unit reports when answering to the TMU. Based on the measurement results, the TMU can decide which contact area of the certain battery unit is connected to a specific contact surface of the contact plate. This can be deduced because the current flowing via each resistor in the network is the same as current flowing through the contact surface corresponding to that resistor. The current is also the largest through the contact areas which are in touch with contact surfaces of the tank. In a typical case each battery unit has several connections, and the current is divided between multiple resistors connected to contact areas to several paths over the resistor network.

The nominal value of the current flowing through the resistor connected to contact surface which is connected to the ground is the same as flowing through resistor connected to the voltage, because all the divided current flows are combined to one current flowing to the ground. Based on this, the TMU can deduce which contact area of a certain battery unit is connected to the contact surface connected to ground and therefore to unambiguously find the end points of the string.

The discovery process continues by disconnecting the other contact areas except two for the two battery units A in contact with contact surfaces 605*c* discovered in the previous step (see FIG. 6C). The shortest route between these contact areas can be found out by using the contact areas via which the largest current flows. The largest current route is known based on reported current measurements for each contact areas which battery units report to the TMU. After disconnecting the other contact areas for battery unit A, the TMU asks the current measurement report from the battery unit A to find out what is the current flowing through it. Then the TMU commands that each battery unit measures the current flowing through all of its contact areas and the battery unit will answer only if the measurement corresponds to the current flowing via battery A. Based on this information, the TMU can deduce which contact area of a certain battery unit is connected to the contact surface of the battery unit A. In such case, when a connection is not found, the TMU can use another contact area to try to identify a string. Such measurement can be repeated for all contact areas of the battery unit A to find out all the available connections. This is not necessary for determining the strings but might be useful for optimizing the strings in some applications.

The whole string is determined by repeating the steps described above until the whole string is known, e.g the next step starts by disconnecting the other contact areas except two for the battery unit C (see FIG. 6D). The TMU stores the information about the possible connections and what was the route used for each battery unit. For longer strings it is possible to use bypassing for the already known route so that the measured current is bigger. This means that the battery units along the known route are programmed to bypass mode between the contact areas on the route, whereby their star resistors do not dissipate power and increase the current flowing through the route which increases the probability for successful detection of the signal.

After the first string has been determined, the same process is repeated for other potential contact surface pairs of the tank, i.e. a known discovery voltage is connected between some other contact surface pair and all other contact surfaces are set to a high impedance state.

The TMU knows which battery units are already in use in another string and, according to one embodiment, it takes this into account when forming the new strings to save time and energy. The battery units already determined to be used in a previously constructed string, are programmed to disconnect contact areas needed for those strings, so that when connecting the discovery voltage and ground to some other contact surfaces, it is immediately known by measuring the current if a string can be formed between these two contact surfaces.

According to one embodiment, the process described above is repeated until there are several strings available. The process can be done from several contact surfaces at the same time to minimize the time needed for the discovery, at least for a large tank.

It should be noted that the described discovery process is exemplary only and can be implemented in many other ways utilizing current flow measurements in the resistor network, or in some completely different way.

Based on the discovery process, the control unit of the tank decides on the tank configuration, i.e., how many parallel strings there are, how many energy reservoirs are included in each string, which contact surfaces of the tank are used as string end points and how the strings are formed, i.e., how each individual battery unit is to be configured. This process is called the routing process.

Based on routing, the tank control unit finally configures the tank, i.e., communicates to individual battery units how the positive and negative terminals of their energy reservoirs are connected to the contact areas of the battery units so that the energy reservoirs of different units are connected in series, and potential bypass connections as well, to form the strings.

Bypassing may enable better usage of the battery units, for example when there is a battery unit whose charge level is too low to be used for delivering power. By bypassing, it can still assist in establishing a string. Bypassing also enables that the battery unit delivering power can be used for another string in bypass mode, using other free contact areas, which are not used for connecting the energy reservoir. Thus, a single battery unit may simultaneously deliver power and bypass current through different pairs of contact areas. Bypassing can be also used for decreasing the temperature of the battery unit if it is over a predefined threshold value by connecting the battery unit to bypass mode for some time or using some duty cycle for power delivery.

The TMU preferably communicates the routing information to the battery units via the SMXs. The TMU also ensures that each battery unit acknowledges that it has received the appropriate connection commands and, if needed, the TMU can re-transmit the information. Each battery unit preferably stores its own configuration information in its own local memory.

The tank may also provide an interface to connect an external user interface for monitoring the charge level of the tank or each battery unit separately or in a statistical presentation. In a similar way, the tank can provide also other detailed information of the characteristics of the battery units and the strings.

Verification and Safety (Tank)

According to one embodiment, before the power is connected from or to a tank, each string is verified. In the verification process, it is for example checked that there are no direct connections to other strings, which might cause short circuits. The string voltage is also verified. The voltage should correspond to a calculated voltage based on the discovery/routing information and reported energy reservoir voltages from the battery units. The battery units namely report their energy reservoir voltages during the discovery/routing processes and this information is stored to the TMU.

Before connecting energy reservoirs to the contact areas, the strings are also internally verified to be logically correct and free of short circuits. This is done for example by connecting the route for each string in the bypass mode and connecting a voltage between the ends of the string. The following step is measuring the current flowing through the string, and with a comparative algorithm, it can be determined with a high degree of confidence that the strings were formed correctly.

The TMU configures the SMXs to define which string is connected to which power bus, i.e., which contact area of the contact plate needs to be connected to which power bus and which contact area is connected to ground. After the strings are connected to the power buses, the TMU requests power bus reports from the SMXs. The SMXs report the measured voltages and the TMU compares those to a corresponding calculated value.

After string verification completes, the TMU configures all battery units in order to route the internal energy reservoirs to the appropriate contact areas according to the verified strings. Accordingly the power combining is enabled only after verifying corresponding strings whose powers are to be combined.

The tank may include also other important safety functions to prevent over-charging, over-discharging and the shorting of terminals.

Monitoring and Maintenance (Tank)

According to one embodiment, the tank is provided with means for periodically monitoring electrical characteristics of the strings and the battery units during operation of the tank. Should the monitoring require active participation of the battery units, the battery units are correspondingly provided with means for reporting to the tank using suitable communication means. The electrical characteristics may include charge and discharge current, temperature, number of cycles and voltage or charge level of energy reservoirs. If needed, i.e., if predefined threshold values or threshold criteria for the monitored values or values derived from them are exceeded, the tank can reconfigure the strings based on the monitoring information. For example if a battery unit is depleted during operation, the system can take that into account. Reconfiguration may be preceded by a rediscovery or rerouting process. Reconfiguration may take place during normal operation of the tank.

One potential reason for reorganization is that the charge level of certain battery unit goes beyond a predetermined state of charge window. A typical decision would be that such unit can at least temporarily no longer be used for delivering power.

Another examples where reorganization is needed is when the TMU notices that the current of a string is not in line with algorithmic predictions. This could happen if a connection between some battery units have been disconnected during operation and the string is not supplying any power.

In such cases, rerouting is done in the TMU and it uses available contact information. If some contacts have been disconnected, then the discovery can be done again during the operation.

Power Combining (Tank)

As briefly explained above, according to one embodiment, the tank includes a power combiner, which combines the strings with different number of the battery units and with different string voltage levels together. The output of the power combiner comprises at least one negative and one positive terminal, for supplying energy from the tank to a load to be possible.

The output voltage of the strings varies since the state of charge, health, age, capacity, battery chemistry, internal resistance, thermal constraints, maximum allowed power dissipation numbers (among many other parameters) of the battery units vary. As a result, the total string output voltage varies.

Before combining the strings from several parallel strings, output voltage of at least one string needs to be adapted to allow load sharing. For supplying a load, a bus voltage within relatively narrow margins is usually required. A switched mode power supply (SMPS) is used to convert the variable string voltage to the needed bus voltage, of which the exact value depends on the use case.

Different voltage converter circuit topologies can be used for SMPS like buck, boost and buck-boost. The chosen converter topology is driven by the use case. Sharing of loads can be done with various methods, e.g. the system can vary the output voltage of each string through one SMPS per string until the desired current draw level on all paths is obtained.

Charging System (Tank)

According to one embodiment, the tank provides a charging system which can be used for the charging battery units from plug in without removing the battery units from the tank. The tank preferably provides necessary means to provide a needed power for charging one or several strings at the same time, and for monitoring the battery units during the charging to maximize the useful life of the battery units. The tank may also comprise means for adjusting the charging voltage during charging to maximize the life of the battery units.

The tank may include an AC/DC converter to convert typical AC mains voltage to the needed DC voltage to supply the battery units. The tank connects the needed power for the strings via the contact surfaces of the tank. For charging, the tank can use information for the existing strings or it can form the new strings. The tank monitors the charge level and temperature of the battery units to stop the charging when needed. If some battery unit reaches the full charge level it can be bypassed and the charging of the rest of the battery units connected in series can still continue. On the other hand, if the temperature of some unit goes over a predefined threshold limit, it can be bypassed for some time and then continue charging.

Finally, the tank or any other part of the system may provide an interface to charging infrastructure, such as defined by the SAE J1772 or IEC 62196 standards; in addition to an interface to on-vehicle local area networks, typically based on the CAN or LIN standards.

Dispenser Apparatus and Method

Figure 12:
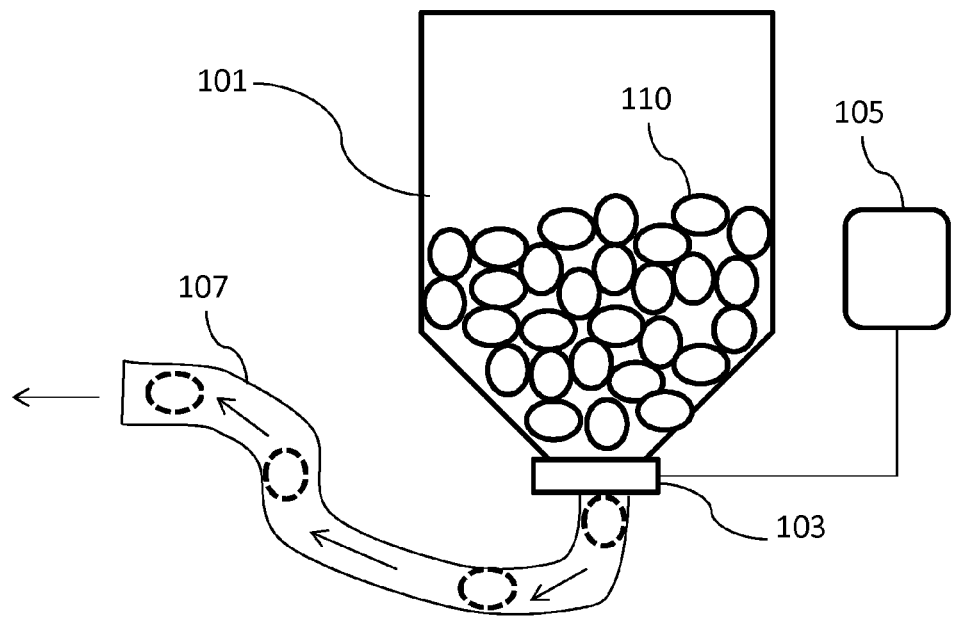
FIG. 12 illustrates schematically a dispenser for dispensing battery units.

FIG. 12 illustrates the main components of the present dispenser apparatus. This forms a part of the recharging architecture that might be implement, for example, at a roadside service station. The dispenser comprises a dispenser container 101 having an inner cavity for storing a plurality of battery units 110. Connected to the container, there is a dispensing channel, in this case a dispensing hose 107. Between the dispensing hose 107 and the container 101, there is an output unit 103 capable of allowing the battery units 110 to enter the dispensing hose when desired. There is also a dispensing control unit 105 functionally connected to the output unit 103 for operating the output unit and controlling the dispensing process.

According to one embodiment, the dispenser container 101 has the form of a silo, i.e., inner walls at least partly narrowing downwards so as to guide the battery units towards the output of the container with the aid of gravity. The container may, however, have another shape in particular if there are provided active battery unit transporting means guiding the battery units to the output. Such active means may comprise e.g. a screw conveyor, belt conveyor or pneumatic conveying system.

The output unit 103 may comprise active means for transporting the battery units through the dispensing hose 107. One example of such active means is a gas flow generator, preferably an air flow generator. The gas flow can be guided to the dispensing hose 107 and when battery units are fed to the air flow, they are guided through the hose 107 and out of the hose exit to a desired target, such as an electric tank of an EV. Another example is a flexible screw conveyor arranged inside the hose 107.

The output unit 103 could include a separate output, e.g. diverter, for removing faulty units from the system, e.g ones which silo is not able to charge The output unit 103 and the dispenser control unit co-operate to allow only a desired amount of battery units 110 to exit the dispenser. The amount can be predefined (by for example the number of battery units or the total energy content of the battery units) or there may be one or more additional sensors assisting the determination of the number (e.g. tank filling sensor comparable to sensors in conventional liquid fuel pumps).

The dispenser container 101 may comprise means for charging the battery units while being in the container 101. Thus, the dispenser container 101 may serve as an electric tank with a capability to feed current to the battery units. The electric tank technology and practical implementations thereof are discussed later in this document.

Figure 13:
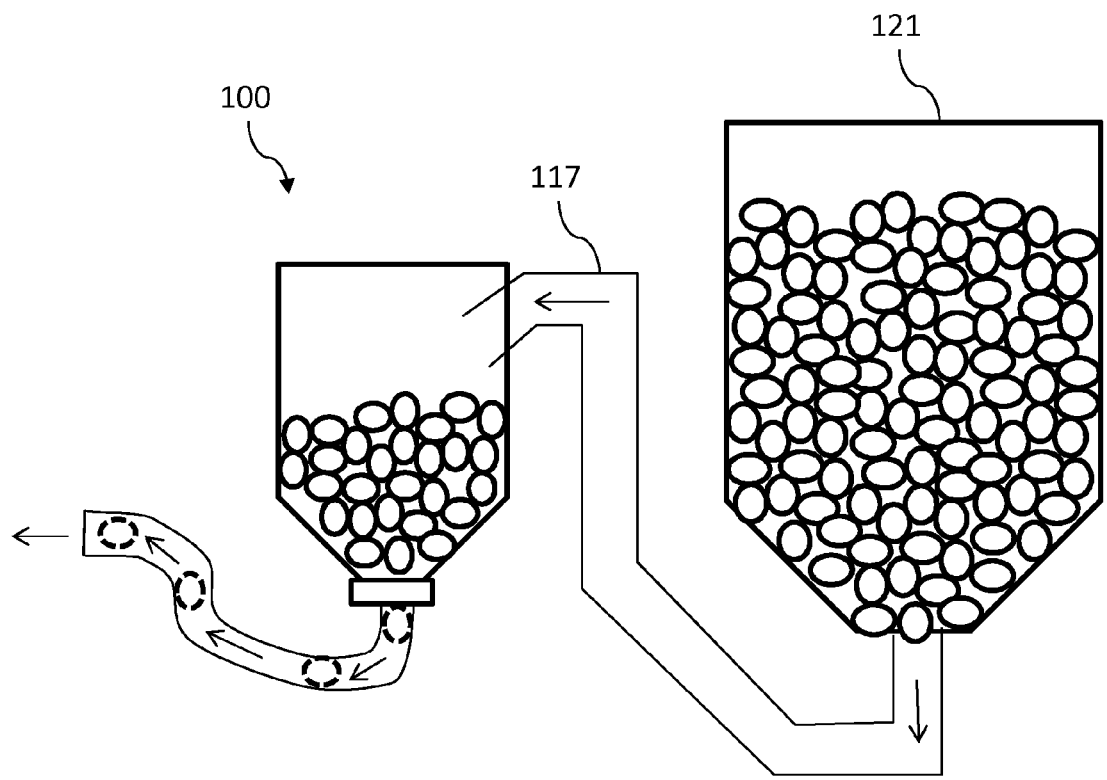
FIG. 13 illustrates schematically an alternative dispenser in which separate dispensing and charging containers are provided.

FIG. 13 illustrates an embodiment where the dispenser 100 according to FIG. 12 is connected to a larger storage container 121 by a battery unit loading channel 117. The dispenser container of the dispenser 100 serves as a buffer container, which can be loaded with battery units from the storage container 121 when needed. The storage container may act as an electric tank with a battery unit charging capability. A benefit of this embodiment is that the retention time of the battery units in the system can be increased so that energy can be procured during periods of low demand, and/or slow-charging algorithms can be employed that maximize the useful life of a battery unit. If the dispenser container is small, the turnover rate of battery unit therein may be short, as well as the charging time available. Rather than identifying and removing faulty units when delivering units from the dispenser 100, these may be removed when transferring units from the container 121 to the dispenser 100.

In one embodiment, a single storage container is arranged to feed many dispenser units. For example a service station may include a large storage container and several "electric energy pumps" obtaining their battery units from the storage container. A benefit of this embodiment is that the charging function can be realized in one container only instead of many, whereby costs can be reduced.

In one embodiment, a plurality of dispensing means are connected to a single dispenser container to obtain a multi-output dispenser. In this case too, the charging function can be realized in that single dispenser.

Naturally, all combinations of the above embodiments are possible, allowing for any number and cascade of storage container(s), dispensing container(s) and dispensing means to be used.

Figure 14:
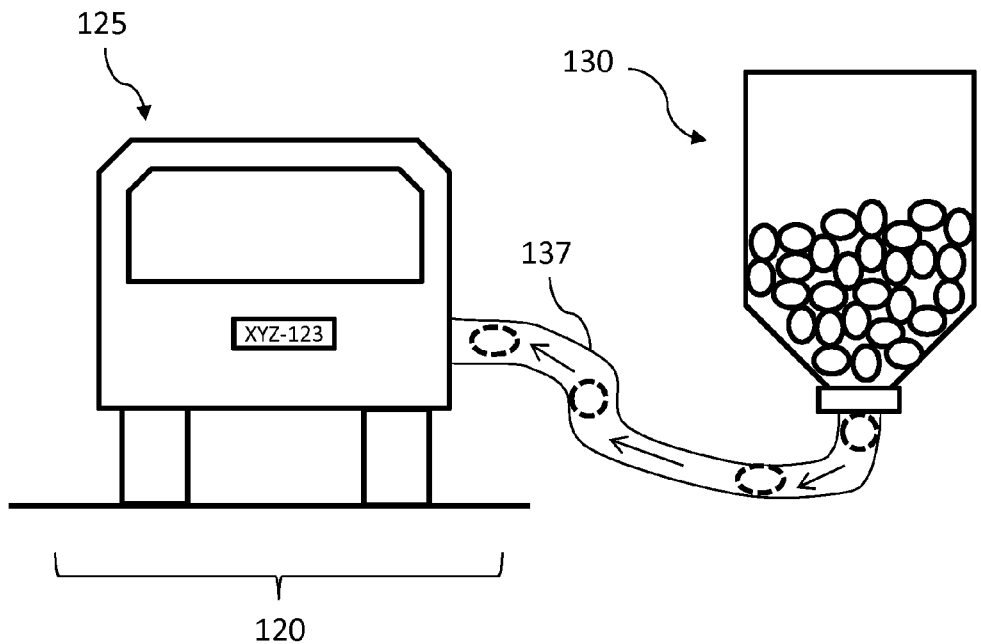
FIG. 14 illustrates schematically a system for dispensing/extracting battery units to and from an electric vehicle using a shared conduit.

FIG. 14 illustrates a service station with a battery unit dispenser 130 and a parking zone 120 within the reach of the dispensing channel 137 of the dispenser 130. Thus, a vehicle 125 parked at the parking zone 120 can be provided with battery units from the dispenser 130. The vehicle preferably comprises a battery unit input to which the output end of the dispensing channel 137 is designed to engage for safe conveying of battery units between the tank (not shown) of the vehicle 125 and the dispenser 130. The arrangement is analogous to conventional service stations with parking zones by fuel pumps having "pump guns" designed to fit into a fuel tank input channel of a fuel-driven vehicle.

Figure 15:
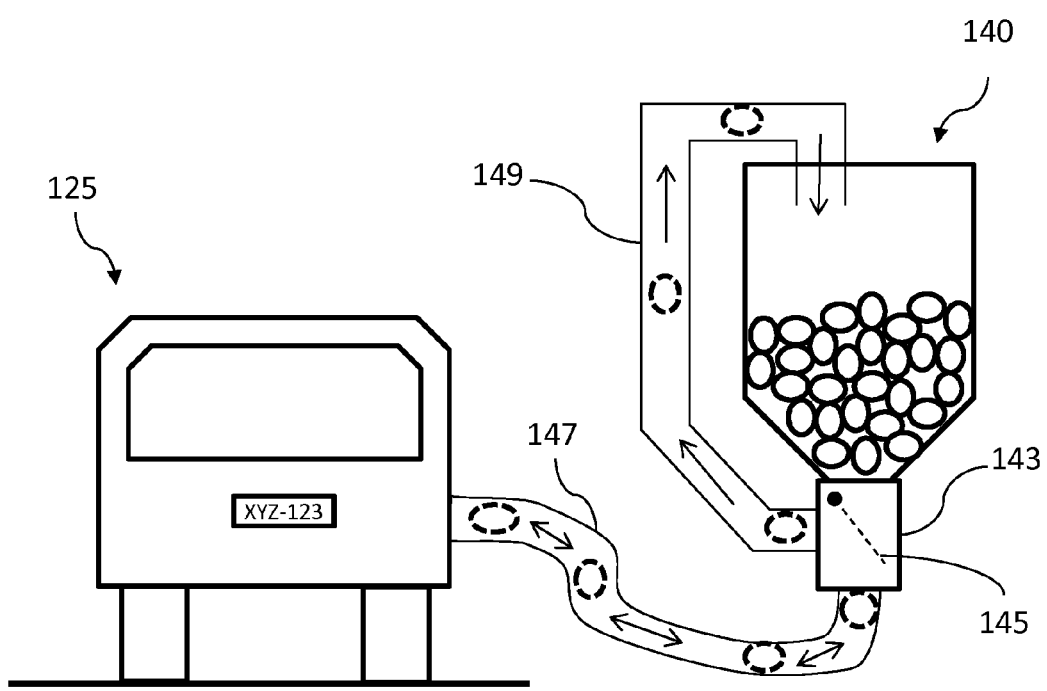
FIG. 15 illustrates schematically a system for dispensing/extracting battery units to and from an electric vehicle which allows selection of battery units being dispensed/extracted.

FIG. 15 shows an embodiment comprising a dispenser 140 capable of both outputting and inputting battery units to and from a vehicle 125 or any other target. The dispenser 140 comprises a combined output and input unit 143 connected to a dispensing channel 147. There are means 145 in the combined output and input unit 143 for selecting the direction of battery unit transport. The channel 147 serves to both intake battery units from the vehicle 125, whereby the combined output and input unit 143 guides the battery units to a loading channel 149 conveying the battery units to the dispenser container (or any other container of the system, like the storage/charging container shown in FIG. 14) and to feed battery units to the vehicle 125, whereby the combined output and input unit acts as described with reference to FIGS. 12 to 14. Input to the dispenser container preferably occurs from above in order to avoid the need to move units already present in the container.

In another embodiment, the dispenser comprises an intake channel separate from the dispenser channel for conveying battery units out of the vehicle to a container.

In a still further embodiment, there is provided a separate intake apparatus for conveying battery units out of the vehicle. The dispenser and the intake apparatus may, however, be connected to one or more common containers, which can be used for charging the used battery units taken from a vehicle before dispensing to another vehicle.

The electric tanks of vehicles may be designed in various ways to allow for battery unit changes. There can be a single tank input/output opening or there can be separate tank input and output openings, for example at the top and bottom of the tank, respectively.

According to one embodiment, the dispensing container and/or one or more of the other battery unit containers of the system, as discussed above, comprise means for charging the battery units contained in the container. For this purpose, the container comprises contact surfaces and control electronics, which may be similar to those of an electric tank described elsewhere in this document, for forming electric energy paths, i.e. strings, inside the container. Thus, the charging container can use the same principles as a tank acting as an energy source for forming the strings, but the direction of energy transfer is the opposite. Additionally, there are means for feeding charging current to the battery units through the contact surfaces along the electric energy paths. The tank technology, in particular string forming by so-called discovery and routing processes, is described above.

When the container has been provided with battery units, the container forms the strings. After the strings are formed, the container provides the required, typically DC, voltage to the strings for charging. The DC voltage could be obtained from, for example, a residential or commercial power utility network, using an AC/DC converter. The container preferably monitors charging level of the battery units and temperatures to. The container may also control the charging cycle, speed and methodology in order to maximize battery unit useful life, or to implement requirements as set forward by a business model.

The dispenser can use any available energy source for charging the battery units, like solar or wind power. The power may be locally produced or transferred through a power grid. The dispenser can be located for example at a public service station meant for public use, in an access controlled corporate fleet environment, or in a residential setting by an individual end user.

According to one example, the dispenser is located at a home of a user whereby during a working day one set of battery units is charged using for example solar power, grid power or any other available energy source. When the user arrives at home with a vehicle powered by a battery unit tank, he can instantly replace a used set of battery units with the newly charged battery units located in the dispenser.

Figure 16:
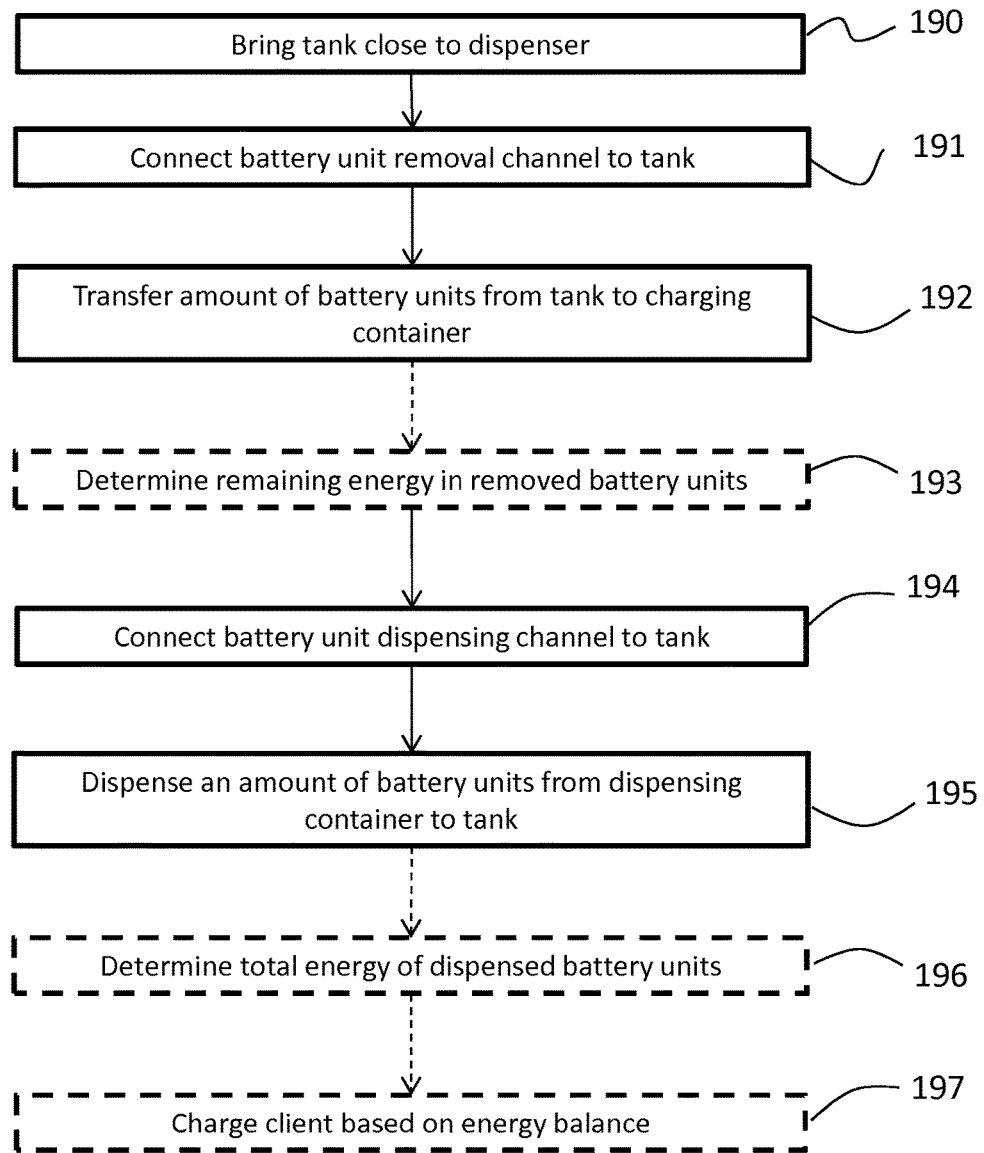
FIG. 16 is a flow diagram illustrating a method of recharging a battery unit tank with battery units.

FIG. 16 illustrates as a flow chart the presents a method according to one embodiment. The method comprises first positioning an electric tank to be replenished within reach of a dispenser (step 190). A battery unit removal channel (which may be entirely different from a dispensing channel or at least partly the same) is connected to an output of a tank (step 191). The removal channel is used to remove at least a portion of the battery units from the tank to a collecting container, possibly directly to a charging container (which may again be the same or different than the dispensing container) (step 192). As an optional step (step 193), the total energy remaining in the removed battery units is determined by measuring or requesting the battery units to report their charge level, for example. Next, a battery unit dispensing channel, if different from the removal channel, is connected to an input of the tank (which may be the same a output) (step 194). The dispenser is used to dispense a desired amount of charged battery units to the tank (step 195). The tank then performs necessary functions (discovery, routing etc) to take the newly dispensed battery units into use. As an optional step taking place before or during dispensing, the dispenser, on the other hand, has determined the charge levels of the dispensed battery units and calculates their sum (step 196). As a further optional step, necessary transactions are made with the client receiving the new battery units or his/her bank, to receive a financial compensation corresponding to the energy balance of the removed and dispensed battery units.

When the battery units are physically transferred between users and retailers, for example from the vehicle tank to a container of a retailer and vice versa, settling and clearing of energy levels and depreciation of the battery which affect to value of the battery units can be done by a secure transaction mechanism, utilizing a unique identifier and optionally other battery unit-related data stored in each battery unit. This system allows for a combination of a large number of the battery units from various manufacturers, by using a number of identifiers that define many parameters, such as manufacturer, origin, version, owner, owner history, technology, battery technology and chemistry, upgradability, serviceability, wear characteristics, battery capacity, battery degradation as a function of load level, thermal constraints, G-forces, number and nature of charge and discharge cycles, duty cycle distribution, load distribution, rejuvenation algorithms, remote shutdown options for privately owned or overdue accounts, crash or accident history. Some or all these parameters can be used when counting a value for the battery unit.

During the normal lifecycle of any battery, capacity decreases. Typically, when no longer 70% or more of the original design capacity can be supplied to the load, the battery is considered obsolete and either put to other use or recycled.

Fast Charging, as often suggested for electrical loads such as electrical cars, has typically a very significant impact on the economic life of a battery, and is therefore economically unfeasible in almost all scenarios.

Figure 17:
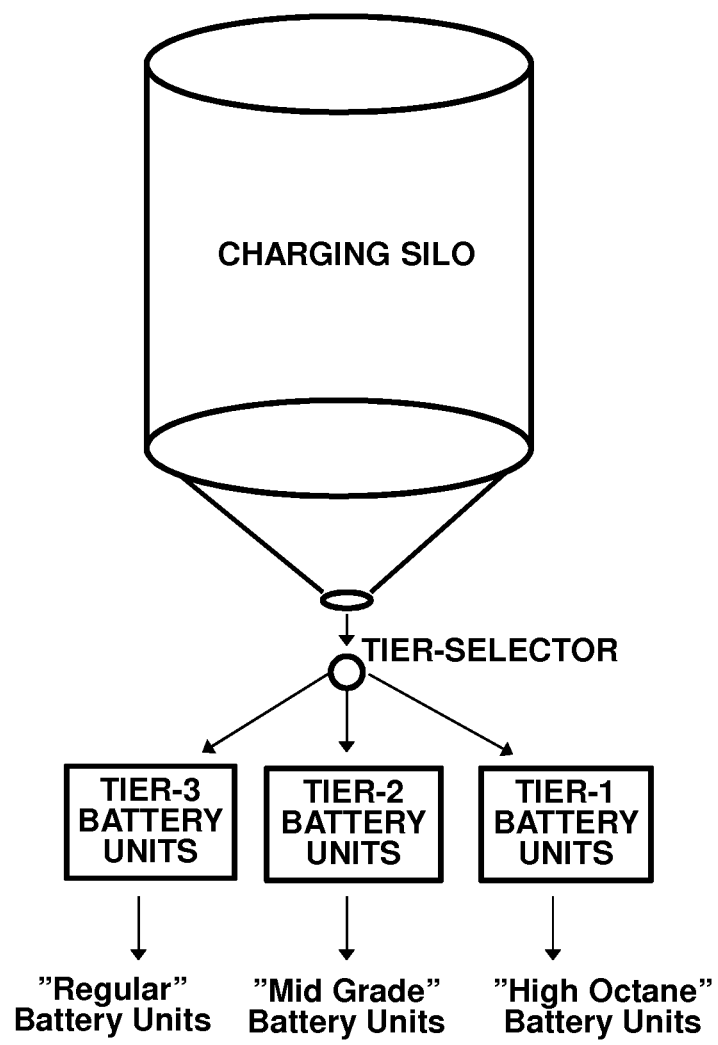
FIG. 17 illustrates schematically a battery unit silo and a separator for separating battery units according to battery type or "tier".

The approach presented here allows removal of the battery units from the load device, and recharging in optimal conditions and with limited time pressure, which extends, rather than shortens, predicted service life:

More importantly, because the performance of each individual cell is known and managed, this approach allows segregation into categories. Performance can be segregated along lines of capacity, peak current, cell voltage, temperature rise, and many other parameters. This could in practice be implemented by allowing a consumer with less stringent performance requirements or tighter budget controls, to opt for batteries that have had a longer or more intense history of use. FIG. 17 illustrates schematically how battery units may be segregated and delivered according to battery unit class.

Figure 18:
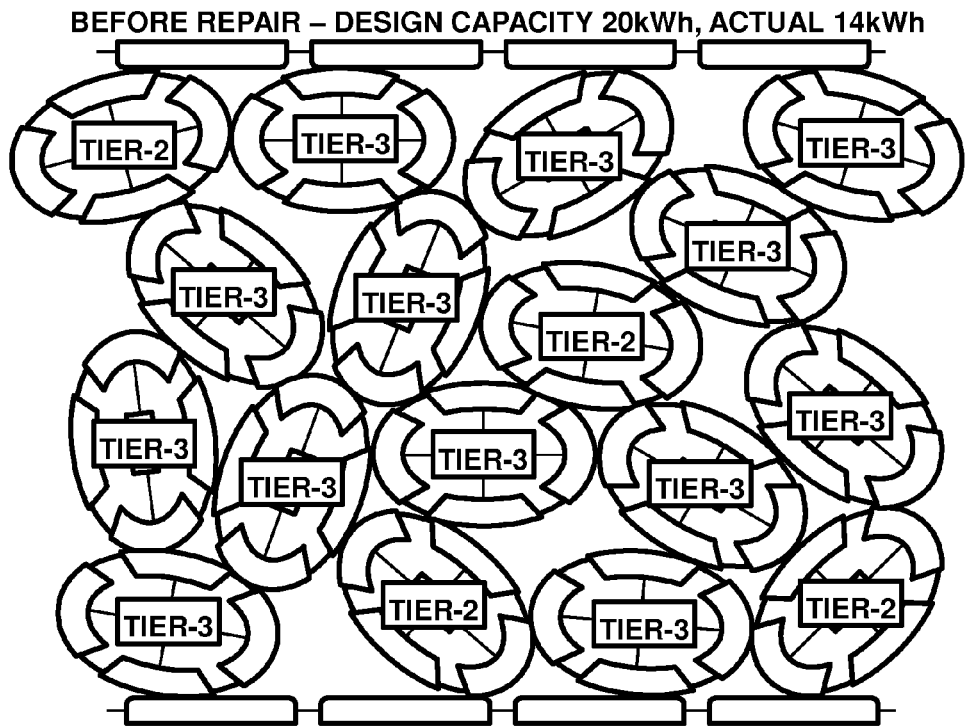
FIGS. 18 and 19 illustrates schematically a battery unit fill configuration prior to and after recharging.
Figure 19:
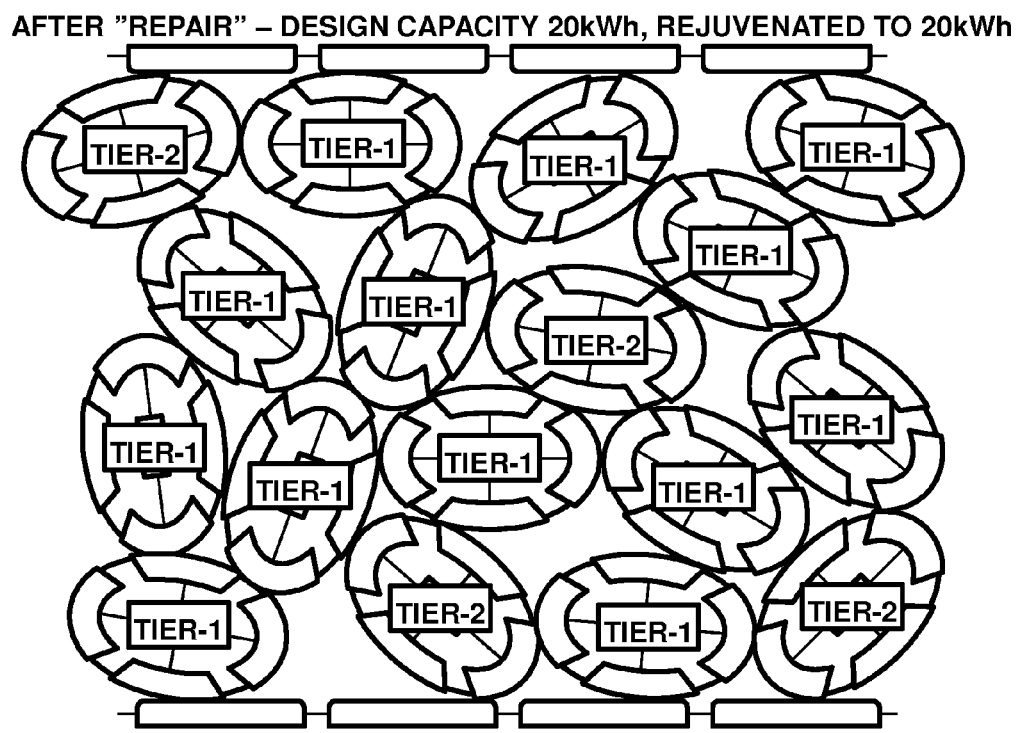
Figure 20:
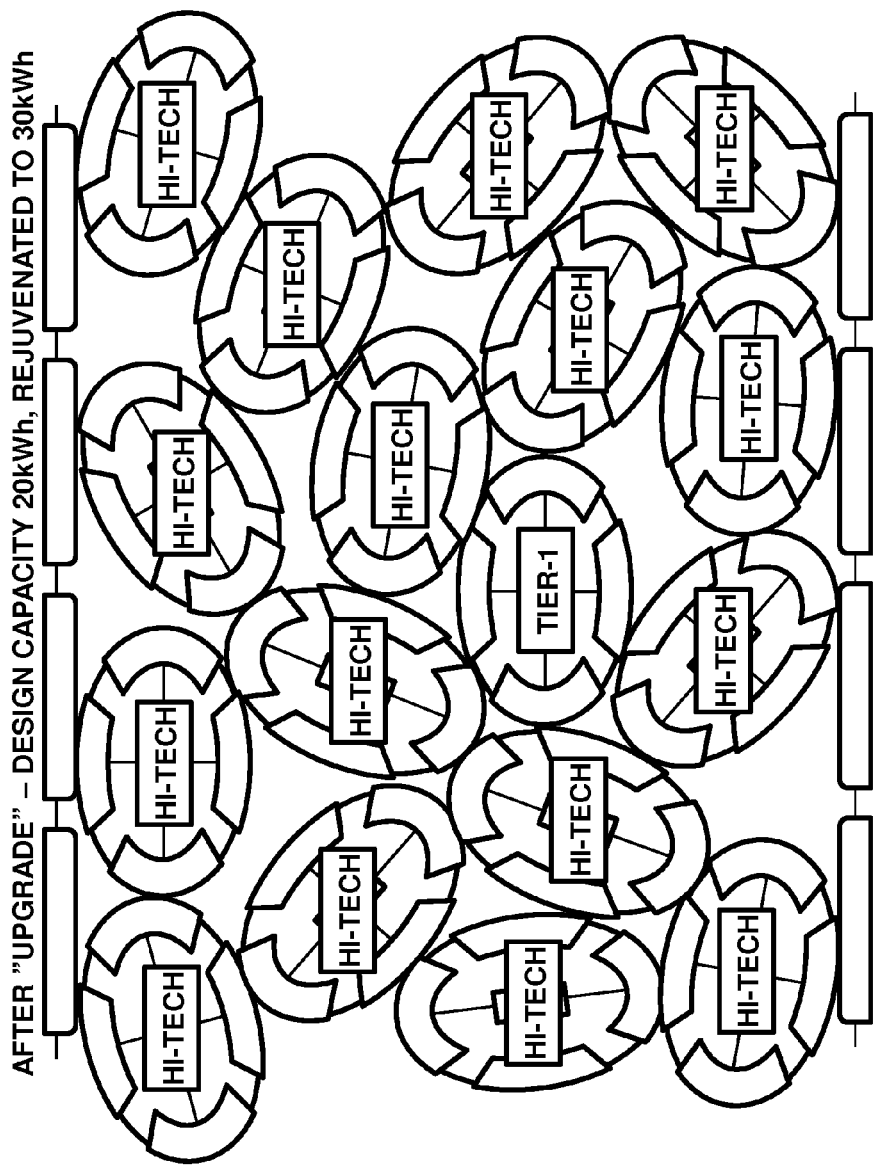
FIG. 20 illustrates schematically a battery unit fill configuration after recharging according to an alternative recharging model.

Additionally, rather than declaring an entire "battery pack" obsolete, performance of a tank with a certain performance specification and certain wear level can be partially or totally restored by removing weaker units and replacing them with new ones. FIGS. 18 and 19 illustrate before and after scenarios, where a number of degraded Tier 3 (low grade) battery units have been replaced with new Tier 1 (high grade) battery units. These new battery units, in combination with the remaining degraded Tier 2 (intermediate grade) battery units, bring the tank capacity back up to the design capacity (e.g. 20 KWh). Since the performance of the new units can meet or exceed the specification of the original units, the total capacity of the tank can in principle be higher than the capacity of the tank when it was first taken into use. This is illustrated in FIG. 20.

Also, when more advanced battery technology becomes available or becomes more cost viable, performance of an entire tank might gradually or instantaneously be increased. Older and newer battery technologies can be made to work together without conflict using the methods described in this innovation.

As discussed above, the battery units will degrade over time. It is therefore desirable that the value of the battery units themselves (i.e. the hardware value, rather than the value of the energy stored) is taken into account during a transaction involving the battery units (e.g. when filling an electric tank at the dispensing apparatus disclosed above.

The cost of the battery units is typically much higher than the cost of the energy stored in the battery units. This presents a problem for battery supply networks which operate by allowing a customer to exchange discharged battery units for charged battery units, and for many other transactions involving the transfer of battery unit ownership. Since the wear experienced by the discharged and charged battery units will be different, the difference in value between the discharged and charged battery units may be similar to, or even larger than, the cost of the energy in the charged battery units, and determining a fair cost for the transaction is difficult. As an example, a customer is exchanging an amount of battery units which when new, would cost $1000, and store $10 worth of energy, the customer's battery units may be able to supply 80% of their original peak output, and have 40% of their working life remaining; the battery provider's battery units may be able to supply 95% of their original peak output, and have 80% of their working life remaining. It is clear that it would be difficult to determine a fair value for the transaction, especially as in practice it is difficult to estimate the remaining life of a battery unit. Particularly, the participants of the transaction must agree on the value of the battery units for the transaction to proceed. Therefore, there is a need for a way to establish an agreed upon value for battery units in a battery supply system.

A solution is proposed herein whereby a central valuation service, which may be implemented on a computer system, can be used to provide a value for battery units in a transaction. Each battery unit is equipped with an array of sensors, which measure state information of the battery unit, and a memory, in which is stored a log of the state information. When a transaction involving the battery unit occurs, the state information log is sent to the central valuation service, which calculates a value for the battery unit based on the log. The battery unit may also periodically send the state information log to the valuation service, in order to reduce the storage requirements of the battery unit, and the valuation service may use the previously received logs as well as the state information log received during the transaction.

An advantage of having a central valuation service is that it provides a trusted value for the battery units to all transactional participants, ensuring that each considers the exchange to be fair. Organisations which maintain such valuation services are expected to understand battery unit aging, fatigue, and other factors which affect value over the lifetime of the battery, and therefore can be trusted to more accurately assess value than the individual participants. Furthermore, since the organisation maintaining the central valuation service has access to state information data for each battery unit in the system that is involved in transactions, this data may be used to further refine the batter valuation models.

In order to allow the consumer to estimate the cost of a transaction before the transaction occurs, the battery units may be valued periodically, e.g. daily, and electric tanks may be configured to display the total transactional value of the battery units in the tank, as well as the total energy stored. Similarly, battery unit suppliers may display the transactional value of battery units available from the supplier. In this way the consumer can avoid an unexpectedly costly transaction when exchanging near end-of-life battery units for near new battery units, and may make an informed decision as to where to exchange battery units. During a transaction, a new value may be obtained, or the most recently calculated value may be used.

State information may include, for example, charge/discharge information such as cycle count, current, voltage, and/or power; the capacity of the energy reservoir, the charge stored in the energy reservoir, and/or the internal resistance of the energy reservoir or other battery unit components. The state information may also include environmental information such as temperature, humidity, acceleration, or shocks experienced by the battery unit. The state information log may further include a log of operation failures experienced by the battery unit, and/or maintenance or other procedures performed on the battery unit. The state information is continuously collected (e.g. every few seconds) and recorded in a memory of the battery unit. The state information is transmitted to the valuation service during a transaction involving the battery unit, and it may also be transmitted to the valuation service at other times e.g. periodically, or to free up space in the memory of the battery unit.

The valuation service runs software which takes as inputs the state information log, and hardware and/or software configuration features of the battery unit such as battery chemistry, firmware version, etc., and calculates a transaction value for the battery unit. The transaction value may be a score, rather than an actual price, and multiple values may be calculated for different applications (e.g. a battery unit which still has 90% of its original storage capacity but can only deliver 20% of its original peak power may be valued highly on a first value, but lowly on a second value, whereas a battery unit which has 20% of its original storage capacity, but can deliver 90% of its original peak power may be valued lowly on the first value, but highly on the second).

The valuation service may determine the hardware and/or software configuration features of the battery units by receiving the information from the battery units themselves (in which case the information must be stored in the memory of the battery unit), or alternatively by having each battery unit have a unique identifier, which is communicated to the valuation service, and looking up the identifier in a database to determine the hardware and/or software configuration features. A unique identifier may also be used for the battery units in order to allow tracking of ownership of the battery units.

In order to secure the system against fraud, the memory of the battery units may be secured using encryption, for example asymmetric encryption, and/or the valuation service may authenticate the battery units (and optionally vice versa), by any known one- or two-way authentication method.

An embodiment will now be presented for a system in which a plurality of battery units is used to provide power to a device. The battery units and supply stations used in this example are those described in the co-pending applications PCT/EP2014/069303 (International Publication No. WO 2015/036437) and PCT/EP2014/069304 (International Publication No. WO 2015/036438), as described by the summary below. It will be appreciated by the person skilled in the art that valuation, monitoring and access control solutions presented in the below example are not dependent on the specific types of battery units or supply stations used, and may be used in any battery supply system with appropriate modifications.

System Overview

Figure 21A:
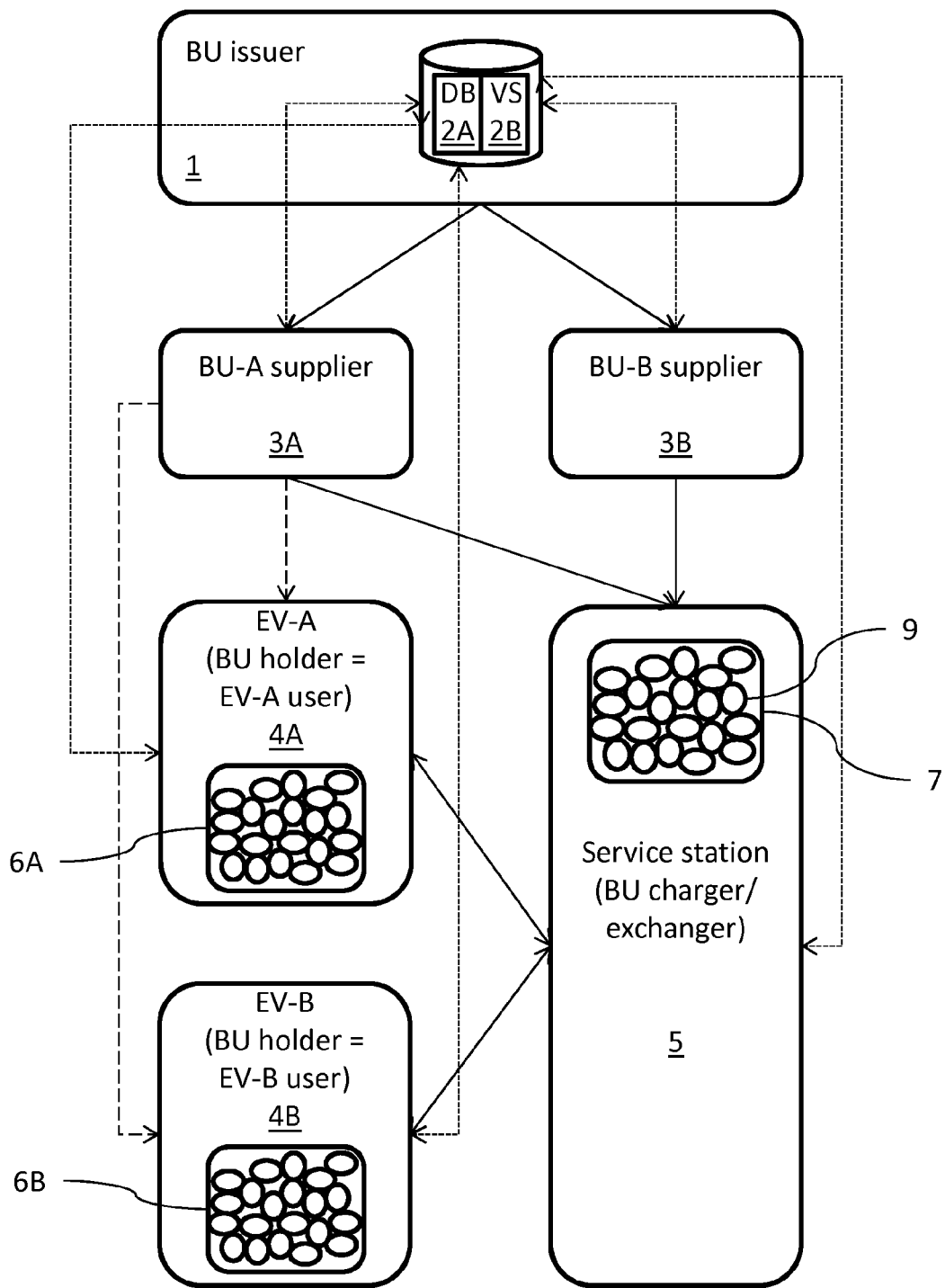
FIGS. 21A and 21B illustrate schematically a battery supply architecture.
Figure 21B:
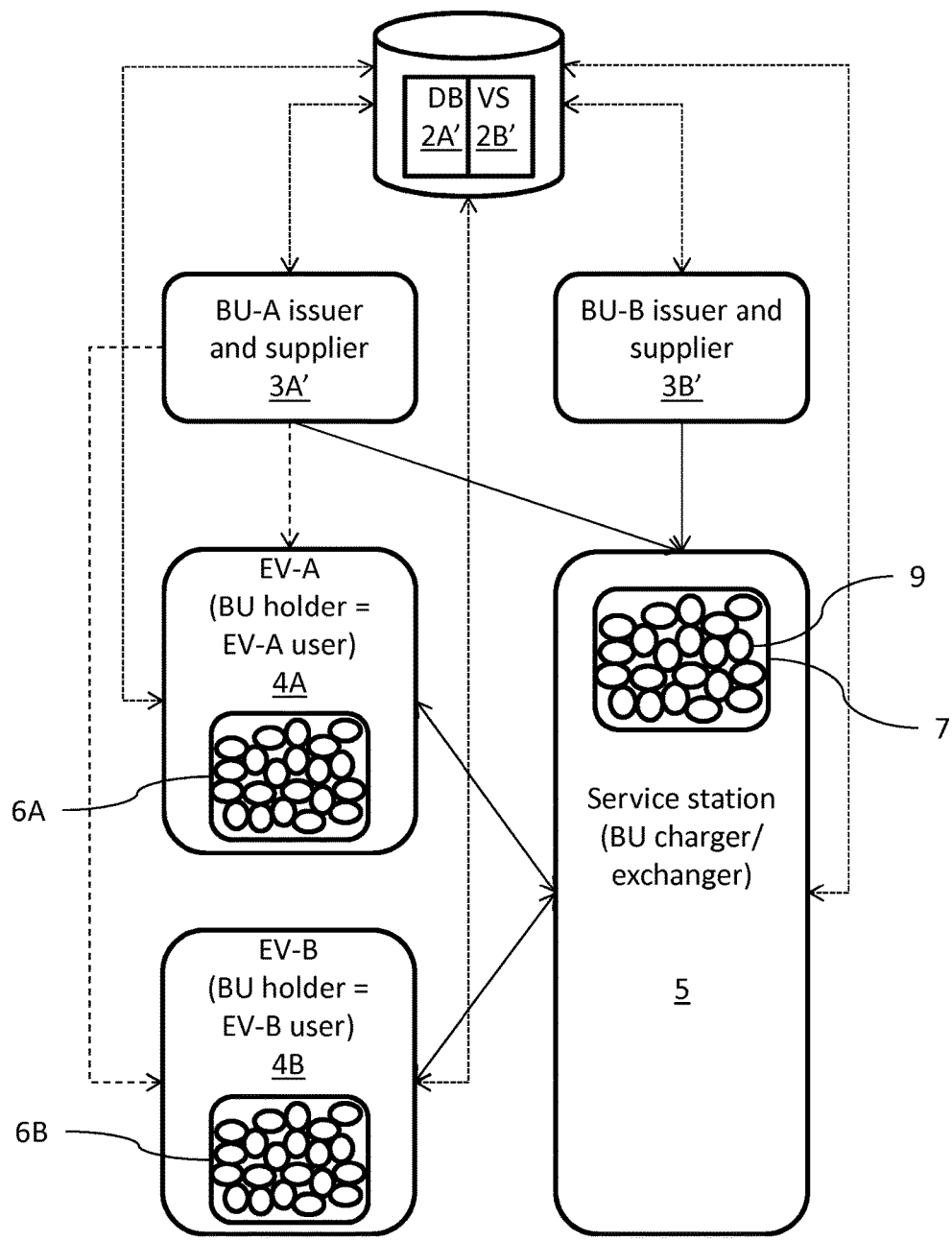

The battery supply system according to this example comprises the following active parts, as shown in FIGS. 21A and 21B. The battery units, electric tanks, and service stations are as described above. Further details on the other parts are provided later in this example.

A plurality of battery units (BUs) 9. These are typically provided and used in several groups, each in a separate container, such as "electric tanks" 6A, 6B of battery unit powered devices (e.g. the electric vehicles 4A, 4B) or storage/charging containers 7 at service stations 5.

A plurality of battery unit powered devices, such as the electric vehicles 4A, 4B, each with an electric tank 6A, 6B.

At least one service station 5, which is configured to take depleted battery units from the electric tanks 6A, 6B, and transfer charged battery units into the containers 6A, 6B from the storage/charging container 7. The depleted battery units are charged so that they can be used to supply further vehicles, or may be discarded if they are judged to be no longer viable.

A database 2A,2A' which maintains administrative information of the battery units in the system. The administrative information may comprise, for example, the owner of the battery unit, the control profile of the battery unit, hardware and/or software configuration information of the battery unit, valuation history of the battery unit, and/or a unique identifier for the battery unit.

A valuation service 2B, 2B' which is configured to provide a transaction value for a battery unit when given state information and hardware and/or software configuration information of the battery unit.

At least one reporting device (not shown) which facilitates communication between the communication device and the database or valuation service. The reporting device is further able to read and write data to the battery unit to determine state information, modify ownership or control profile information stored in the battery unit, etc. The reporting device may, for example, be located in the battery unit powered devices 4A, 4B, and/or the service station 5.

Solid arrows in FIGS. 21A and 21B show possible movement or ownership transfer of battery units. Dashed arrows represent some additional possible battery unit movements (e.g. where the BU owner 3A provides the BUs to the customer with a new car 4A). Dotted lines represent possible data flows within the system.

There are 3 primary groups of participants in the system of FIG. 21A:

Battery unit issuers 1 control the database 2A, release all battery units 9 to the system via the battery unit suppliers 3A, 3B, and control the valuation service 2B.

Battery unit suppliers 3A, 3B buy battery units from the issuer, and supply them to the users (e.g. by lease agreements or by re-sale), either directly or via the service stations 5.

Battery unit users, e.g. the owners of electric vehicles 4A, 4B. The holders may also own a number of battery units (either purchased from the issuer, or from the battery unit suppliers).

In the variation shown in FIG. 21B, the suppliers 3A, 3B also act as issuers. In this embodiment, it is preferred to have a single valuation service 2B (or multiple equivalent valuation services), and a single database 2A (or multiple compatible databases) in order to ensure that the battery supply systems of the individual issuers are compatible. In one embodiment, there may be a central database which records which issuer a battery unit is associated with, and a database at each issuer which records the owner of the battery units associated with that issuer. In this way, a battery unit can be located by querying the central database, and then querying the database of the issuer indicated by the central database.

Battery Units

Figure 22:
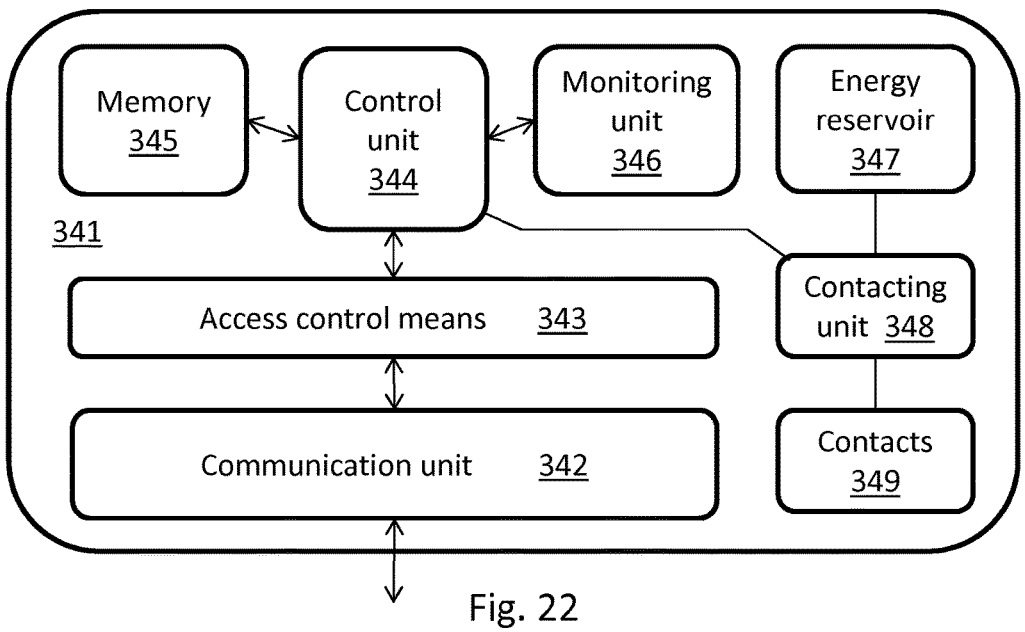
FIG. 22 illustrates schematically an exemplary battery unit.

The battery units are provided with further components in order to implement monitoring, reporting, and access control solutions. FIG. 22 shows a block diagram of basic components of the present battery unit 341 according to one embodiment. It comprises a control unit 344 functionally connected to a memory unit 345 storing battery-unit related data. The control unit is additionally connected to a monitoring unit 346 which measures and determines state information comprising various environmental and use-related parameters for storing into the memory unit 345. The control unit 344 is also connected to a contacting unit 348, which is designed to contact the positive and negative terminals of energy reservoir 347 selectively to contacts 349 on the surface of the battery unit in desired combination. As discussed above, the number of contact areas is preferably at least three and the terminals are freely connectable to any two of them in any possible combination.

The battery unit 341 additionally comprises a communication unit 342 connected to the control unit 344 via access control means 343 (illustrated here separately although the access control can be implemented as part of the control unit 344). The access control means 343 are designed to restrict read/write access rights of external devices communicating with the battery unit. The access control means 343 preferably include a cryptographic coprocessor and/or secure memory providing high security level and reducing computational load of the control unit 344.

Memory and Data Stored in the Memory

To maximally co-operate in the present ecosystem, the battery units comprise internal memory for storing battery unit-related data. Examples of such data are listed below. An operating system provided in a control unit and/or cryptoprocessor of the battery unit manages data read and write processes to or from the memory unit.

The battery-related data may comprise for example some or all of the following data:
Battery unit identification code
Battery unit security data
  access control key data
  access control algorithm identifier
  authentication key data (if different from e.g. access control key data)
  authentication algorithm identifier
  authorization key data (if different from e.g. access control key data)
  authorization algorithm identifier
Battery unit hardware data, such as
  type of the battery unit (incl. e.g. type identifier and/or parameters defining size, shape, number/placement of contacts, IP classification, cooling, or shell material(s))
  type of energy reservoir (incl. e.g. type identifier and/or parameters defining chemistry, capacity, power/current/voltage hard limits)
  type of processing unit (incl. e.g type identifier and/or detailed feature/performance parameters)
  type of cryptoprocessor (incl. e.g. type identifier and/or detailed feature/performance parameters)
  type of memory unit (incl. e.g. type identifier and/or detailed feature/performance parameters)
Battery unit software data, such as
  operating system (firmware) identifier
  operating system (firmware) version information
Battery unit control profile data (=envelope), including e.g.
  control profile identifier
  allowed charge and/or discharge limits
  allowed maximum current limit
  maximum charge and/or discharge cycle limiters
  information relating to authorization of allowed charge and/or discharge entities
  authorization validity and/or expiry data
  logging level data
  alarm threshold data
Battery unit present administrative data, such as
  unit issuer
  unit owner
  unit holder
  authorization state
Battery unit administrative data log, such as
  issuer history
  ownership history
  holder history
  data access (memory read/write) history
  authentication history
  authorization history
  valuation history
Battery unit state information such as
  energy reservoir full capacity
  energy present capacity
  cycle count
  wear level
  environmental sensor readings
  internal resistance
Battery unit state information log, such as
  discharge log (event-based and/or cumulative)
  charge log (event-based and/or cumulative, potentially with separate records for home and service station charges separately)
  environmental state log
  operation failure history
  alarm history The data does not need to be stored on a single physical memory circuit. The total memory space can be divided on different memory circuit of different types and/or read/write properties and/or access levels and/or security levels. The term "memory unit" is for simplicity used to cover all the available memory in the device, irrespective of its type. Suitable memory depends e.g. on the need of re-writability or security mechanisms supported by the battery unit. For example, cryptographic keys needed for access control/authorization/authentication of the battery unit may be located in a secure memory of a hardware security module (HSM) protected by software and hardware against various software and hardware-based attacks, whereas less sensitive data may be stored on ordinary memory devices (e.g. RAM or EEPROM) protected only by the software (the operating system of the battery unit).

Control Profile (Envelope)

The battery unit may comprises means for utilizing control profile data stored in the memory for regulating its own behaviour. In particular, the battery unit may regulate charge and/or discharge levels of the energy reservoir or maximum charge and/or discharge current and/or power, or any combination thereof, or completely authorize/prevent energy delivery of the battery unit (see "authorization mechanism"), or control the data which is logged, and access to the logged data.

The envelope may also be partly or entirely hard coded to the battery units and the present profile of the battery unit expressed using a control profile identifier only. For example, there may be "Tier 1" battery units with a specific identifier and having generous power output and/or limits and/or (dis)charging capacity limits (enabling e.g. faster acceleration or higher torque, but possibly resulting in rapid wear of the battery) and Tier 2 . . . N battery units with other identifiers and with more strict power output and/or input limits and/or (dis)charge capacity limits (but longer lifetime). By updating the control profile identifier, the Tier level of the battery unit can be changed. For example, after a Tier 1 battery unit has reached a certain wear level, it may be downgraded to Tier 2 level.

Security Mechanisms

The battery units may contain an access control mechanism and cryptographic access control means implementing the mechanism. The access control mechanism is needed for giving external entities communicating with the battery unit, such as the abovementioned communication and reporting devices, access to the memory of the battery unit according to predefined rules. The access may be a read and/or write access, depending on the application and may concern essentially all or part of the data in the internal memory.

The battery units may contain an authentication mechanism. An authentication mechanism is needed to enable external entities a possibility to verify the authenticity of the battery unit and/or compatibility of the battery unit with the system represented by the external entity.

The battery units may contain an authorization mechanism. The authorization mechanism can be used to selectively disable and enable the operation of the battery unit, i.e., its permission to receive and/or deliver energy. Authorization status may also be regarded as part of the control profile of the battery unit.

The different security mechanisms are discussed separately in detail below.

Security Mechanisms: Access Control Mechanism

To access, i.e. read or write, information of a battery unit, an access-requesting entity, typically a control unit of a battery unit container of some type, such as an electric tank control unit of an electric vehicle, a service station control unit or a charging container control unit, may be required to pass an access control procedure controlled by the battery unit.

There several options available for providing a secure access control mechanism for the battery units. One of them is based on symmetric cryptography and another on asymmetric, i.e. public key cryptography. Both require that the battery units are provided with cryptographic processing capabilities and a secure memory preferably implemented on a single microchip. One option is to provide a secure HSM microchip resembling a SIM card used in handsets of cellular networks or in smart cards. The functions of the chip can be integrated as part of a controller microchip of the battery units.

When using symmetric cryptography access control, both the battery units and the entities requiring access to the data of the battery unit share the same symmetric key. On the battery unit side, the key is stored in the secure memory of the cryptographic chip, which uses a challenge-response protocol with the requesting entity. In one variation, the protocol is based on symmetric-key encryption (e.g. according to ISO/IEC 9798-2) and may provide unilateral authentication of the requesting entity by the battery unit or mutual authentication between the devices, depending on details of the protocol (e.g. type of nonce to be encrypted and number of message passes between the devices). In another variation of symmetric-key access control, a one-way (non-reversible) function is used instead of encryption (e.g. according to ISO/IEC 9798-4) to unilaterally or mutually authenticate the devices. If the battery unit authenticates the requesting entity, it gives access to its memory according to predefined rules (access rights).

Where the protocol is based on asymmetric cryptography. In one variation thereof, the battery unit requires that the access-requesting entity possesses a private key corresponding to a public key stored in the memory of a cryptographic chip of the battery unit, before granting the entity requesting access rights. For this purpose, the battery units selects a (random) challenge, computes a one-way hash thereof and sends the challenge encrypted with the public key and the hash to the requesting entity, which decrypts it using a private key it possesses. The requesting entity sends the challenge back to the battery unit, which verifies that the challenge corresponds to the originally generated challenge. In a variation of this public-key technique, digital signature and its verification are used instead of encryption and decryption. In more detail, the requesting entity sends a certificate and identifier known to the battery unit (typically sent by the battery unit to the requesting entity) signed with a private key to the battery unit, which verifies the certificate using a certificate stored therein and checks the correctness of the signature. The described basic techniques provide secure unilateral authentication of the requesting entity for the battery unit, this being enough to grant access rights. As with the symmetric-key techniques, by suitable variation of the techniques, mutual authentication may be achieved, if needed.

Optionally, only unilateral authentication is performed during the access control procedure, meaning that only the battery unit assures checks the "identity" of the access-requesting entity before trusting that entity and granting access rights.

Alternatively the access control procedure is designed to result in mutual authentication of the devices, whereby also the access-requesting entity can trust that battery unit.

The abovementioned techniques may be implemented as purely offline techniques to the entities or taking advantage of online connection to a trusted on-line server providing at least part of the necessary key data needed for passing the access control.

After successful authorization, the chip grants access for the access-requesting entity to read or write predefined portions of its memory. Read access can be given both to static and rewritable memory of the battery unit, whereas write access can be given only to rewritable memory.

In addition, passed access control procedure can result in establishing a secure messaging channel between the devices, e.g. using one or more cryptographic session keys shared between the devices during the procedure. Secure messaging protocols suitable for the present purpose are known per se.

The data protected by the access control mechanism may be all or part of the data stored in the memory of the battery unit or having an allocated memory space (which can be empty too). Here, the non-comprehensive list of battery unit-related data above is referred to.

Naturally, any of the data can be also accessible without passing access control if so desired. For example, it may be convenient to place the authentication data in a read-only memory "outside" access control to allow for authentication of the battery unit by such devices not having access to its more sensitive data. In some cases, it may indeed be desirable to have an authentication mechanism separate from the access control mechanism.

Security Mechanisms: Authentication Mechanism

An authentication mechanism may be used for allowing entities using the battery unit to verify that the battery unit is authentic, i.e. originally part of the same ecosystem and its memory has not been tampered with. Thus, authentication may be performed for the battery unit itself (entity authentication) or for the data read from the battery unit (data authentication).

Data authentication can be conveniently achieved by asymmetric, i.e. public key cryptography. For example, all or part of data originally written to the battery unit by its issuer (for example its manufacturer, battery unit leasing company, automotive company or battery unit re-seller), may be digitally signed using a private key possessed only by the issuer. The digital signature can be checked using a corresponding issuer certificate which delivered to and possessed by the data verifier. If the signature matches with the data read, the verifier knows that it originates from the issuer. In practice is typically convenient to have a higher-level certification authority who issues the issuer certificates and a revocation policy and infrastructure.

Entity authentication is preferred since pure data authentication does not in principle prevent data from being copied from one battery unit to another, resulting in "cloning" of battery units. An entity authentication mechanism can also be achieved using public key cryptography. In one example, a private entity authentication key is stored in a secure memory of the battery unit which is never readable outside the battery unit. A corresponding public entity authentication key is stored on the accessible portion of the memory and protected using data authentication (i.e. is digitally signed).

To perform entity authentication, the verifier needs to verify the authenticity of the public key and make a cryptographic challenge to the battery unit (e.g. a digital signature request), to which it can respond correctly only if it is in possession of the corresponding private key. The response is checked using the public key whose authenticity has been verified.

Security Mechanisms: Authorization Mechanism

In some variations of the present system, it may be desirable for an entity, such as battery unit issuer or owner to authorize or revoke operation of the battery units, for example at the time of selling of taking into use of a new battery unit (authorization), or in the case of failure to fulfil financial obligations of a battery unit holder (non-authorization/revocation).

According to a simple scheme, the authorization status of the battery unit is stored as a value into the memory unit thereof and is either "authorized" (permitted to deliver energy) or "non-authorized" (prohibited from delivering energy). The status can be represented by a simple Boolean value ("authorization state" in the list of stored data above). The control unit of the battery unit is designed to obey the authorization status.

In a more complex scheme, the authorization status comprises more than two different levels, such as "authorized to use half of the available power", so that a vehicle whose battery units have been (partly) revoked, can be driven to a service station, for example.

Changing the authorization status can be protected by the access control mechanism described above or a corresponding mechanism specifically designed for authorization state change purposes. The authorization mechanism may use the same or different key data as the access control. In one embodiment, the authorization mechanism requires different keys than the access control mechanism.

According to one embodiment, the battery unit is required to have periodic re-authorization in order to be operable. Otherwise it will become non-operational. The re-authorization period may be time-based (e.g. every N days, $N \geq 1$) or use-based (e.g. every M recharging cycles, $M \geq 1$). In the first case, the battery unit preferably comprises an internal clock. In the second case, a charge cycle counter suffices. The re-authorization can be commanded via a control unit of an electric tank the battery units are contained in when the tank has access to a wireless network or at a service station, for example. Expiry of authorization can be programmed into the battery unit using authorization validity/expiry-related data values in the memory, which may indicate the date/time of expiry of authorization or e.g. the maximum number of cycles allowed.

Monitoring System

The monitoring system is configured to monitor state information of the device. The monitoring system comprises a number of sensors, which pass data to the control unit for storage in memory. The quantities measured may include:
    charge/discharge cycle count;
    charge/discharge current;
    charge/discharge voltage;
    charge/discharge power;
    charge/discharge time;
    energy reservoir charge capacity;
    energy reservoir charge stored;
    internal resistance of the energy reservoir;
    acceleration experienced by the battery;
    shock experienced by the battery;
    humidity;
    temperature;
    operation failures.

The measured state information is stored in a state information log in memory, so that it can be provided to the reporting device for communication to the valuation service.

The state information is measured with a short sampling rate (e.g. every few seconds). As the memory of the battery unit begins to fill up, the battery unit processor may take one of the following actions:
    communicate the recorded state information to the valuation service;
    delete old records to make room for newer records
        the records deleted may be selected according to additional criteria, e.g. hardware failure logs may never be deleted, humidity records may be deleted in preference to internal resistance records, etc.
    reduce the time-resolution of older records to make room for newer records, e.g. overwriting every odd numbered record in the older data, reducing the granularity of the older data while keeping trends intact.

Database

Figure 23:
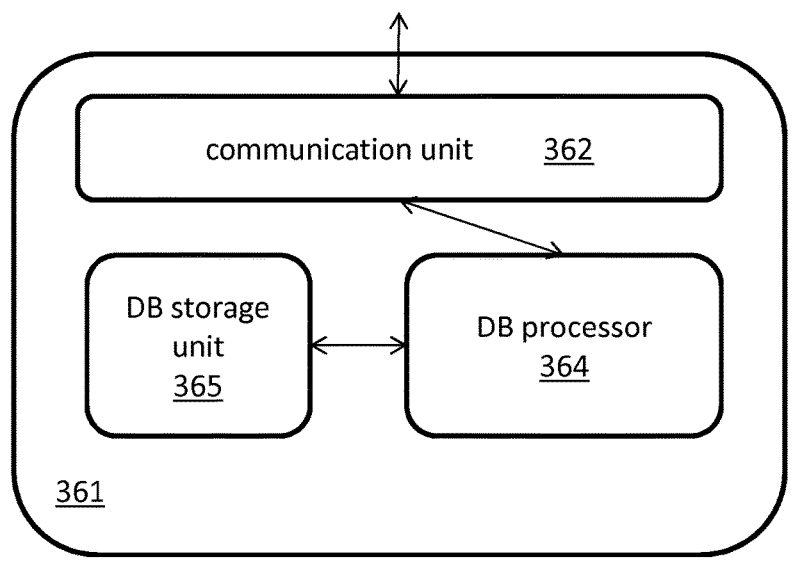
FIG. 23 illustrates schematically a central database for maintaining battery unit related data.

The database 361 is described below with reference to FIG. 23. The server comprises a data processing unit 364, a storage unit 365 containing the database structure in computer-readable form and a communication unit 362 for communicating with the valuation service and reporting devices presented in more detail later.

The data stored in the database may comprise all or a selected portion of the data contained in the memories of the battery units, provided in suitable data fields. Again, we refer to the list of battery unit-related data above. Some the data may be contained only in the database. Preferably, the database comprises at least the unique identification code for each battery unit. The database may also comprise historical data for some or all of the data in the memories of the battery units.

The database comprises information on the present owner of the battery unit. This allows for the system to be joined by many parties as owners of the battery units in circulation. It does not matter if the battery units are mixed at service stations, for example, since the ownership of each unit may be tracked afterwards using the database. Of course, the ownership data may additionally be stored in the memory of the battery unit.

The database may comprise control profile data of the battery units.

The database may comprises information on the current holder of the battery unit, which may be different to the owner e.g. due to a leasing agreement.

The database may comprise information on the authorization status of the battery units and/or information on blacklisted (to-be-revoked) battery units.

The communication unit of the database server preferably uses a secure (authenticated and encrypted) communication channel, such as a TLS connection over the internet or cellular network in order to communicate with reporting devices.

The database server typically serves a plurality of service stations and/or vehicles as a centralized repository for battery unit related data. The database preferably comprises means for receiving battery unit status data update requests from the plurality of service stations and means for authenticating the status data update requests, such that only desired stations connect thereto. Suitable authentication methods typically based on string cryptography and digital certificates are available per se.

The data fields of the database may comprise, for each battery unit in the system, at least a battery unit ID data field, battery unit owner ID data field and one or more data fields for storing usage status and/or history of the battery units, and said means for reading data and means for updating at least part of the data fields are adapted to communicate data for said data fields.

Valuation Service

Figure 24:
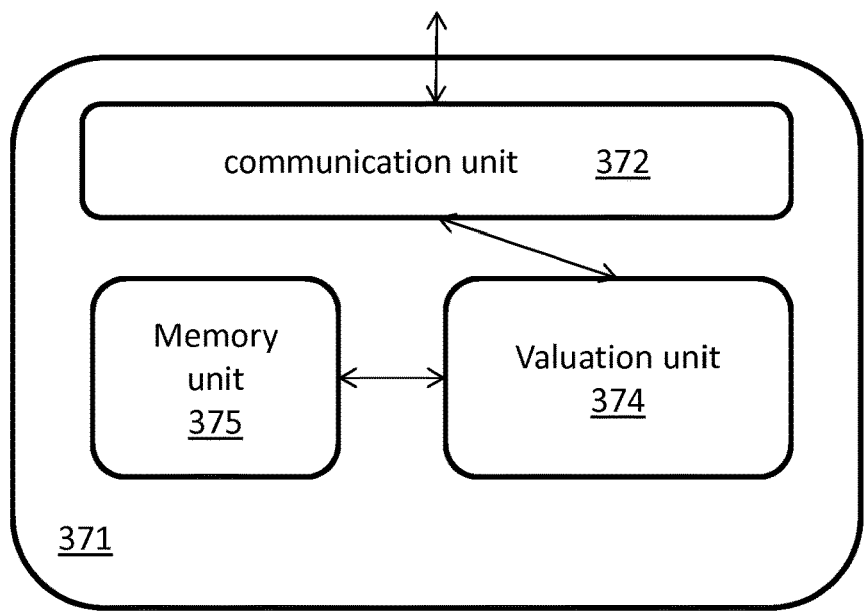
FIG. 24 illustrates schematically a central valuation service.

The valuation service is described below with reference to FIG. 24. The server 371 comprises a valuation unit 374, a memory unit 375 containing code for the valuation unit, and a communication unit 372 for communicating with the database detailed above and with reporting devices presented in more detail later.

The valuation unit runs a valuation program stored in the memory unit. The program takes as inputs a state information log and hardware and/or software configuration information relating to a battery unit, and outputs a transaction value for the battery unit. The state information log is obtained from the battery unit (via the reporting device described below), and contains usage and environmental data as detailed in the previous section describing the battery units. The hardware and/or software configuration information may be obtained from the battery units (via the reporting devices), or from the database using the unique identifier of the battery unit.

The hardware and/or software configuration information may comprise:

Details about the battery unit such as:
  battery chemistry
  initial charge capacity
  end-of-life charge capacity
  initial peak output power
  end-of-life peak output power
  environmental tolerances Details about other battery unit hardware such as
  device firmware version
  device chipset version
  manufacturing date
  refurbishment/repair log
  available sensors The output from the valuation unit is a transaction value for the battery unit. The transaction value is not necessarily a monetary value, but it is an indication of the wear, suitability for purpose, and expected remaining life of the battery unit which will affect the monetary value of the unit. The transaction value may be formed of multiple scores, e.g. a score representing the battery unit's suitability for high peak power applications, a score representing the battery unit's suitability for low power, long endurance applications, etc. Alternatively, the transaction value may comprise a single score and an indication of the applications to which that score relates.

As a further alternative, the transaction value may indicate a category of the battery unit. Examples of categories include a system of tiers, with tier 1 being high performance battery units (analogous to high octane fuel in a petrol station), and the lower tiers being battery units approaching end-of-life or with reduced performance. Alternatively, or additionally, the categories may indicate that the battery unit is suited for certain tasks, e.g. battery units with a high peak output power but low capacity may be in category A, battery units with a high capacity but low peak output power may be in category B, etc.

The valuation service communicates the transaction value back to the reporting device. If the reporting device sends an aggregate report on all battery units in a transaction, the valuation service may likewise send an aggregate valuation on those battery units back to the reporting device. This may be a total transaction value for all battery units in the transaction, or individual valuations for each battery unit combined into a single response.

Reporting Devices

Figure 25:
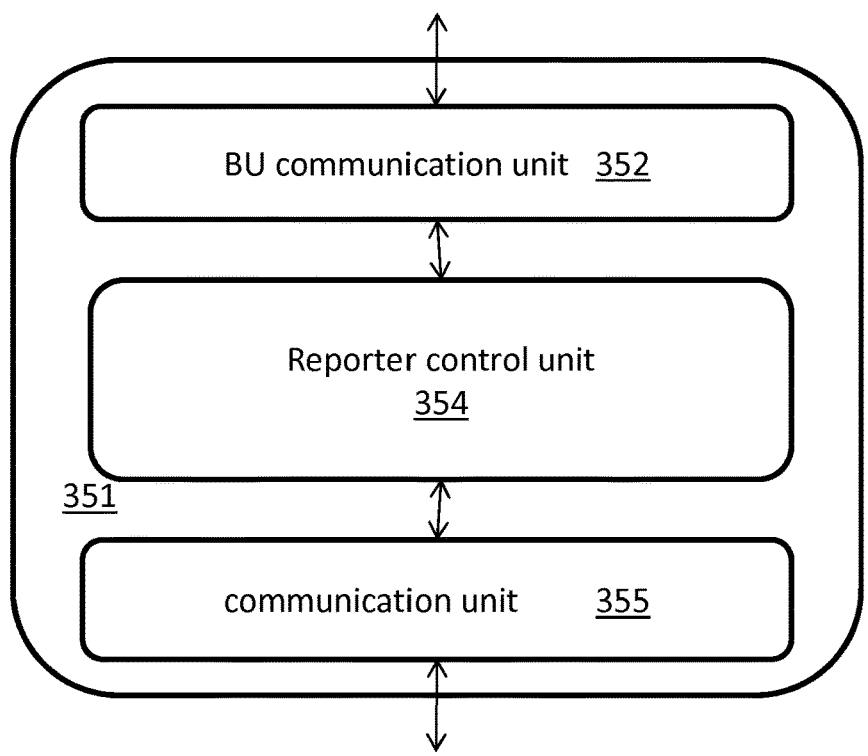
FIG. 25 illustrates schematically a reporting device.

Reporting devices are needed for updating of statuses of battery units to the database server. Reporting devices may be parts of service stations and/or electric tanks. With reference to FIG. 25, the reporting device 351 comprise a communication unit 352 for receiving data from and/or transmitting data to the battery units either via direct communication with the units or via a control unit of the entity they are assembled at (e.g. a tank control unit of an EV or storage/charging container or battery unit transfer means of a service station). The communication unit 352 is functionally connected to a reporter control unit 354, which is further connected to a database communication unit 355 capable of connecting to a database discussed in more detail above and a valuation service communication unit 356 capable of connecting to a valuation service discussed in more detail above.

In particular, it is beneficial to have a reporting device at a service station in order to update present owner and/or holder information to the database every time a battery unit is transferred from a tank of a vehicle to a container at the service station or vice versa, and to obtain a valuation of battery units transferred from the valuation service.

Depending on the system model, transfer of a battery unit may change the owner of the battery units (when the holder is the owner) or only the holder of the battery units (e.g. leasing company is the owner).

The reporting device may be adapted to communicate with the battery units directly and therefore have means for forming a contact with contact areas on surfaces of the battery units or wireless communication means. Alternatively, the reporting device adapted to communicate with the battery units via a control unit of another device, such as a battery unit dispenser control unit or tank control unit.

The reporting device preferably comprises cryptographic means for passing a cryptographic access control of the battery units. This is important, if the data intended to be reported to the database is protected by an access control mechanism described above. Such means may include a cryptographic processor and one or more keys or certificates to be presented to the battery units and/or used in a challenge-response protocol.

The reporting device may also comprise means for cryptographically authenticating the battery units and/or the data read from the battery units. After a successful authentication, one can be sure that the database is updated with data of battery units really belonging to the system and not counterfeit units, for example. At the same time, potential counterfeits are recognized and can be removed from circulation.

The reporting device may aggregate multiple data streams from the battery units into a single update/request sent to the database/valuation service. In this way, the reporting device may handle a transaction involving many battery units within a single session with the database/valuation service.

The battery unit status update means are configured to utilize an encrypted and authenticated data transfer channel, such as a TLS channel for communication with the database or valuation service, the data transfer channel preferably comprising the internet or a wireless cellular network.

Service Stations and Battery Unit Dispensers

In the present example, the service station described above additionally comprises a reporting device, preferably functionally connected to the dispenser such that predefined data retrieved from the battery unit transferred either way can be updated to the database and valuation service as described above. The reporting device may be an integral part of the dispenser or service station such that the data is reported immediately after having been identified or after the whole dispensing and identification process, potentially including a financial transaction, has been completed. In particular, the reporting device is configured to update the owner ID and/or holder ID of the battery units to the database, and to provide the state information log to the valuation service.

The dispenser may also comprise means for determining the total energy content of the removed battery units and the total energy content of the dispensed battery units. A user can be charged on the basis of the energy content balance values by calculating an energy content balance value and communicating the balance to a point of sale system for making a corresponding financial transaction. The user can additionally be charged on the basis of the difference in transaction values between the battery units taken from the user, and the battery units provided to the user, where the transaction value is obtained from the valuation service as part of the transaction.

The dispenser may be configured to separate out battery units removed from the electric tank if the transaction value (or any part of the transaction value in the case where the transaction value has multiple parts) is below a specified amount, e.g. to remove battery units which have reached end of life from circulation. Additionally, the dispenser may separate battery units based on multiple categories determined by the transaction value, e.g. into multiple tiers by performance.

It should be noted that the reporting device does not necessarily need to have read access to the previous owner ID and/or holder ID, but the database can be updated by having the identification code and owner ID and/or holder ID of the service station or instance running the service station, typically stored in the device itself or other devices of the station, in the embedded in the secure communication channel with the database. However, if the new owner ID and/or holder ID are to be written to the battery units themselves (and not only the database), the reporting device or another device in the service station needs to have a write access to the respective data fields in the battery unit.

Electric Vehicles and Electric Tanks

Electric tanks described above are capable of communicating with the battery units for configuring one or more electric energy paths through a plurality of battery units between electric output terminals of the tank. Therefore, read and/or write access to the memory units within the meaning of the present example can also be conveniently provided. The reporting device may be arranged to be part of or communicate through the control unit of the tank. It can however also directly communicate with the battery units, if so desired. What is minimally needed for updating the holder ID and/or owner ID to the database, are the identification codes of the battery units transferred to or from the tank. As with the case of the embodiment where there is a reporting device at the service station, the holder ID and/or owner ID (i.e. identification code of the tank) can be stored in and received from the tank control unit. It is preferred, however, to write the new holder ID and/or owner ID to the battery units too after a holder and/or owner change. In order to obtain a valuation from the valuation service, the state information log must be communicated to the valuation service, and this may also be achieved either by direct contact with the battery units, or via the control unit of the tank.

Transaction Method

Figure 26:
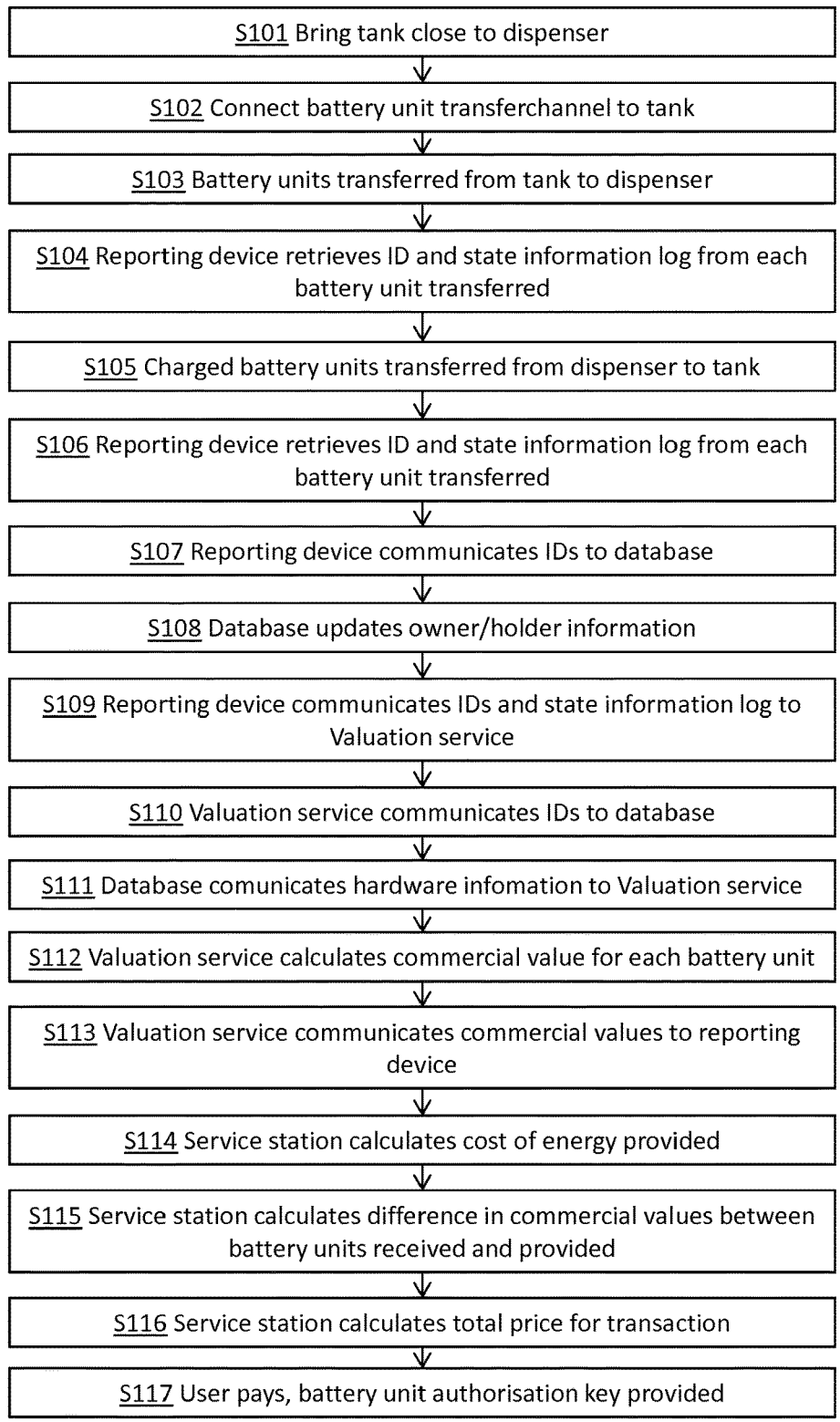
FIG. 26 is a flow diagram illustrating a battery unit transaction process.

The process of performing a transaction in the above example will now be explained. For the purposes of this section, it is assumed that the owner of the electric car ("the user") also owns the battery units in the electric tank of the car, and that the operator of the service station ("the operator") owns all of the battery units in charging or storage tanks in the service station. The process will be described with reference to FIG. 26.

The user brings the electric car close to the dispenser S101 and connects the battery unit transfer channel of the dispenser to the tank of the electric car S102. The battery units are removed from the tank via the transfer channel S103.

The reporting device retrieves the unique identifier and state information log from each of the battery units removed from the tank of the electric car S104. This may be achieved by having the reporting device integrated in the transfer channel, and reading the battery units directly as they pass through to the dispenser, by communicating with the tank of the electric car prior to transfer of the battery units, or by communication with the dispenser after transfer of the battery units.

Charged battery units from the tank of the service station are then transferred to the tank of the electric car via the transfer channel S105. The reporting device retrieves the unique identifier and state information log from each of the battery units as before S106.

The reporting device communicates the unique identifier for each of the battery units received and provided by the service station to the database S107. The communication includes authentication information to allow the database to authenticate the battery units. This may comprise separate communications for each battery unit transferred, or a group communication indicating all of the battery units, and whether they are being transferred to or from the electric vehicle. The database updates the ownership and holder information for those battery units accordingly S108. Alternatively, the database may only update the holder information, and update the owner information only when it receives confirmation that payment has been received.

The reporting device then communicates the state information log and the unique identifier for each battery unit to the valuation service S109. The valuation service communicates the unique identifiers to the database S110, and receives the hardware and/or software configuration information for each of the battery units S111. The valuation service calculates a transaction value for each of the battery units S112, and communicates the values to the reporting device S113.

The service station then calculates the total energy difference between the battery units received by the service station and the battery units provided by the service station S114, and the difference in total transaction value between the battery units received by the service station and the battery units provide by the service station S115, and calculates a price for the transaction accordingly S116.

If authorisation of the battery units is to be used as described above, once the user pays for the battery units, the service station provides the authorisation key to the tank of the electric vehicle to activate the transferred battery units S117.

Constant Monitoring

Alternatively, or in addition to requesting the valuation during a transaction, a valuation may be performed periodically. In this case, reporting devices are located in electric tanks, e.g. the electric tanks of electric vehicles and the storage/charging tanks of service stations, or within the battery units themselves. The reporting devices may communicate with the valuation service wirelessly, e.g. by WiFi or by a mobile data protocol such as LTE (Long Term Evolution). The valuation may be performed periodically, or upon the first available connection after a set interval, e.g. daily, or on the first available connection at least one day after the previous valuation.

Figure 27:
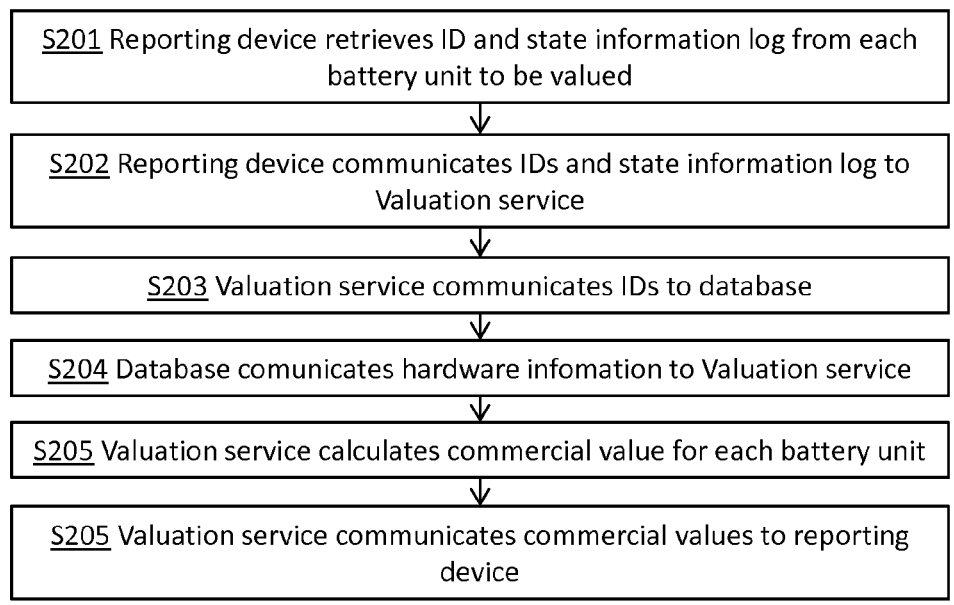
FIG. 27 is a flow diagram illustrating a battery unit valuation process.

The valuation process proceeds as follows, and as shown in FIG. 27.

The reporting device retrieves the unique identifier and state information log from each battery unit to be valued S201. In the case where the hardware and/or software configuration is to be sent from the battery unit, rather than retrieved from the database, this is retrieved as well. The reporting device then sends the retrieved data to the valuation service S202. If the hardware and/or software configuration information was not included in the data sent to the valuation service, the valuation service queries the database using the unique identifier S203, and receives the hardware and/or software configuration information S204.

The valuation service then uses the state information log and the hardware and/or software configuration information for each battery unit to calculate a transactional value for the battery unit as described above S205. The valuation service then communicates the transactional values to the holder of the battery units, and/or other transactional participants in the battery supply system S206. This communication may to via the reporting device, e.g. to the electric tank of an electric vehicle for display on an in-car information screen, or by some other route, e.g. to an app on the user's mobile telephone.

The invention claimed is:

1. A dispenser for dispensing charged battery units into a tank of an electrically powered apparatus and comprising:
   a dispensing container for accommodating a plurality of charged battery units;
   a conduit having a first end coupled to the dispensing container and a second end adapted to be coupled to a tank to be filled; and
   a dispensing mechanism for selectively dispensing battery units to the tank through said conduit in essentially random order and orientation, the dispensing mechanism comprising means for communicating individually with each battery unit dispensed to retrieve an identification code of the battery unit, and a metering unit for monitoring and controlling the number and or state of battery units dispensed in order to transfer a user defined amount of energy to said electrically powered apparatus, said metering unit being configured to store the identification codes of the battery units dispensed; and
   an output unit between the dispensing container and the conduit, capable of allowing battery units to enter the conduit from the dispensing containing, and comprising a diverter for removing faulty battery units, wherein the metering unit is functionally connected to the output unit for operating the output unit and controlling the dispensing process.

2. The dispenser according to claim 1, wherein said dispensing container comprises a silo and said conduit is coupled to the bottom of the silo, wherein the conduit is configured such that battery units are conveyed through the conduit at least partly by gravity.

3. The dispenser according to claim 1, wherein said conduit comprises a flexible hose.

4. The dispenser according to claim 1, wherein said dispensing mechanism is arranged to transfer battery units through said conduit by means of pneumatic conveying.

5. The dispenser according to claim 1, wherein said metering unit is configured to dispense a known number of battery units into the tank and or a known amount of stored electric energy.

6. The dispenser according to claim 1, wherein said means for communicating is additionally configured to retrieve information on the state of the battery unit or information stored in the battery units, said information comprising one or more of the following: charge level, charge cycle, voltage level of the battery unit, unique identity of the battery unit.

7. The dispenser according to claim 1, and comprising a battery unit recharging system.

8. The dispenser according to claim 7, wherein said recharging system is integrated into said dispensing container and comprises a plurality of electric contact pads for making electrical contact with said battery units.

9. The dispenser according to claim 8, wherein said recharging system is configured to send programming signals and deliver charging power to battery units via said electric contact pads.

10. The dispenser according to claim 7 and comprising a recharging container separate from said dispensing container, wherein said charging system is integrated into said charging container and comprises a plurality of electric contact pads for making electrical contact with said battery units, the dispenser further comprising a transfer mechanism for transferring charged batteries from the charging container to the dispensing container.

11. The dispenser according to claim 1 and comprising an extraction mechanism for extracting battery units from a tank.

12. The dispenser according to claim 11, wherein said extraction mechanism utilizes at least part of said conduit.

13. The dispenser of claim 11, wherein said metering unit is configured to detect and record unique identities of extracted battery units.

14. The dispenser according to claim 1, said dispensing container being configured to contain at least 1000 battery units.

15. The dispenser according to claim 1, and comprising a point-of-sale system coupled to said metering system to control the metering system and or reconcile financial charging information in accordance with dispensed battery units.

16. A method of providing electric energy to an electric vehicle, the vehicle comprising a tank for storing a plurality of battery units, the method comprising:
  locating the vehicle in close proximity to a battery unit dispenser;
  coupling the tank to the dispenser via one or more battery unit transfer conduits;
  extracting depleted battery units from the tank via the or at least one conduit;
  dispensing charged battery units into the tank via the or at least one conduit in essentially random order and orientation;
  communicating individually with each battery unit dispensed to retrieve an identification code of the battery unit; and
  performing metering of the extracted and dispensed battery units for the purpose of financial charging, said metering comprising storing the identification codes of the battery units dispensed, wherein the extraction and dispensing of battery units is controlled by a vehicle user so that, in conjunction with said step of metering, a user defined amount of available electric energy is added to the tank, and wherein said step of dispensing comprises removing faulty battery units.

17. The method of claim 16, wherein the method is carried out at a roadside service station.

18. The method of claim 16 and comprising delivering the extracted battery units to a charging system, and subsequently recharging the depleted battery units.

19. The method of claim 16, wherein said step of dispensing comprises selecting a battery unit type from a plurality of available battery unit types, and dispensing the selected battery unit type.

* * * * *